(12) United States Patent
Suzuki et al.

(10) Patent No.: US 6,379,010 B1
(45) Date of Patent: Apr. 30, 2002

(54) PROJECTION TYPE DISPLAY

(75) Inventors: Toshihiro Suzuki, Hadano; Tetsuya Kobayashi, Sagamihara; Tetsuya Hamada, Isehara; Takeshi Gotoh, Zama; Mari Sugawara, Tachikawa; Keiji Hayashi, Kawasaki; Hisashi Yamaguchi, Atsugi, all of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/280,444

(22) Filed: Mar. 29, 1999

(30) Foreign Application Priority Data

Nov. 12, 1998 (JP) .......................... 10-322594
Nov. 30, 1998 (JP) .......................... 10-338874
Jan. 27, 1999 (JP) .......................... 11-019003

(51) Int. Cl.⁷ .............................. G03B 21/14
(52) U.S. Cl. ....................................... 353/31
(58) Field of Search ...................... 353/20, 31, 33, 353/34, 37; 349/9, 8, 7, 18, 96, 97, 99, 102, 103, 117; 348/752

(56) References Cited

U.S. PATENT DOCUMENTS

| 5,621,551 | A | * | 4/1997 | Henderson et al. ............ 349/7 |
| 5,829,854 | A | * | 11/1998 | Jones ........................ 353/33 |
| 5,909,259 | A | * | 6/1999 | Ishino ........................ 349/9 |
| 6,042,236 | A | * | 3/2000 | Hatakeyama et al. ......... 353/31 |
| 6,082,863 | A | * | 7/2000 | Jones et al. ................. 353/33 |
| 6,152,566 | A | * | 11/2000 | Hashizume ................... 353/20 |
| 6,176,586 | B1 | * | 1/2001 | Hirose et al. ................ 353/31 |
| 6,183,090 | B1 | * | 2/2001 | Nakanishi et al. ............ 353/20 |
| 6,184,944 | B1 | * | 2/2001 | Stephens ..................... 349/5 |

FOREIGN PATENT DOCUMENTS

| JP | 6222321 | 8/1994 |
| JP | 7005410 | 1/1995 |
| JP | 9297352 | 11/1997 |

* cited by examiner

Primary Examiner—William Dowling
(74) Attorney, Agent, or Firm—Greer, Burns & Crain, Ltd.

(57) ABSTRACT

The present invention relates to a projection type display using a transmission type liquid crystal light valve, and its object is to supply a projection type display capable of exhibiting a high quality gradation display by preventing a leak current at a switching device. The projection type display comprises three liquid crystal light valves 21R, 21G, and 21B which have polarizing plates 20Rp, 20Gp, and 20Bp, modulate in intensity and emit each light of color components of red, green, and blue, and a dichroic prism to synthesize exiting lights from respective light valves. The projection type display is structured to arrange half-wave plates 20Ri, and 20Gi between the liquid crystal light valves 21R, and 21G for red and green, to set a polarizing direction of an exiting light of a blue component orthogonal to polarizing directions of the other two exiting lights.

8 Claims, 34 Drawing Sheets

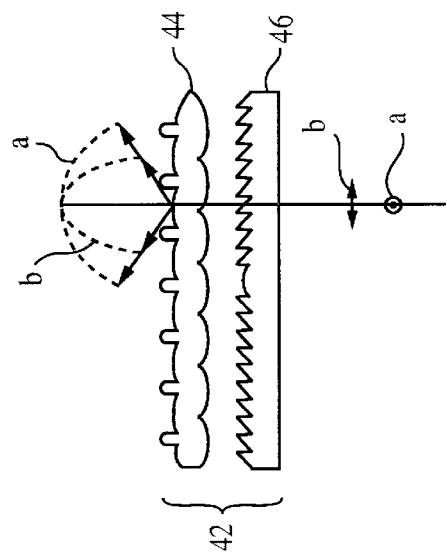
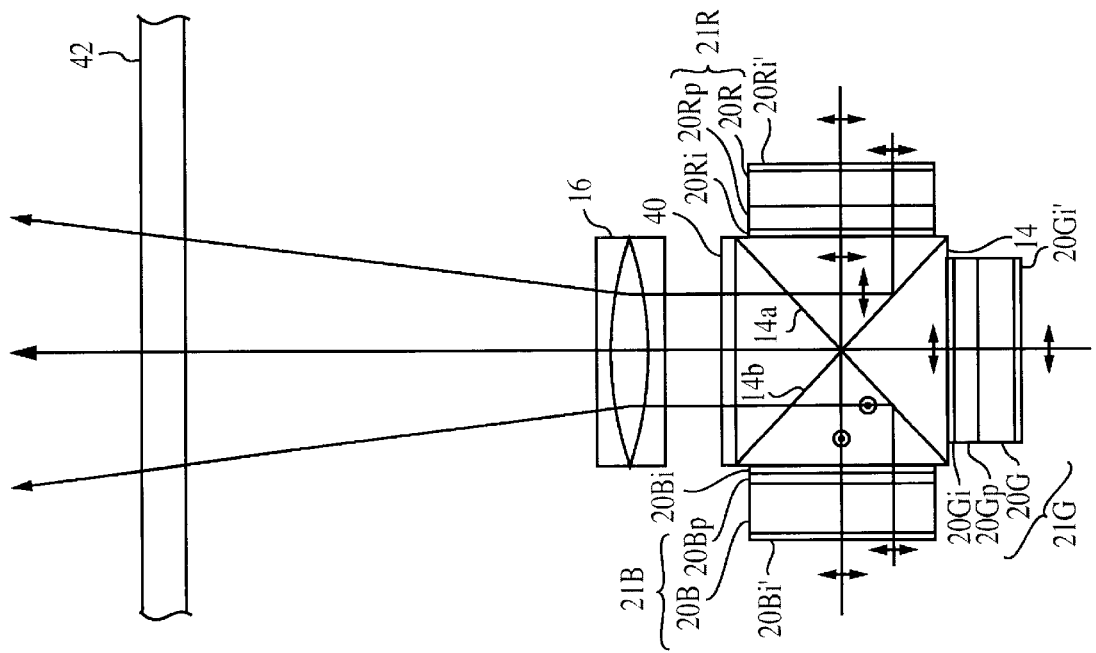
FIG. 6(b)
FIG. 6(a)

PROJECTION TYPE DISPLAY

BACKGROUND OF THE INVENTION

1. Field of the Invention

The present invention relates to a projection type display using a light valve, particularly to a projection type display using a transmission type liquid crystal light valve.

2. Description of the Related Art

Among the projection type displays using the light valve for a light modulation, a projection type display using a liquid crystal light valve called a liquid crystal projector has the possibility to take the place of the CRT in the near future because the liquid crystal projector allows to display a fine and large image screen.

As the conventional projection type display used, there are a liquid crystal projector arranging a polarizing plate which has a transmission axis (or an absorption axis) oriented at 45 degrees diagonal with respect to the horizontal direction of a projection screen on the exiting side of a normally white type liquid crystal panel using a TN (twisted nematic) liquid crystal, and a liquid crystal projector having a transmission axis (or absorption axis) oriented parallel or perpendicular to the horizontal direction.

An exiting light from these conventional liquid crystal projectors is projected on the screen after being converted to a polarized light vibrating in the direction parallel to a major side or minor side of the display area of a rectangular shaped screen by a polarization converting device and so on. Also, one color of the three primary colors has a polarizing direction substantially orthogonal to the other two colors.

An example of a schematic structure of this conventional projection type display is briefly described with reference to FIG. 30. FIG. 30 shows the conventional projection type display using the transmission type liquid crystal light valve. A projection optical system of the projection type display is composed of a light source 1, liquid crystal light valves 21R, 21G and 21B, dichroic mirrors 4 and 6, a dichroic prism 14, a projection lens 16 and the like. The liquid crystal light valves 21R, 21G and 21B having a structure, which sandwiches both surfaces of liquid crystal panels 20R, 20G and 20B by polarizing plates, is used. The liquid crystal light valves 21R, 21G and 21B shown in FIG. 30, provide polarizing plates 20Rp, 20Gp and 20Bp on the exiting sides of the liquid crystal panels 20R, 20G and 20B respectively. On the incident side, a common polarization converting device 2 is arranged in the vicinity of the light source 1. Further, each of half-wave plates 20Ri', 20Gi' and 20Bi' is inserted on each incident side of the liquid crystal light valves 21R, 21G and 21B respectively and each of half-wave plates 20Ri, 20Gi and 20Bi is inserted on each of exiting sides respectively.

The three liquid crystal light valves 21R, 21G and 21B form images by modulating the intensity of the three primary colors of red (R), green (G) and blue (B) respectively according to image signals and transmit the images to the dichroic prism 14 which is, for example, a color synthesizing optical system. The liquid crystal light valve 21G is arranged at a position where the exiting light passes through the dichroic prism 14 and exits the prism 14. The liquid crystal light valve 21R is arranged at a position where the exiting light is reflected by a dichroic surface 14b of the dichroic prism 14 and exits the prism 14. Also, the liquid crystal light valve 21B is arranged at a position where the exiting light is reflected by a dichroic surface 14a of the dichroic prism 14 and exits the prism 14.

In the projection type display shown in FIG. 30, a white light illuminated from the light source 1 is incident on the dichroic mirror 4 as a linearly polarized light (p-polarization) having a polarizing direction (shown by arrows in the diagram) parallel to this page, after passing through the polarization converting device 2. The dichroic mirror 4 is structured so that a blue light is reflected thereby and other colors pass therethrough, where blue reflected by the dichroic mirror 4 is also reflected by a mirror 12 and is incident on the half-wave plate 20Bi'. On the other hand, lights other than blue light pass through the dichroic mirror 4 and are incident on the next dichroic mirror 6. The polarizing direction of the blue light, which is incident on the half-wave plate 20Bi', is rotated 45 degrees and then the blue light is incident on the liquid crystal panel 20B which has substantially the same polarizing direction as the orientation direction of liquid crystal molecules on the incident side of the substrate side of the liquid crystal panel 20B in the blue liquid crystal light valve 21B.

On the other hand, the light passing through the dichroic mirror 4 is incident on the dichroic mirror 6 structured to reflect the green color and pass the red color. The green color reflected by the dichroic mirror 6 is incident on the half-wave plate 20Gi'. The polarizing direction of the green color, which is incident on the half-wave plate 20Gi', is rotated 45 degrees by the half-wave plate 20Gi' and the green light is incident on the liquid crystal panel 20G, which has a polarizing direction substantially the same as the orientation direction of liquid crystal molecules on the substrate side of the incident side of the liquid crystal panel 20G in the liquid crystal light valve 21G for green. Also, the red light passing through the dichroic mirror 6 is incident on the half-wave plate 20Ri' after reflected by mirrors 8 and 10. The polarizing direction of the red light, which is incident on the half-wave plate 20Ri', is rotated 45 degrees by the half-wave plate 20Ri' and the red light is incident on the liquid crystal panel 20R which has a polarizing direction substantially the same as the orientation direction of the liquid crystal molecules on the substrate side of the incident side of the liquid crystal panel 20R in the liquid crystal light valve 21R for red.

A substrate on each exiting side of the liquid crystal panel 20R, 20G and 20B is rubbed in the direction orthogonal to the orientation direction of the liquid crystal molecules on the substrate side to which the light is incident. Therefore, a TN (twisted nematic) liquid crystal layer is formed on any of the liquid crystal panels 20R, 20G and 20B. Also, each of the liquid crystal panels 20R, 20G and 20B is an active matrix type liquid crystal panel, having a plurality of pixel areas where a p-Si TFT (a thin film transistor using polysilicone for a channel layer) is formed as a switching device.

The blue light which is incident on the liquid crystal light valve 21B for blue is modulated by driving the switching device at the liquid crystal panel 20B and exits the polarizing plate 20Bp. The transmission axis of the polarizing plate 20Bp is set substantially in the same direction as the orientation direction of the liquid crystal molecules on the substrate side of the exiting side of the liquid crystal panel 20B. Therefore, the liquid crystal panel 20B is driven by a so-called normally white type, which obtains the greatest light transmission ratio under the condition where no voltage is applied to the TN liquid crystal layer of the pixel area. The blue light exiting the polarizing plate 20Bp is in turn incident on the half-wave plate 20Bi and the polarizing direction is converted to a polarizing direction perpendicular to this page, thereby being incident on the dichroic surface 14a as a s-polarized light and being reflected.

Similarly, the red light incident on the liquid crystal light valve 21R for red is also modulated by the driving of the switching device in the liquid crystal panel 20R and exits the polarizing plate 20Rp. The transmission axis of the polarizing plate 20Rp is also set substantially in the same direction as the orientation direction of the liquid crystal molecules on the substrate side of the light exiting side of the liquid crystal panel 20R. The liquid crystal panel 20R is driven by the so-called normally white type. The red light exiting the polarizing plate 20Rp is in turn incident on the half-wave plate 20Ri and the polarizing direction is converted to the polarizing direction perpendicular to this page, thereby being incident on the dichroic surface 14b as the s-polarized light and being reflected.

On the other hand, the green color incident on the liquid crystal light valve 21G for green is modulated by the driving of the switching device in the liquid crystal panel 20G and exits the polarizing plate 20Gp. The light transmission axis of the polarizing plate 20Gp is set substantially in the same direction as the orientation direction of the liquid crystal molecules on the substrate side of the exiting side of the liquid crystal panel 20G. Therefore, liquid crystal panel 20G is driven by the so-called normally white type. The green light exiting the polarizing plate 20Gp is in turn incident on the half-wave plate 20Gi and the polarizing direction is converted to a polarizing direction parallel to this page, thereby passing through the dichroic surfaces 14a and 14b as the p-polarized light.

In this way, the blue and red lights reflected by the dichroic prism 14 and the green light passing through inside the dichroic prism 14 are synthesized and exit to be enlarged by the projection lens 16 and project color images on the screen (the diagram is omitted).

In the conventional projection type display shown in FIG. 30, the light passing through the dichroic prism 14 is the p-polarized light and the light reflected by the prism 14 is the s-polarized light. In this manner, a deterioration of a separation specification and a spectrum synthetic characteristic at the dichroic surfaces 14a and 14b, which generate when the lights incident on the dichroic prism 14 are all s-polarized lights or each incident light is a combination of the s-polarized and the p-polarized lights, can be prevented. Thus, a cut-off specification of a reflection spectrum and a transmission spectrum at the dichroic surfaces 14a and 14b are improved, thereby resulting in an improvement in image quality. This is a technology described in Japanese Laid-open Patent Application No. 6-222321 and Japanese Laid-open Patent Application No.7-5410.

Meanwhile, along with a realization of a larger and finer projection area and a finer display of the recent projection type display, an accurate gradation display reducing an irregular color and a color shift of the display images on the screen has been particularly required. However, a situation is discovered by the present inventors that even if methods based on the above-mentioned prior art are used, the enough gradation display, the irregular color or the color shift can not be reduced. These disadvantages are produced because undesired light is illuminated to the p-Si TFT channel area provided at each pixel of the liquid crystal panel in the liquid crystal light valve, and a flow of a leak current is produced. As a result, an applied voltage to each pixel of the liquid panel varies and can not display the original gradation.

Here, a structure of the liquid crystal panel using the p-Si TFT as the switching device is described with reference to FIG. 31. FIG. 31 shows a partial lateral cross-sectional view of one pixel area of the liquid crystal panel. Without being limited to the liquid crystal panel of the projection type display, in the liquid crystal display, of an active matrix type generally using a switching device 104, the switching device 104 is formed for each pixel on an array substrate 100 formed by a transparent glass substrate, as shown in FIG. 31. A display electrode 110 made of a transparent electrode such as ITO (indium-tin-oxide) via an insulation film 108 is formed on the pixel area of the array substrate 100. Also, an opposing substrate 102 formed by the transparent glass substrate facing the array substrate 100 with a predetermined cell gap is provide and a common electrode 112 made of the transparent electrode such as the ITO or the like is formed on the array substrate side of the opposing substrate 102. A liquid crystal 106 is sealed in the TN liquid crystal layer between the array substrate 100 and the opposing substrate 102. Also, though the diagram is omitted, a orientation film made of, for example, polyimid or the like is formed at least on the contact surface between the transmission area of the array substrate 100 and the opposing substrate 102, and the TN liquid crystal layer, and the contact surface is rubbed to define the orientation direction of the above-mentioned liquid crystal molecules.

The switching device 104 shown in FIG. 31 is the p-Si TFT and n-type polysilicone layers 120 and 126 forming a drain area and a source area on the array substrate 100, and a polysilicone layer 124 functioning as a channel layer between the drain area and the source area are formed. On the polysilicone layer 124, a gate insulation film 122 made of, for example, $SiO_2$ (Silicone Oxide film) is formed and a gate electrode 128 is formed on the gate insulation film 122. Further, on the n-type polysilicone layer 120 forming the source area, a source electrode 130 made of, for example, Al (Aluminum) is formed, and the display electrode 110 is formed on the n-type polysilicone layer 126 forming the drain area.

Also, on the opposing substrate 102 above the p-Si TFT, a shading film (black matrix) 114 to shield the incident light from outside the opposing substrate 102 is formed.

In the liquid crystal panel, such as the above structure, the array substrate 100 side is arranged facing the side of the dichroic prism 14 and the incident light from the light source 1 through the dichroic mirrors 4 and 6 is incident on the opposing substrate 102 side. In such an arranged structure of the liquid crystal panel, the incident light from the opposing substrate 102 side is shielded in order not to illuminate the switching device 104 in the liquid crystal panel by the shading film 114 provided on the opposing substrate 102 side.

However, when a stray light in the projection type display or an undesired light with a deviated wave-length is incident on the dichroic prism 14 and incident on the liquid crystal panel from the array substrate 100 side, the stray light or the undesired light illuminates the rear of the switching device 104 which does not form the shading film thereon. Therefore, a leak current is generated to set the switching device 104 to an on-state, and a voltage is applied between the display electrode 110 and the common electrode 112, therefore the orientation of the liquid crystal molecules at the area varies and an accurate gradation display can not be performed. Particularly, with the p-Si TFT superior in response, the leak current due to a shorter wavelength light can not be neglected. If the light separation characteristic of the dichroic prism 14 is perfect, the undesired shorter wavelength light incident on the dichroic prism 14 from the liquid crystal light valve 21B for blue, from which the light in blue band on the shorter wavelength side exits, is almost reflected by the dichroic surface 14a and is not incident on the liquid crystal light valves 21R and 21G for red and green, so that no undesired leak current is produced to each TFT.

However, when the undesired shorter wavelength from the liquid crystal light valves 21R and 21G for red and green, from which the light in the red band or the green band longer in wavelength than the blue color band exits, is incident on the dichroic prism 14, the undesired shorter wavelength passes through the dichroic surface 14b or is reflected thereby, and is incident on the liquid crystal light valve 21B for blue. As a result, the undesired leak current is generated to the p-Si TFT of the liquid crystal light valve 21B for blue.

FIG. 32 shows a light resistance of the p-Si TFT. A lateral axis indicates the quantity of white light incident on the liquid crystal panel in logarithmic display and a vertical axis indicates the extent of an error of the gradation display of the liquid crystal panel based on the leak current generated at the p-Si TFT as the quantity of leak. The quantity of the incident white light is the total quantity of red, green, and blue and the ratio of the quantity of light is (red:green:blue=3:12:1). In the diagram, a leak quantity characteristic at the liquid crystal light valve 21B for blue is indicated by a thick solid line (B), a leak quantity characteristic at the liquid crystal light valve 21R for red is indicated by a dashed line, and a leak quantity characteristic at the liquid crystal light valve 21G for green is indicated by a thin solid line. As is clear from FIG. 32, it will be understood that as with any liquid crystal light valve, although the quantity of leak increases along with an increase of the quantity of light incident on the liquid crystal panel, the increase of the quantity of leak at the liquid crystal light valve 21B for blue is particularly remarkable. For example, taking an example of a projection type display having the quantity of light incident on the liquid crystal panel equal to 5000000lx, the quantity of leak at the liquid crystal light valve 21B for blue is 1.25 which is larger than the quantity of light of the liquid crystal light valve 21R or 21G for red or green which is 0.7~0.75, thereby producing a larger gradation change. Thus, when a balance between the gradations of red, green, and blue is broken without any relationship with the original modulation signal by the influence of the undesired light, a problem of a deteriorating display quality occurs because a light color synthesized by the dichroic prism 14 differs from a desired color.

In addition, the light emitted from the conventional liquid crystal projector to the screen is converted by the polarization converting device and the like. One of the three primary colors, for example, is emitted as a polarized light vibrating in the horizontal direction with respect to the screen while the other two colors are emitted as polarized lights vibrating in the vertical direction with respect to the screen. However, since almost all screens, including a projection screen composed of a combination of a lenticular lens and a Fresnel lens, differ in scattering characteristic depending upon the polarizing direction, the white balance is broken, thereby causing problems such as a generation of the irregular color on the screen or the color shift which changes the color depending upon the viewing position.

Also, in the projection type display shown in FIG. 30, since images are synthesized by the dichroic prism 14 which is a block of glass, none of the transmission, distortion of the reflection surface, and arrangement displacement is produced as compared with the dicroric mirror composed of plates and therefore the generation of a picture displacement can be prevented. However, another problem, that of the light path lengths of colors from each of the light source 1 to each of the light valves 21R, 21G, and 21B for respective colors become different, is produced. In FIG. 30, since the light path of red is longer than the light paths of green and blue, the balance of the quantity of red, green, and blue lights is deviated, so producing a problem that chromaticity is deviated when the combination display such as a white display by the projector is performed.

On the other hand, as shown in FIG. 33, after separating the light from the light source 1 into red, green, and blue by two dichroic mirrors 140 and 142 and a total reflection mirror 144, the conventional projection type display modulates the image by illuminating the three lights on the three liquid crystal panels 156R, 156G and 156B respectively. Then, after the three colors are synthesized into an image by two dichroic mirrors 148 and 150 and a total reflection mirror 146, the three colors are enlarged and projected by the projection lens. It should be noted that the respective light valves 21R, 21G and 21B of the projection type display shown in FIG. 33 are composed of condenser lenses 152R, 152G and 152B, incident polarizing plates 154R, 154G and 154B, liquid crystal panels 156R, 156G and 156B, and exiting polarizing plates 158R, 158G and 158B.

A projection type display shown in FIG. 33 is problematic in that the image displacement at the time of a image synthesis and a defect called a pixel displacement on the enlarged projection image created by the projection lens are easily produced, when distortions on the transmission or reflection surface, or a displacement produced during the arrangement, generate to the dichroic mirror 148 and 150 or to the total reflection mirror 146, which synthesize the images for respective colors modulated in image by the respective light valves 21R, 21G, and 21B.

To prevent these mirror distortions and displacements, a thicker mirror or an improvement of the mirror mounting method is required. However, when the mirror is made thicker, the problem, that an aberration of the transmission image light is enlarged, is produced. Also, the improvement of the mirror mounting method produces other problems such as high accuracy and high price of fixtures.

In addition, the projection type display for displaying the display of a personal computer, video or the like on the large screen is required to have finer display pixels along with finer signal source. Therefore, as has been described, a method which uses a white light power source in the projection type display, separates the white light into the three primary colors and synthesizes is the mainstream. The liquid crystal panel is required to be formed as small as possible for finer display and an improvement in portability. A greater pixel number is required as well. In proportion to the miniaturization of the pixel pitch, an improvement in display quality is required by making an astigmatism as small as possible. Therefore, a projection type display which sandwiches a dichroic mirror for total color synthesis by glasses to form a prism is also proposed (Japanese Patent Application No. 10-120568). FIG. 34 shows this proposed projection type display. A white light of a non-polarized light emitted from a light source 221 is separated by dichroic mirrors 224 and 229, and each of the separated green, red and blue lights is incident on liquid crystal panel 231, 230 or 226 by passing through each polarizing plate. Each of the red, green, and blue lights becomes a p-polarized light passing through the exit side polarizing plate after being space-modulated by each liquid crystal panel. Then, each light is synthesized through a dichroic mirror 228, a mirror 233 and a dichroic prism 234, and then reaches a projection lens 235.

In a p-polarized light synthesis, a reflection characteristic of the dichroic prism is low due to the character of the dichroic prism 234, thereby causing problems that the quantity of the red and blue lights reflected by the dichroic prism 234 reduces and the display quality of the projected images drops due to a broken balance of the quantity of each color light.

SUMMARY OF THE INVENTION

An object of the present invention is to provide a projection type display which is superior in gradation display and high in quality.

The above object is achieved by a projection type display comprising three light valves which have a polarizing plate at least on each exiting side thereof to modulate and emit each light of color components of red, green, and blue, a color synthesizing optical system to synthesize respective exiting lights from the light valves, and a polarization converting unit which sets a polarizing direction of the exiting light of the blue component among the three respective exiting lights substantially orthogonal to polarizing directions of other two exiting lights.

According to this structure, even if the exiting light of the red or green component is incident on the color synthesizing optical system having a linear polarization with a predetermined polarizing direction and the exiting light includes the undesired light (unnecessary light) having a shorter wavelength, only the linearly polarized light having a polarizing direction substantially orthogonal to the predetermined polarizing direction can pass through the light valve for blue to emit the light of the blue component due to a polarizing plate 20Bp, thereby preventing an entry of the undesired light. Therefore, when the light valve has a switching device for a light modulation, the light valve prevents a leak current from being generated and a superior gradation display can be performed.

Also, When an exiting light of the blue component including the undesired light is incident on the color synthesizing optical system, the undesired light exits the color synthesizing optical system together with the blue component because the blue component is on the relatively shorter wavelength side. Originally, a deterioration of a display quality by the undesired light is low. However, only the linearly polarized light having the polarizing direction substantially orthogonal to the predetermined polarizing direction can pass the light valves for red and green to emit the red or green component due to a polarizing plate 20Rp or 20Gp, therefore the entry of the undesired light can be surely prevented.

One of the aspects in the projection type display of this invention, the light valve comprises an active matrix type liquid crystal panel having a plurality of switching devices formed at respective pixel areas. Also, the switching device is made of polysilicone TFT. Furthermore, the liquid crystal panel is a transmission type liquid crystal panel to modulate the transmission light. According to this structure, a high quality image display can be performed to the switching device in the liquid crystal panel to modulate the incident light for obtaining desired images by preventing the leak current from being generated by the undesired light. Since the polysilicone TFT has low light resistance against the shorter wavelength light, the light leak of the liquid crystal panel using the polysilicone for the switching device is suppressed to minimum and preferable images with a quick response can be achieved. Also, since this invention operates extremely effective for preventing the undesired light which is incident from the rear side of the switching device provided in the transmission type liquid crystal panel, a shielding film and the like to intercept the undesired light are not required to be formed on the rear side of the transmission type liquid crystal panel, so that the conventional transmission type liquid crystal panel can be used as a structural element of the light valve.

Further, a projection type display of the present invention has a light source emitting a light including respective components of red, green, and blue, and a dichroic mirror to separate the light from the source into the respective color components. Among the respective polarizing plates, the polarizing plate to pass the incident light of the blue component is arranged to have the transmission axis substantially orthogonal to a transmission axis of the polarizing plate to pass the other two incident lights. A polarization converting unit has a feature that the emitted light from the light source is incident on the respective light valves after setting the polarizing direction of the blue component of light orthogonal to the polarizing directions of the other two color component lights. According to this structure, an advantage of the present invention that any optical devices are not required to be arranged between the polarizing plate provided on the exiting side of each light valve and the color synthesizing optical system can be achieved.

On the other hand, by arranging the transmission axes of the respective polarizing directions parallel to each other viewed from the traveling direction of each transmission axis, the polarization converting unit can also have a polarization converting device provided between the polarizing plate to pass the exiting light of the blue component and the color synthesizing optical system. On the other hand, arranging the transmission axes of the respective polarizing directions parallel to each other viewed from the traveling direction of each transmission axis, the polarization converting unit can have a polarization converting device provide between the color synthesizing optical system and each of two polarizing plates to pass the exiting lights of the red and green components. These structures have an advantage that the effect of the present invention can be achieved only by arranging the polarization converting device between a polarizing plate 1 or 2 provided on the exiting side of each valve and the color synthesizing optical system.

Also, the projection type display of the present invention is arranged to set transmission axes of the respective polarizing plate parallel to each other viewed from the traveling direction of each transmission light, where the polarization converting unit has the polarization converting device provided between the color synthesizing optical system and each of the polarizing plates to set the polarizing direction of the exiting light of the blue component orthogonal to the polarizing direction of the exiting light of the red and green components.

In the above projection type display, the polarization converting device is a half-wave plate. Also, the polarization converting device can be a liquid crystal panel which sets the polarizing direction of the exiting light of the blue component orthogonal to the polarizing directions of the exiting lights of the other two components. Further, in the projection type display of the present invention, the polarization converting unit can have the liquid crystal panel provided between the color synthesizing optical system and each of the polarizing plates to pass the exiting light of each color component.

Also, in the projection type display of the present invention, the light valve emitting the modulated light of the blue component can be arranged at the position where the exiting light passes through the color synthesizing optical system. In this case, a better-balanced color synthesis can be realized when the exiting light of blue has the p-polarization with respect to the color synthesizing optical system and the other two lights have the s-polarization, thereby resulting in a high quality image display.

Above object is achieved by a projection type display which comprises three light valves having the polarizing plate at least on each exiting side, modulating and emitting light of each color component of red, green, and blue respectively, the color synthesizing optical system to synthesize each exiting light from each light valve, a projection lens to project the synthesized light on a screen, and a polarization converting unit to convert the light polarization of each color component for equalizing a ratio of the quantity of light at least between the quantity of light in the parallel direction and the vertical direction for each color on the screen.

In the projection type display of the present invention, the polarization converting unit converts each synthesized light to a circularly polarized light. The polarization converting unit has a quarter-wave plate arranged on the exiting side of the color synthesizing optical system. Also, the quarter-wave plate has an optic axis of substantially 45 degrees with respect to an transmission axis or absorption axis of the polarizing plate.

According to this structure, though each of image lights synthesized by the color synthesizing optical system is linearly polarized light, each of the image light is converted to the circularly polarized light by the polarization converting unit, before the image light is incident on a projection lens. Therefore, the image light which is scattered by the projection lens and then exits are projected on a screen as the circularly polarized light. For example, when the screen is composed of the combination of a Flesnel lens and a lenticular lens, a problem that a color tone of the images varies depending on viewing angles due to the difference of refracting characteristics at the screen if the respective lights of red, green, and blue are linearly polarized lights, is occurred. However, the image light transmitted from this structure of the present invention does not occur any such problems, therefore providing high quality images. Also, the quarter-wave plate can be used as the linear polarization converting devise.

One of the aspects in the projection type display of the present invention, the polarization converting unit converts each of the synthesized lights to a linearly polarized light so that a bisector of an angle, formed by the polarizing directions of the lights between one color component and the other color components, is substantially identical to one of the horizontal line and the vertical line. Also, the polarizing direction of the light of one color component is orthogonal to the polarizing directions of the lights of the other color components by the polarization converting unit. Further, the polarization converting unit has a half-wave plate arranged on the exiting side of the color synthesizing optical system. Furthermore, the half-wave plate has an optic axis which is inclined by approximately 22.5 degrees with respect to the transmission axis or the absorption axis of the polarizing plate.

Also, a projection type display of the present invention has the screen on which the light exiting the projection lens is incident, wherein the screen has the Flesnel lens and the lenticular lens. From this structure, the ratio of the intensity of the light between the horizontal component and the vertical component for the three primary colors can be set substantially identical in the three primary colors. So, a screen light distribution characteristic of the three primary colors become identical on the screen, thereby displaying the high quality images with a high illumination without color variations and color shifts.

Next, the principle of a projection type display without a pixel displacement and the color variations realized according to the present invention is described with reference to FIG. 13. This projection type display includes the light source 1, a first dichroic mirror 140', a second dichroic mirror 142', a total reflection mirror 144', respective light valves 21R, 21G and 21B, a first dichroic prism 160, a second dichroic prism 162, a total reflection prism 164 and the projection lens 16.

In this invention, light paths in the color separating optical system from the light source 1 to the respective light valves 21R, 21G and 21B for each color can be made substantially identical with the conventional paths shown in FIG. 33, therefore the chromaticity variations caused by the light path difference in the projection type display shown in FIG. 30 of the conventional example are not produced.

The color synthesizing optical system from the respective light valves 21R, 21G and 21B to the projection lens 16 is composed of only the first dichroic prism 160, the second dichroic prism 162, and the total reflection prism 164, so that the distortion on the mirror surface and the position displacement is hard to occur, thereby preventing the pixel displacement produced in the conventional example in FIG. 33.

However, the prism using a glass block has a problem that the price is more expensive than the dichroic mirror having a filter on a glass plate. Particularly, when a band-pass filter which passes or reflects only the light in the wavelength range having a visible light area is used, a film structure to obtain preferable filter characteristics becomes complicated and more expensive. Further, a problem that a manufacturing yield rate decreases to satisfy the specifications is produced, thereby resulting in a higher price. Therefore, being different from that in FIG. 33, in this invention, green and red are first synthesized by the first dichroic prism 160 and then synthesized with blue by the second dichroic prism 162. That is, the color separation and synthesis is performed only by the low-pass filter or the high-pass filter. The above object is achieved by a projection type display comprising a color separating optical system which has at least a dichroic mirror and separates an emitted light from a light source into respective lights of color components of red, green and blue, and three light valves which have at least a polarizing plate on each light exiting side thereof, modulate the light of each color component of red, green, and blue, and a color synthesizing optical system to synthesize each exiting light from each light valve, wherein the color synthesizing optical system comprises at least one dichroic mirror contacting both surfaces with solid or liquid, wherein the dichroic mirror of the color separating optical system and the color synthesizing optical system comprises a low-pass filter or a high-pass filter. By this structure, a projection optical system, which is small in cost increase, is realized without the above chromaticity variations and pixel displacement.

One of the aspects in the projection type display of the present invention, a light reflected by the dichroic prism within the synthesized light is made to be the s-polarized light to remove the reflection of the p-polarized light having a low dichroic prism reflection characteristic. When the light passing through the dichroic prism is converted to the s-polarized light as is the case of the reflection light, a cut-off wavelength to switch the transmission and reflection on the dichroic surface is deviated due to light having an angle with respect to the optical axis or the manufacturing error of the dichroic prism. To prevent these deviations of the projection display colors caused by the deviation of the reflection and transmission color in the dichroic prism, the transmission light is made insensitive to the deviation of the cut-off wavelength of the dichroic prism, by converting the polarizing direction of the transmission light having a wavelength close to the wavelength of light reflected by the dichroic prism to the p-polarization.

Thus, by converting the reflection light in the dichroic prism to the s-polarized light and the transmission light close to this reflection light to the p-polarized light, a color synthesis which is not dependent on the deviations of the dichroic prism cut-off wavelength is achieved, thereby improving the display quality of the images.

Also, along with above conversions, the brighter projection display images are obtained by the adjustment of the polarizing directions during the color separation and synthesis by designing the optical members matching to the above conversion.

BRIEF DESCRIPTION OF THE DRAWINGS

FIG. 6 shows a schematic structure of a projection type display according to a second embodiment of the present invention.

DETAILED DESCRIPTION OF THE PREFERRED EMBODIMENTS

A projection type display according to a first embodiment of the present invention is described with reference to FIG. 1 through FIG. 5. First, a schematic structure of the projection type display according to this embodiment is described with reference to FIG. 1. A projection optical system of the projection type display in this embodiment of the present invention has, for example, a light source 1 with a lamp secured at the first focal point of an elliptical mirror in which the inner surfaces are provided with mirror finish. A white light including red, green, and blue which are emitted from the light source 1 is reshaped substantially to a parallel light through a reshaping optical system, omitted in the diagram, and is incident on a polarization converting device 2. In this example, the white light from the light source 1 is incident on the polarization converting display 2, and converted to a linearly polarized light (p-polarization) having a polarizing direction (in diagram, shown by arrows) parallel to this page, and incident on a dichroic mirror 4.

Figure 1:
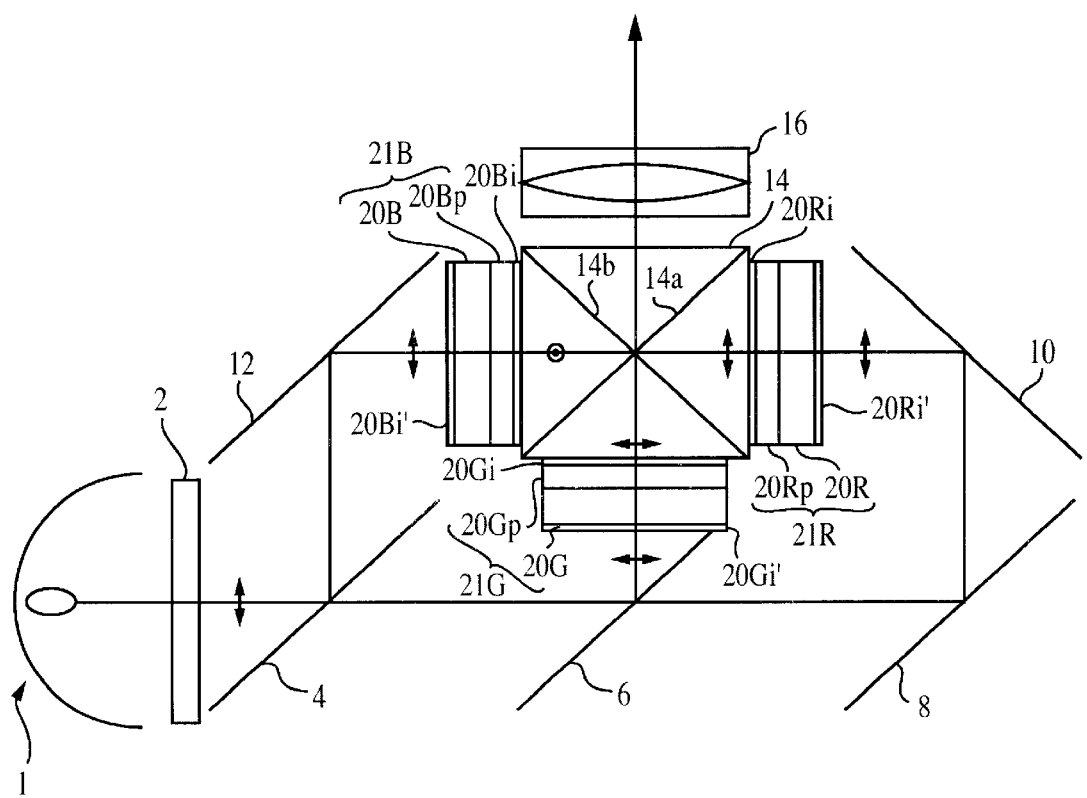
FIG. 1 shows a schematic structure of a projection type display according to a first embodiment of the present invention.

The dichroic mirror 4 is formed to reflect light in the blue color band in the incident white light and passes other lights. So, the light in the blue color band is reflected by the dichroic mirror 4, then reflected by a mirror 12, incident on a half-wave plate 20Bi' for rotating the polarizing direction by 45 degrees. After that, the blue light is incident on a liquid crystal panel 20B, having a polarizing direction substantially identical to a direction of an orientation direction of liquid crystal molecules on a light incident side of a liquid crystal panel 20B in the a liquid crystal valve 21B for blue. The liquid crystal light valve 21B for blue is composed of the transmission type liquid crystal panel 20B and a polarizing plate 20Bp. Generally, although a liquid crystal light valve having a structure, in which both surfaces of the liquid crystal panel are sandwiched by polarizing plates is used, in this embodiment as shown in FIG. 1, the polarizing plate 20Bp is provided on the exiting side of the liquid crystal panel 20B, and the polarization converting device 2 common with other liquid crystal light valves 21R and 21G are arranged on the incident side in the vicinity of the light source 1. In addition, as the liquid crystal light valve, there are transmission type liquid crystal light valve, which passes a light directed from the light source 1 and projects images on a screen (not shown), and a reflection type liquid crystal light valve which reflects the light from the light source 1 and projects the images on the screen. The projection type display of this embodiment shown in FIG. 1 uses the transmission type liquid crystal light valve.

Figure 30:
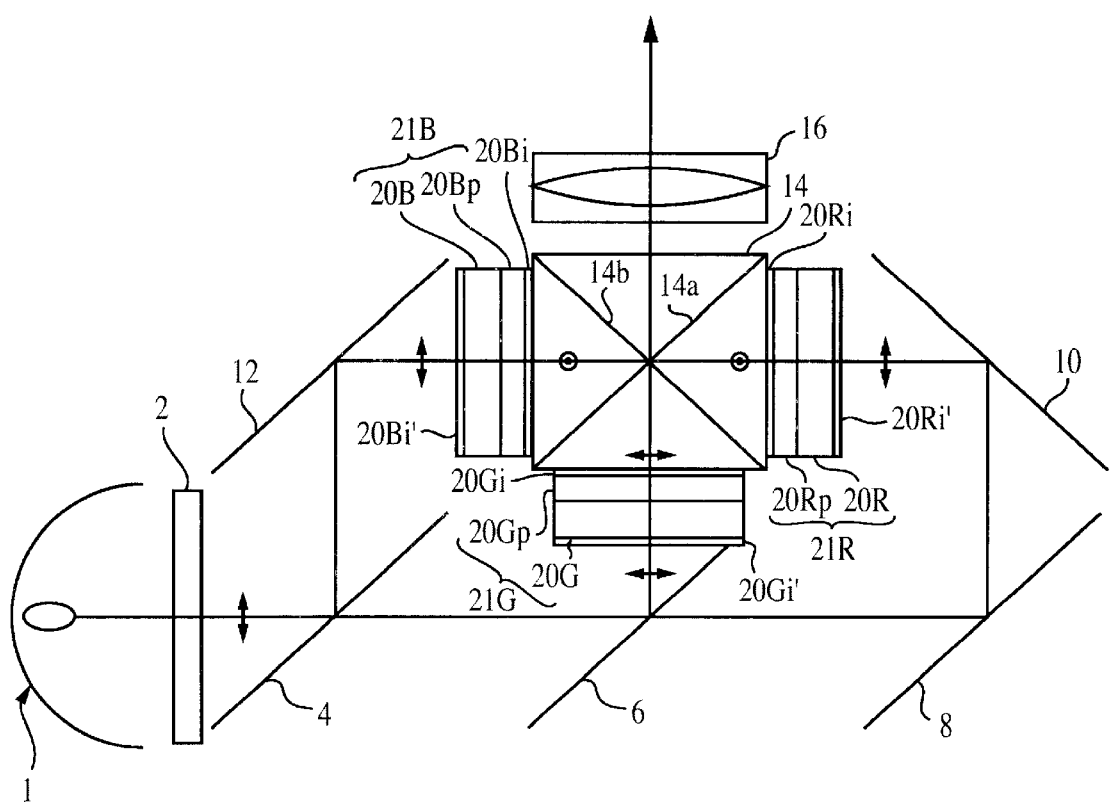
FIG. 30 is a diagram showing the conventional projection type display.
Figure 31:
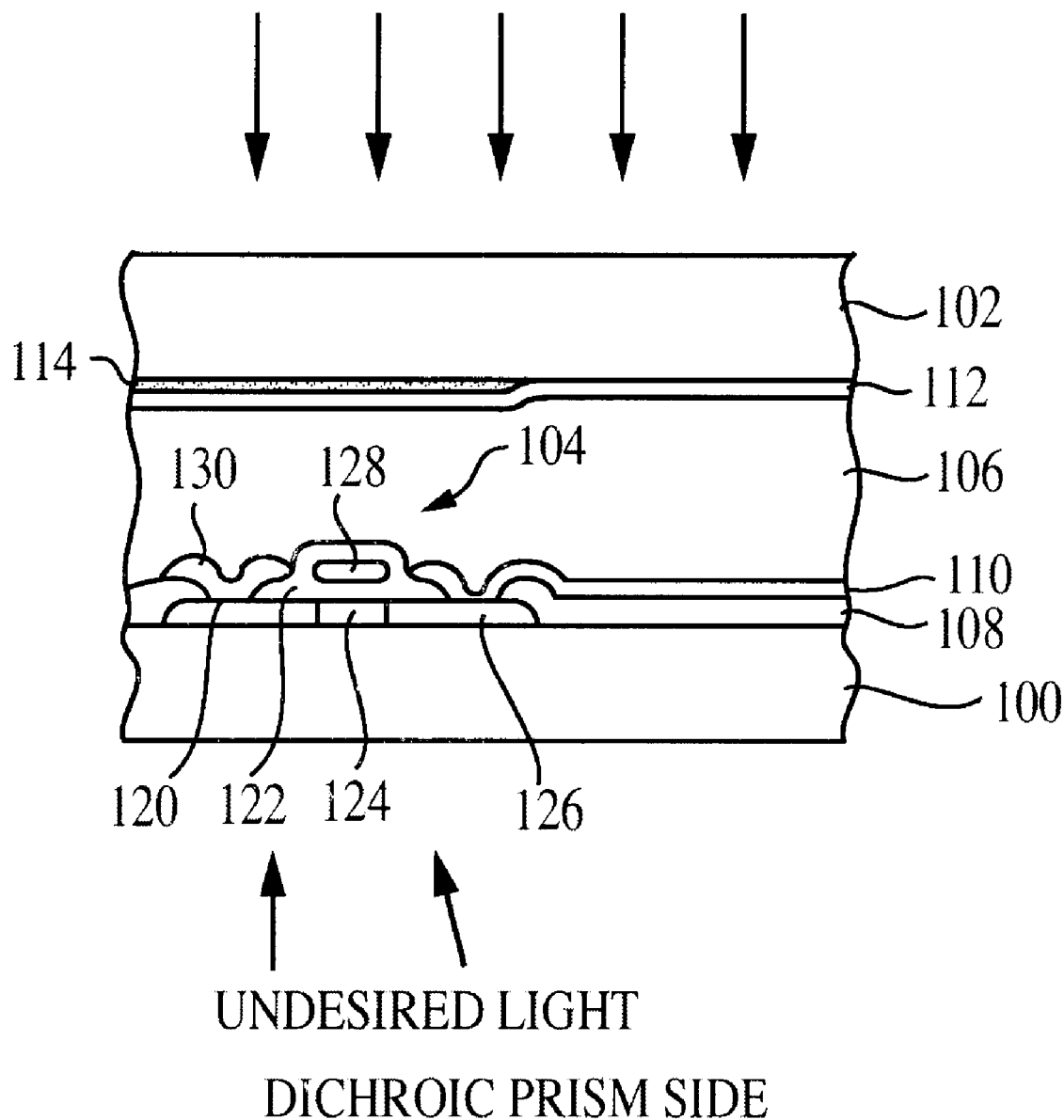
FIG. 31 is a diagram showing a structure of a liquid crystal panel.

Thus, the light in the blue band which reaches the liquid crystal light valve 21B for blue is first incident on the liquid crystal panel 20B. The liquid crystal panel 20B, similar to the liquid crystal panel described above with reference to FIG. 30, has a liquid crystal panel structure of an active matrix type having a plurality of pixel areas where p-Si TFT is formed as the switching device. Therefore, the light in the blue band is incident toward a liquid crystal layer 106 from an opposing substrate 102 side.

The array substrate 100 side, which is an exiting side substrate of the liquid crystal panel 20B, is rubbed in the direction orthogonal to the orientation direction of the liquid crystal molecules on the opposing substrate 102 side which is the incident side substrate. Therefore, a TN liquid crystal layer is formed on the liquid crystal panel 20B. The incident light on the liquid crystal panel 20B is modulated depending on image signals applied to each p-Si TFT of a plurality of the pixel areas, and exits the polarizing plate 20Bp. A light transmission axis of the polarizing plate 20Bp is set substantially identical to the orientation direction of the liquid crystal molecules on the substrate side of the exiting side of the liquid crystal panel 20B. So that, the liquid crystal panel 20B is driven by a so-called normally white type which obtains a maximum light transmissivity under a condition where no voltage is applied to the TN liquid crystal layer of the pixel area. The blue light exiting the polarizing plate 20Bp is in turn incident on a half-wave plate 20Bi and then the polarizing direction of the blue light is converted to a polarizing direction perpendicular to this page. The blue light is then incident on a dichroic surface 14a as a s-polarized light, reflected thereby, and exits from the dichroic prism 14 to be directed toward a projection lens 16.

Next, the lights passing through the dichroic mirror 4 are described. Among the lights passing through the dichroic mirror 4, light in the green color band is reflected by a dichroic mirror 6 while light in the red color band is passed thereby. The light in the green color band reflected by the dichroic mirror 6 is incident on a half-wave plate 20Gi', then rotated in the polarizing direction by 45 degrees, and incident on a liquid crystal panel 20G having a polarizing direction substantially identical to the orientation direction of the liquid crystal molecules on the substrate side of the incident side of the liquid crystal panel 20G in a liquid crystal light valve 21G for green. The liquid crystal light valve 21G for green has the transmission type liquid crystal panel 20G and a polarizing plate 20Gp having the same structure as the liquid crystal light valve 21B for blue. The light in the green band reaching the liquid crystal light valve 21G is first incident on the liquid crystal panel 20G. The liquid crystal panel 20G also has, similar to the liquid crystal panel described in FIG. 30, the liquid crystal panel structure of the active matrix type having a plurality of the pixel areas where the p-Si TFT is formed as the switching device, and the light in the green band is incident toward the liquid crystal layer 106 from the opposing substrate 102 side in FIG. 30.

The array substrate 100 side, which is an exiting side substrate of the liquid crystal panel 20G, is rubbed in the direction orthogonal to the orientation direction of the liquid crystal molecules on the opposing substrate 102 side which is an incident side substrate. Therefore, a TN liquid crystal layer is formed on the liquid crystal panel 20G. The incident light on the liquid crystal panel 20G is modulated corresponding to image signals applied to each p-Si TFT of a plurality of the pixel areas and exits a polarizing plate 20Gp. A transmission axis of the polarizing plate 20Gp is set substantially identical to the orientation direction of the liquid crystal molecules on the substrate side of the exiting side of the liquid crystal panel 20G. Therefore, the liquid crystal panel 20G is driven by the so-called normally white type which obtains the maximum transmissivity under the condition where no voltage is applied to the TN liquid crystal layer of the pixel area. The green exiting the polarizing plate 20Gp is then incident on a half-wave plate 20Gi and the polarizing direction is converted to a polarizing direction parallel to this page, thereby being incident on the dichroic prism 14 as the p-polarized light. The green light incident on the dichroic prism 14 passes through dichroic surfaces 14a and 14b, exits the dichroic prism 14, and is directed to the projection lens 16.

Also, the red light passing through the dichroic mirror 6 is reflected by mirrors 8 and 10 and incident on a half-wave plate 20Ri'. Then polarizing direction of the red light is rotated 45 degrees. Thus, the red light is incident on the liquid crystal panel 20R having a polarizing direction substantially identical to the orientation direction of the liquid crystal molecules on the substrate side of the incident side of a liquid crystal panel 20R in the liquid crystal light valve 21R for red. A liquid crystal light valve 21R for red has the transmission type liquid crystal panel 20R and a polarizing plate 20Rp having the same structure as the liquid crystal light valve 21B for blue. The light in red band reaching the liquid crystal light valve 21R for red is first incident on the liquid crystal panel 20R. Similar to the liquid crystal panel described with reference to FIG. 30, the liquid crystal panel 20R also has the structure of the active matrix type liquid crystal panel having a plurality of the pixel areas, where the p-Si TFT is formed as the switching device, and the light in the red band is incident toward the liquid crystal layer 106 from the opposing substrate 102 side in FIG. 30.

The array substrate 100 side which is a exiting side substrate of the liquid crystal panel 20R is rubbed in the direction orthogonal to the orientation direction of the liquid crystal molecules on the opposing substrate 102 side which is an incident side substrate. Therefore the TN liquid crystal layer is formed on the liquid crystal panel 20R. The light incident on the liquid crystal panel 20R is modulated corresponding to the image signal applied to each p-Si TFT of a plurality of the pixel areas and then exits the polarizing plate 20Rp. The transmission axis of the polarizing plate 20Rp is set substantially identical to the orientation direction of the liquid crystal molecules on the substrate side of the exiting side in the liquid crystal panel 20R. Therefore, the liquid crystal panel 20R is driven by the so-called normally white type which obtains the maximum transmissivity under the condition where no voltage is applied to the TN liquid crystal layer of the pixel area. The red light exiting the polarizing plate 20Rp is in turn incident on the half-wave plate 20Ri, which is the polarization converting device in this embodiment, converted in the polarizing direction perpendicular to this page, and incident on the dichroic prism 14 as the polarized light. The red light incident on the dichroic prism 14 is reflected by the dichroic prism surface 14b, and directed to the projection lens 16.

In this way, the blue and red lights reflected by the dichroic prism 14 and the green light passing through the dichroic prism 14 are synthesized, exit therefrom and enlarged by the projection lens 16, thereby projecting color images on the screen not shown.

Meanwhile, in the above structure, on the assumption that undesired light having a shorter wavelength mingles with the light incident on the dichroic prism 14 from the liquid crystal light valves 21R or 21B for red or green, this undesired light reaches the liquid crystal light valve 21B for blue after being transmitted or reflected instead of being reflected or transmitted by the dichroic surfaces 14a and 14b, which reflect or pass red or green, because the undesired light has a shorter wavelength. However, this undesired light has the polarizing direction parallel to this page, as is the case of red and green which are incident on the dichroic prism 14, so that the polarizing direction is rotated to be perpendicular to the transmission axis of the polarizing plate 20Bp and absorbed by the polarizing plate 20Bp when the undesired light is incident on the half-wave plate 20Bi on the liquid crystal light valve 21B side for blue. Therefore the undesired light does not leach the rear surface of the liquid crystal panel 20B. Thus, the generation of a leak current at the p-Si TFT of the liquid crystal panel 20B caused by this undesired light can be prevented.

It should be noted that although the half-wave plated is used as the polarization converting device in this embodiment, for example, a liquid crystal panel sealing a liquid crystal to rotate the incident light by a predetermined angle can be, of course, used instead of the half-wave plate.

Figure 2:
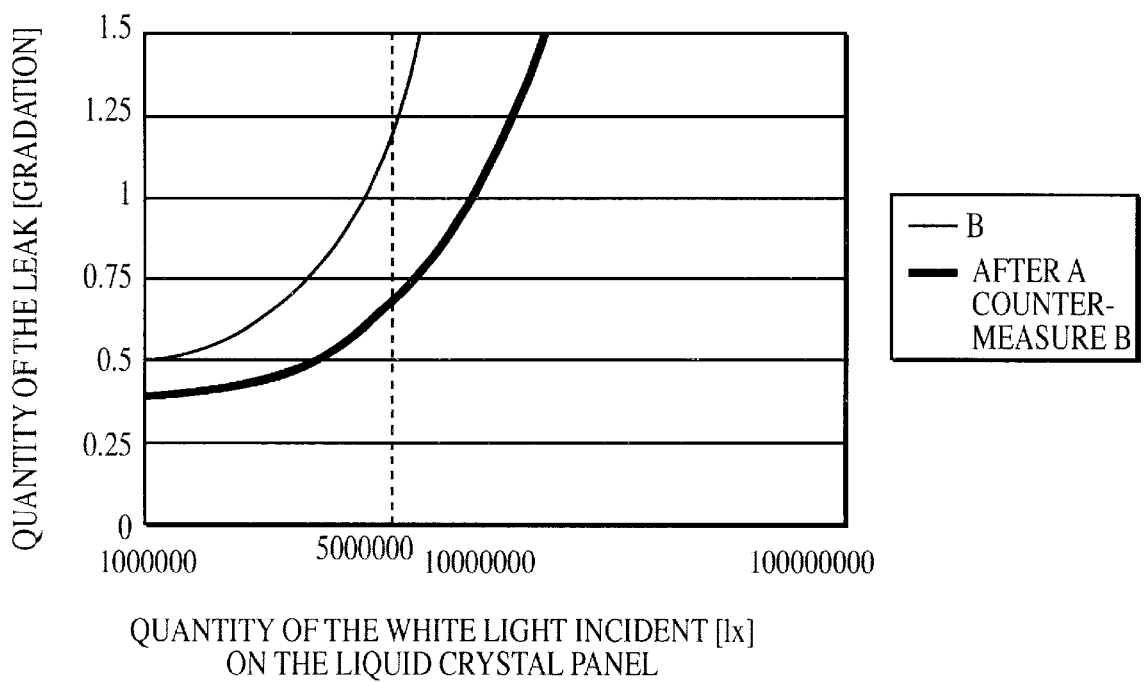
FIG. 2 shows an effect by a projection type display according to the first embodiment of the present invention.

Next, an effect achieved by the projection type display in this embodiment is described with reference to FIG. 2. FIG. 2 shows a light resistance of the p-Si TFT where the lateral axis indicates the quantity of the white light incident on the liquid crystal panel in logarithmic display and the vertical axis indicates the extent of the error of the gradation display of the liquid crystal panel based on the leak current generated at the p-Si TFT as the quantity of the leak. The quantity of the incident white light is the total quantity of red, green, and blue where the ratio of the quantity of light is (red:green:blue=3:12:1). In the diagram, a leak quantity characteristic at the liquid crystal light valve for blue of the conventional projection type display is indicated by a thin solid line (B), and a leak quantity characteristic at the liquid crystal light valve 21B for blue of this embodiment is indicated by a thick solid line (after a countermeasure B).

Figure 32:
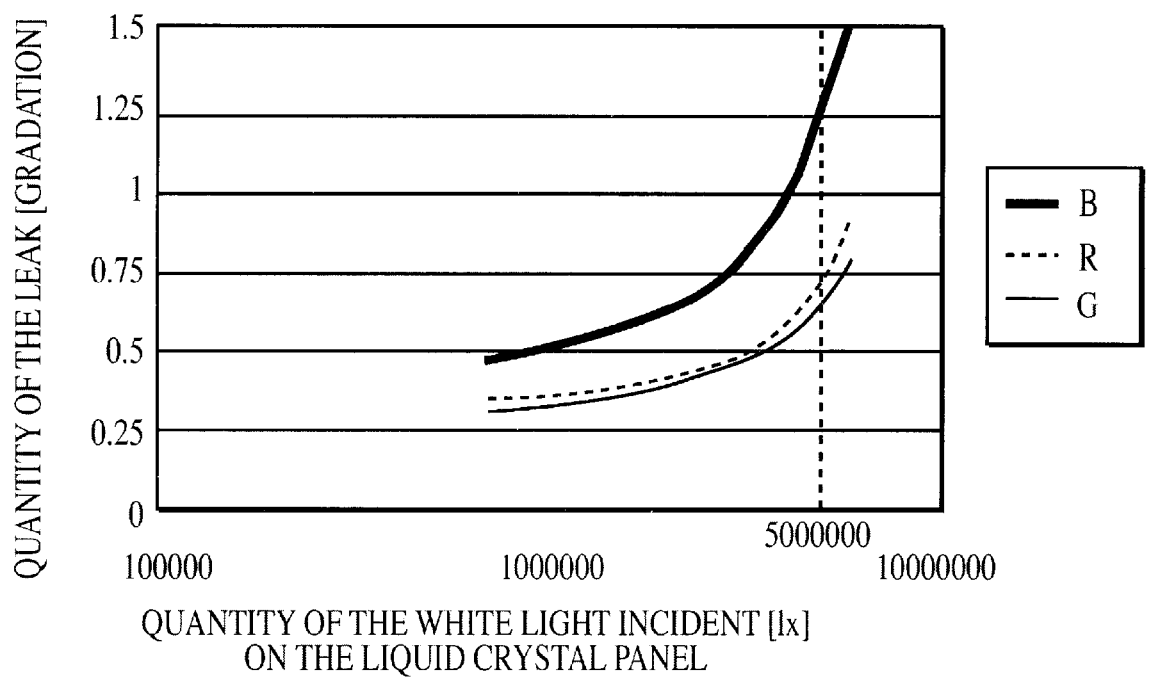
FIG. 32 is a diagram describing a problem generated in the conventional projection type display.
Figure 33:
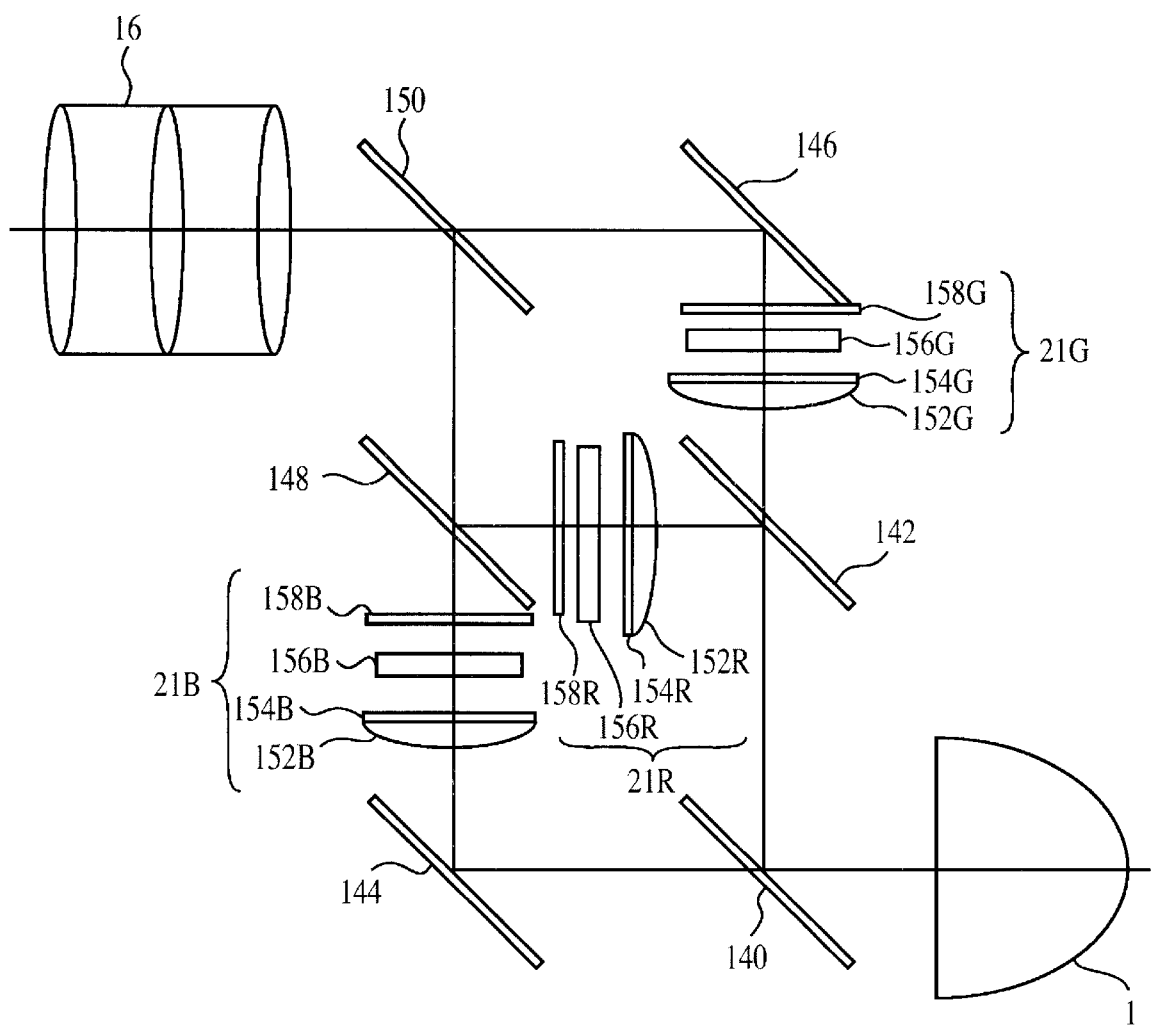
FIG. 33 is a diagram describing a problem generated in the conventional projection type display.
Figure 34:
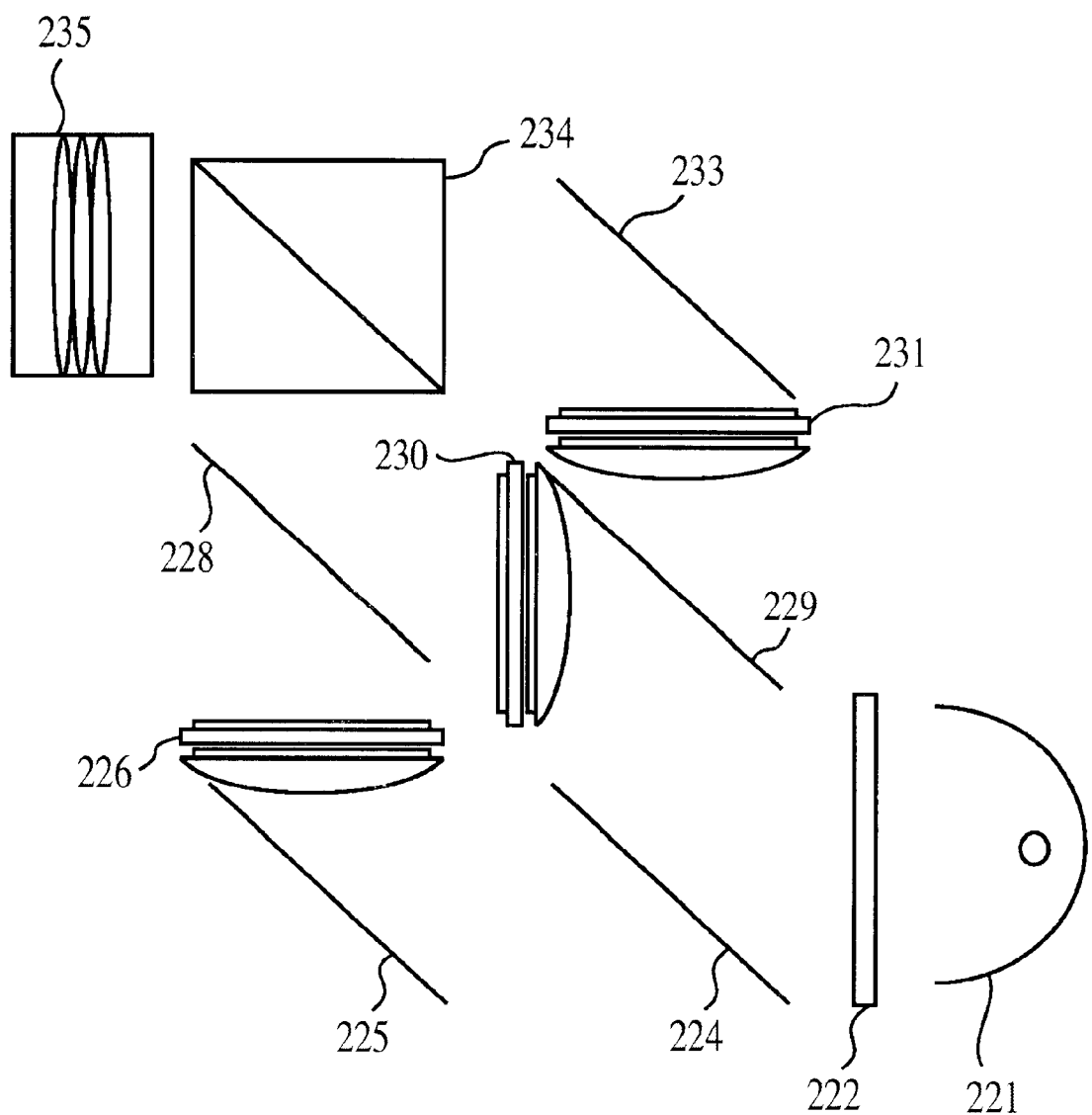
FIG. 34 is a diagram showing a schematic structure of a proposed projection type display.

As is clear from FIG. 2 with reference to FIG. 32, in both the conventional and the present embodiments, the leak quantity increases along with the increase of the quantity of light incident on the liquid crystal panel. However, taking an example where the quantity of light incident on the liquid crystal light valve is equal to 50000001x, it is understood that though the leak quantity by the liquid crystal light valve 21B for blue is, as shown in FIG. 32, is 1.25, the leak quantity by the liquid crystal light valve 21B for blue according to this embodiment significantly reduces to approximately 0.7. Since the leak quantity by the liquid crystal light valve 21B, equal to 0.7, is substantially the same as the leak quantity by the liquid crystal light valves for red and green shown in FIG. 32. Therefore, according to the projection type display of this embodiment, the balance of the gradations of red, green, and blue can be matched to the original conversion signal by reducing the influence of the undesired light, thus improving the display quality by changing the color of light, which is synthesized by the dichroic prism 14, to a desired color.

Although the diagram is omitted, when the incident light of a blue component, including the undesired light, is incident on the dichroic prism 14, the undesired light also exits the dichroic prism 14 along with the blue component because the blue component is relatively on the shorter wavelength side. Therefore, although the light valve 21R or 21G for the red or green originally produces only a little degradation in display quality by the undesired light, the light valve 21R or 21G for red or green, which exits the red or green component of the light passes only the linearly polarized light having the polarizing direction orthogonal to the polarizing direction of the undesired light, thereby surely preventing the entry of the undesired light.

In the projection type display of this embodiment, for example, viewed from the incident side, the directions of principal axes of the half-wave plate 20Ri',20Gi' and 20Bi' are arranged in the same direction, and the orientation directions of the liquid crystal molecules of the liquid crystal panels 20R, 20G and 20B and the directions of the transmission axes of polarizing plates 20Rp, 20Gp and 20Bp are arranged in the same direction (substantially parallel viewed from the incident side). The direction of the principal axis of the half-wave plate 20Bi as the polarization converting device is adjusted to convert the exiting light of the blue component to the s-polarized light by the dichroic prism 14. On the other hand, the directions of the principal axis of the half-wave plates 20Ri and 20Gi as the polarization converting devices are adjusted to convert the exiting lights of red and green to the p-polarized lights by the dichroic prism 14.

On the contrary, viewed from the incident side, the following arrangements can be taken as well. That is, the principal axes of the half-wave plates 20Ri' and 20Gi' for red and green are arranged in the same direction, the principal axis of the half wavelength of the blue color 20Bi' is adjusted in the other direction against the above axes, and the orientation directions of the liquid crystal molecule of the liquid crystal panels 20R, 20G and 20B and directions of the transmission axes of the polarizing plates 20Rp, 20Gp and 20Bp are adjusted and arranged corresponding to the directions of principal axes of the half-wave plates 20Ri', 20Gi' and 20Bi'. In this case, even if the directions of the half-wave plates 20Ri, 20Gi and 20Bi are arranged in the same direction on the exiting side, the exiting light of the blue component can be changed to the s-polarized light by the dichroic prism 14 and the exiting lights of the red and green components can be changed to the p-polarized lights by the dichroic prism 14.

Figure 3:
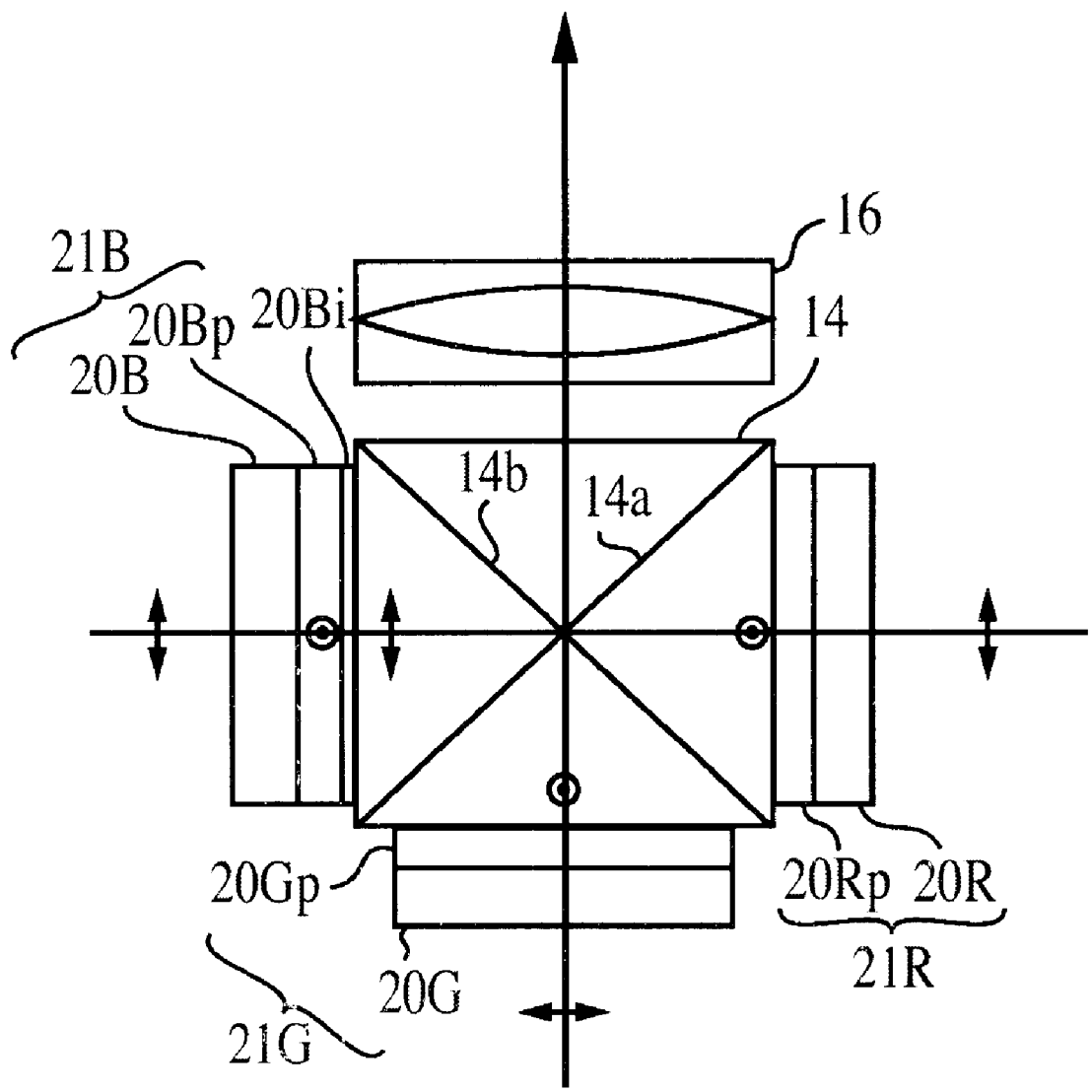
FIG. 3 shows another structure in the vicinity of a liquid crystal light valve and a dichroic prism of a projection type display according to the first embodiment of the present invention.

Further, a variety of deformations of the structure including the liquid crystal light valve and the dichroic prism of the projection type display according to the above mentioned embodiment can be made. For example, the structure shown in FIG. 3 is possible. In an example in FIG. 3, the liquid crystal panels 20R, 20G and 20B have the TN liquid crystal layers in which the orientation direction of the liquid crystal molecules is changed from parallel to perpendicular to this page, with respect to the traveling direction of the light from the light source 1. Therefore, the half-wave plates 20Ri', 20Gi' and 20Bi' provided in the projection type display in FIG. 1 are not required and therefore not arranged. In addition, the half-wave plate 20Bi is arranged on the exiting side of the liquid crystal light valve 21B for blue, that is, only between the polarizing plate 20Bp and the dichroic prism 14. Even in this structure, the light source 1, the polarization converting device 2, the dichroic mirrors 4~6 and the mirrors 10 and 12 can be used as is the case shown in FIG. 1. In this manner, the effect according to this embodiment shown in FIG. 2 can be achieved as well. Also, instead of arranging the half-wave plate 20Bi only on the exiting side of the liquid crystal light valve 21B for blue, the half-wave plate as the polarization converting device can be sandwiched between the dichroic prism 14 and each of the two polarizing plates 20Rp to achieve the similar effect.

Figure 4:
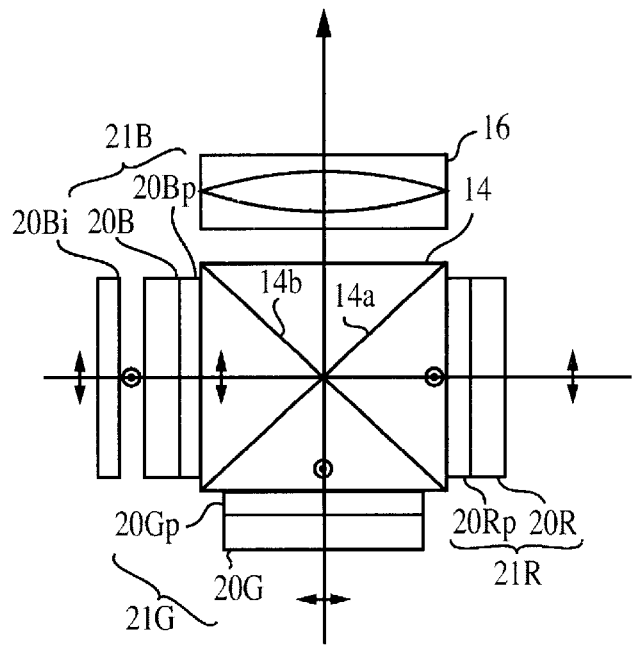
FIG. 4 shows still another structure in the vicinity of a liquid crystal light valve and a dichroic prism of a projection type display according to the first embodiment of the present invention.

Further, the projection type display according to this embodiment can be structured as shown in FIG. 4 as a deformation example of the projection type display shown in FIG. 3. In the projection type display shown in FIG. 3 described above, though a structure, in which a phase plate such as the half-wave plate 20Bi or the like is arranged as the polarization converting device between the polarizing plate 20Bp on the exiting side of the liquid crystal panel 20B and the dichroic prism 14, is described, in the deformation example shown in FIG. 4, a structure, in which no polarization converting unit is arranged between the polarizing plates 20Rp, 20Gp and 20Bp on the exiting side and the dichroic prism 14, is described. For example, each of the liquid crystal panels 20R, 20G and 20B is arranged so that the transmission axis of the polarizing plate 20Bp of the liquid crystal panel 20B, which passes the exiting light of the blue component, is substantially orthogonal with respect to the transmission axes of the polarizing plates 20Rp and 20Gp of the liquid crystal panels 20R and 20B which pass the exiting light of the other two colors. The half-wave plate 20Bi is arranged as the polarization converting unit on the incident side of the liquid crystal light valve 21B for blue. The similar light source 1, the polarization converting device 2, the dichroic mirrors 4~6 and the mirrors 8, 10 and 12 can be also used in this structure as shown in FIG. 1.

According to this structure, even if the shorter wavelength light exits the polarizing plates 20Rp and 20Gp, their polarizing directions are orthogonal to the polarizing plate 20Bp and therefore the light can not pass the polarizing plate 20Bp. So that, the leak current is not produced to the p-Si TFT of the liquid crystal panel 20B which modulates blue.

In this structure, since the transmission axis of the polarizing plate 20Bp of the liquid crystal panel 20B for blue and the transmission axes of the polarizing plates 20Rp and 20Gp of the liquid crystal panels 20R and 20G for red and green are substantially orthogonal each other, it is only required that the rubbing direction performed on the orientation film of a liquid crystal cell of the liquid crystal panel 20B for blue is orthogonal to the rubbing directions of the liquid crystal panels 20R and 20G for red and green.

Next, a further deformation example in the vicinity including the liquid crystal light valve and dichroic prism of the projection type display according to this embodiment is described with reference to FIG. 5. First, a structure in the vicinity including the liquid crystal light valve and the dichroic prism is described with reference to FIG. 5(a). In this deformation example, the feature exists in the point that liquid crystal panels 20Rl, 20Gl and 20Bl are arranged as the polarization converting unit provided between each of the polarizing plates 20Rp, 20Gp and 20Bp, which pass the exiting light of each color component and the dichroic prism 14 instead of the half-wave plates 20Ri, 20Gi and 20Bi shown in FIG. 1. Also, in this deformation example, the liquid crystal light valves 21R, 21G and 21B are arranged so that the light in the blue band passes through the dichroic surfaces 14a and 14b in the dichroic prism 14.

Figure 5A:
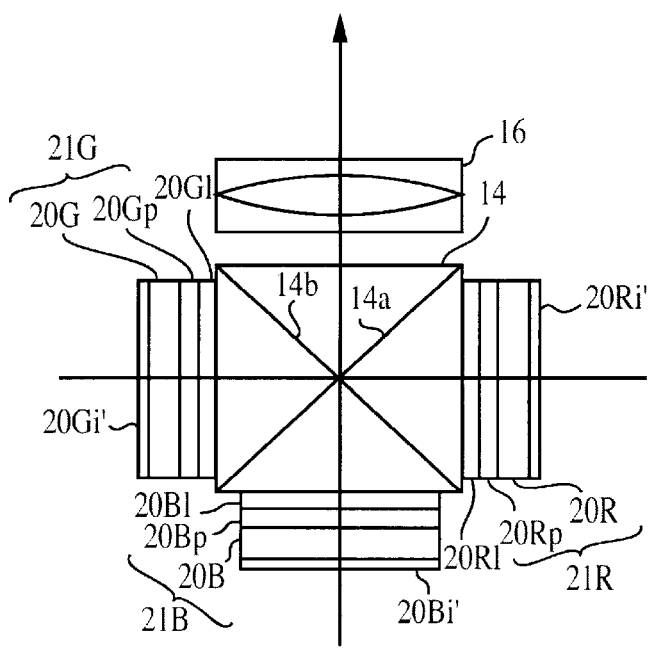
FIG. 5 shows a further structure in the vicinity of a liquid crystal light valve and a dichroic prism of a projection type display according to the first embodiment of the present invention.
Figure 5D:
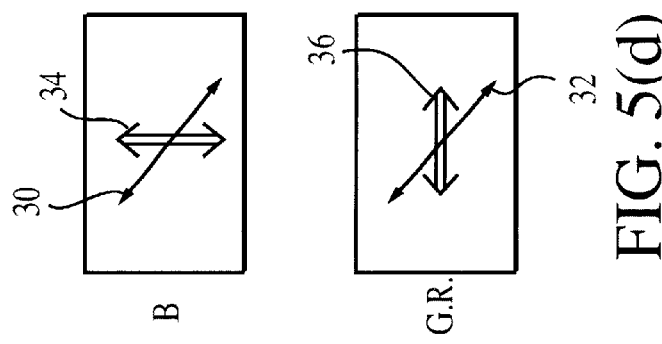
Figure 5C:
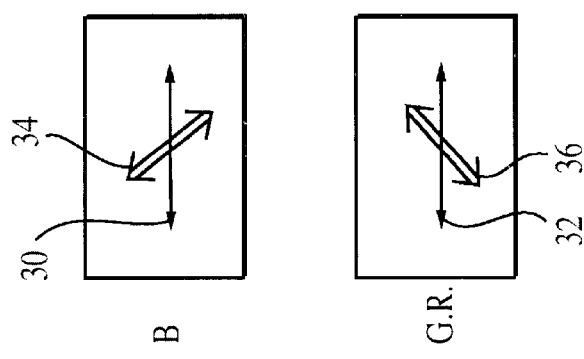
Figure 5B:
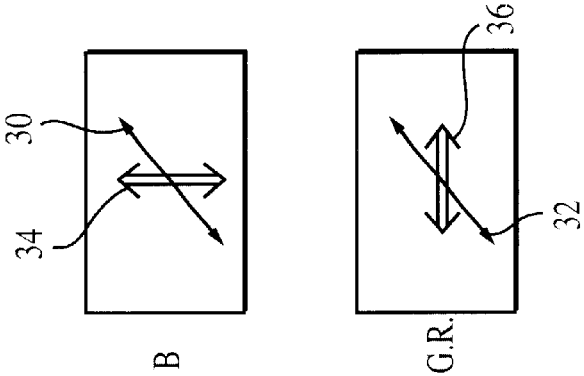

FIG. 5(b)~(d) show the polarizing directions of the exiting lights and the transmission axes of the polarizing plates of each liquid crystal light valve viewed from the dichroic prism 14 side to each liquid crystal light valve. The upper figures show the blue light and the lower figures show the red and green lights.

In FIG. 5(b), a transmission axis 30 of the polarizing plate 20Bp in the liquid crystal light valve 21B and a transmission axes 32 of the polarizing plates 20Rp and 20Gp in the liquid crystal light valves 21R and 21G are all the same in the direction and lined up at 45 degrees diagonally.

On the liquid crystal panel 20Bl for blue provided on the dichroic prism 14 side of the polarizing plate 20Bp for blue, a TN liquid crystal layer is provided to rotate a polarizing direction 34 of the blue light exiting the polarizing plate 20Bp at 45 degrees counterclockwise. On the liquid crystal panels 20Rl and 20Gl for red and green provided on the dichroic prism 14 side of the polarizing plates 20Rp and 20Gp for the red and green colors, TN liquid crystal layers are provided to rotate a polarizing directions 36 of the red and green lights, that respectively exit the polarizing plates 20Rp and 20Gp, at 45 degrees clockwise. Therefore, the blue light passing through the liquid crystal pane 20Bl for blue is incident on the dichroic prism 14 with a perpendicular direction 34 to this page. The red and green lights passing through the liquid crystal panels 20Rl and 20Gl for red and green respectively are incident on the dichroic prism 14 with a parallel direction 36 to this page. Therefore, the effect described in FIG. 2 can be also achieved by this structure because the undesired light having the shorter wavelength is not illuminated to the p-Si TFT in the liquid crystal light valve 21B for blue.

In addition, in the projection type display according to this embodiment, the liquid crystal light valve 21B, from which the modulated light of the blue component exits, is arranged at the position where the exiting light passes through the dichroic prism 14. Further, since the exiting blue light is converted to the p-polarization with respect to the dichroic prism 14 and the other two lights are converted to the s-polarization, better-balanced color synthesis can be performed and a high quality image display can be achieved.

Next, a deformation example shown in FIG. 5(c) is described. In FIG. 5(c), the transmission axis 30 of the polarizing plate 20Bp in the liquid crystal light valve 21B and the transmission axes 32 of the polarizing plates 20Rp and 20Gp in the liquid crystal light valves 21R and 21G are arranged all in the same direction and horizontally.

On the liquid crystal panel 20Bl for blue provided on the dichroic prism 14 side of the polarizing plate 20Bp for blue, a TN liquid crystal layer is provided for rotating the polarizing direction 34 of the blue light which exits from the polarizing plate 20Bp at 45 degrees clockwise. On the liquid crystal panels for red and green provided on the dichroic prism 14 side of the polarizing plates 20Rp and 20Gp for red and green, TN liquid crystal layers are provided for rotating the polarizing directions 36 of the red and green lights, which exit each of the polarizing plates 20Rl and 20Gl, at 45 degrees counterclockwise.

So, the blue light passing through the liquid crystal panel 20Bl for blue is incident on the dichroic prism 14, having a polarizing direction of 45 degrees diagonally with respect to this page. The red and green lights passing through the liquid crystal panel 20Rl and 20Gl for red and green are incident on the dichroic prism 14, having the polarizing directions 36 which is 45 degrees diagonally with respect to this page and orthogonal to the polarizing direction 34. Therefore, since the p-Si TFT in the liquid crystal light valve 21B for blue is not illuminated by the undesired light of the shorter wavelength by this structure, the effect described with reference to FIG. 2 can be achieved.

Next, a deformation example shown in FIG. 5(d) is described. Although the transmission axis 30 of the polarizing plate 20Bp and the transmission axes 32 of the polarizing plates 20Rp and 20Gp are lined up in the same direction and at 45 degrees diagonally, there is a different point that those transmission axes are perpendicular to the transmission axes shown in FIG. 5(b).

In FIG. 5 (d), the polarizing direction 34 of the blue light exiting the polarizing plate 20Bp is rotated 45 degrees counterclockwise, and the polarizing directions 36 of the red and green lights are rotated 45 degrees clockwise. So that, the blue light passing through the liquid crystal panel 20Bl for blue is incident on the dichroic prism 14 having the polarizing direction 34 perpendicular to this page and the red and green lights passing through the liquid crystal panels 20Rl and 20Gl for red and green are incident on the dichroic prism 14 having the polarizing directions 36 parallel to this page.

Consequently, since the p-Si TFT in the liquid crystal light valve 21B for blue is not illuminated by the undesired light of the shorter wavelength by this structure as well, the effect described with reference to FIG. 2 can be achieved. In addition, as is the case in FIG. 5(b), since the exiting light of the blue component passes through the dichroic prism 14 as the p-polarized light and the other two color lights are reflected by the dichroic surfaces 14a and 14b as the s-polarized lights, a better balanced color synthesis and a high quality picture display can be achieved.

Next, a projection type display according to a second embodiment of the present invention is described with reference to FIG. 6 through FIG. 12. FIG. 6(a) shows a schematic structure of a deformation example of the projection type display according to this embodiment. This deformation example is the same as the structure shown in FIG. 1 according to the first embodiment, except for the points that a quarter-wave plate 40 is arranged at the edge of the dichroic prism 14, where the synthesized light exits, as a circular polarization converting unit and a transmission type screen 42 is illustrated. The quarter-wave plate 40 is an achromatic wavelength plate in the band of the three primary colors. An optic axis of the quarter-wave plate 40 is adjusted to be substantially at 45 degrees with respect to the polarizing directions of lights of the blue, red and green components, which all exit the dichroic prism 14.

With this structure, the synthesized linearly polarized light exiting the dichroic prism 14 is incident on the transmission type screen 42 after passing the quarter-wave plate 40 to be totally circularly polarized.

As shown in FIG. 6(b), the transmission type screen 42 is structured so that a double sided lenticular lens 44 and a Frensnel lens 46 are affixed in order, viewed from the image display side. Each synthesized light enlarged and projected by the projection lens 16 is first incident on the Fresnel lens 46 to be collected and then incident on the double sided lenticular lens 46 for light scattering for enlarging the angle of visibility. At this time, if each synthesized light is incident on the Fresnel lens 46 and the double sided lenticular lens 44 maintaining the state of the linear polarization, the intensity of the light of a polarizing direction (a) perpendicular to this page and the intensity of the light of a polarizing direction (b) parallel to this page differ relying upon the exiting angle θ from a surface of the double sided lenticular lens 44 as is shown in FIG. 6(b), therefore, the intensity of light in the polarizing direction (a) becomes greater than the intensity of light in the polarizing direction (b) (intensity of light in the polarizing direction (a) > the intensity of light in the polarizing direction (b)). Consequently, observing the transmission type screen 42 diagonally from the image display side, the light in the polarizing direction (a), that is, the blue light is emphasized more than the red and green lights, so displaying a bluish color tone. However, when the quarter-wave plate 40 is arranged on the exiting side of the dichroic prism 14 as is the case of this embodiment, any of the linearly polarized lights are changed to the circularly polarized lights, exit the projection lens, and are enlarged and projected on the screen. So that, all of the three primary colors of red, green, and blue have the components of the polarizing directions (a) and (b) at a uniform ratio, thereby causing no damage to the ratio of the intensity of each color in the display area. Therefore, in this embodiment, preferable display images with no irregular color and the reduced color shift can be seen even if the transmission type screen 42 is observed diagonally.

In addition, the projection type display according to this embodiment, a variety of structures shown in FIG. 7 through FIG. 12 can be formed as deformation examples of the projection type display shown in FIG. 6.

Figure 7A:
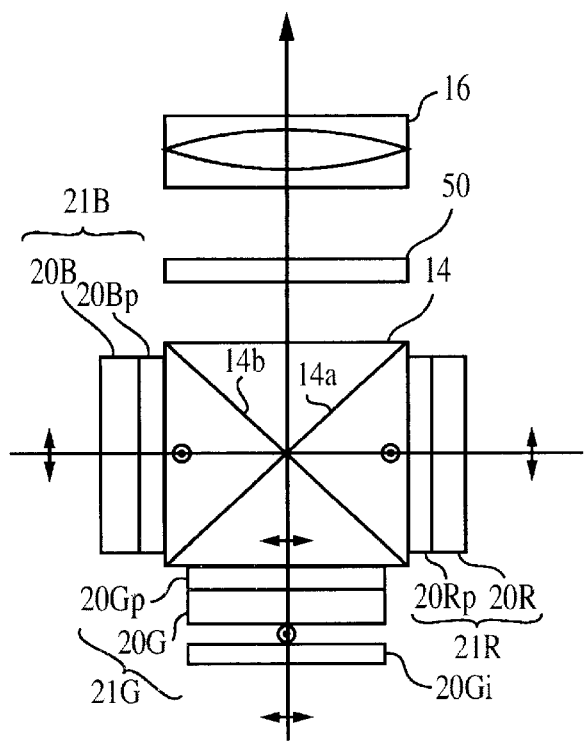
FIG. 7 shows another structure of a projection type display according to the second embodiment of the present invention.

In the structure shown in FIG. 7(a), the liquid crystal panel 20R, 20G and 20B in the liquid crystal light valves 21R, 21G and 21B respectively have the TN liquid crystal layers in which the orientation direction of the liquid crystal molecules is changed from the parallel direction to this page, to the perpendicular direction to this page, with respect to the traveling direction of the light from the light source 1. Also, the half-wave plate 20Gi is arranged on the incident side of the liquid crystal light valve 21G for green. The light source 1, the polarization converting device 2, the dichroic mirrors 4–6 and the mirrors 10 and 12 which are similar to what is shown in FIG. 1 of the first embodiment can be used in this structure as well.

The three primary colors having the polarizing direction parallel to this page are incident on the dichroic prism 14 after incident on each of the liquid crystal light valves 21R, 21G and 21B and being modulated corresponding to the image signals. After passing through the liquid crystal light valve 21B, the blue light, is incident on the dichroic prism 14 as the s-polarized light and reflected by the dichroic surface 14a. After passing through the liquid crystal light valve 21R, the red light is incident on the dichroic prism 14 as the s-polarized light and reflected by the dichroic surface 14b. After the green light passes through the half-wave plate 20Gi and becomes a polarizing direction perpendicular to this page, the green light passes through the liquid crystal light valve 21G. Then, the green light is incident on the dichroic prism 14 as the p-polarized light and passes through the dichroic surfaces 14a and 14b. The three primary colors exiting the dichroic prism 14 are incident on a half-wave plate 50 which is the polarization converting device, rotated in each polarizing direction, enlarged by the projection lens 16, and projected on a screen 42 (omitted in FIG. 7).

Figure 7B:
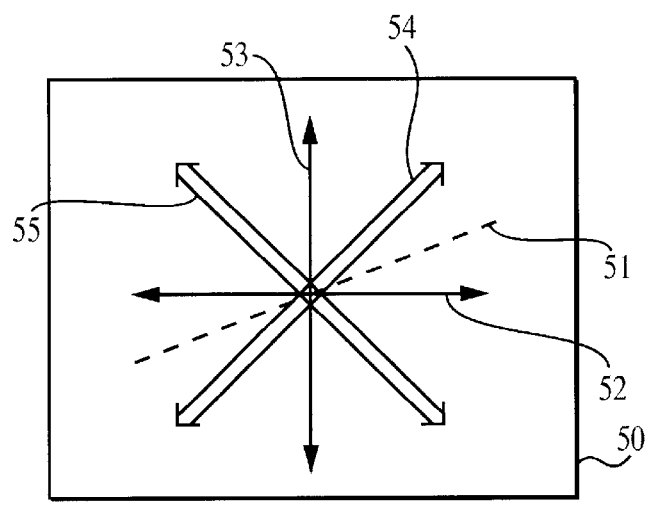

Here, the conversion of the polarizing direction of each light at the half-wave plate 50 is described with reference to FIG. 7(b). FIG. 7, for example, shows a state where the half-wave plate 50 is viewed from the screen 42 side. In FIG. 7(b), the half-wave plate 50 is adjusted and arranged so that an optic axis 41 is approximately 22.5 degrees with respect to a transmission axis 52 of the polarizing plate 20Gp. Therefore, the light of the blue and red components having the vertical polarizing direction, which pass through a transmission axes 53 of the polarizing plates 20Bp and 20Rp and are incident on the half-wave plate 50, become a light 55 having a polarizing direction at 45 degrees diagonal to the horizontal direction and exit the half-wave plate 50. The green component having the horizontal polarizing direction, which is incident on the half-wave plate 50 after passing through the transmission axis 52 of the polarizing plate 20Gp and, becomes a light 54 which is 45 degrees diagonal to the horizontal direction and has a polarizing direction orthogonal to a light 55, and then exits the half-wave plate 50. Thus, the light synthesized by the dichroic prism 14 is converted to a linearly polarized light which is 45 degrees diagonal and orthogonal to the horizontal direction, and projected on the screen 42, so that a bisector made by the polarizing direction of a light of each color component can be substantially matched to one of a horizontal line and a vertical line. That is, all the three primary lights of red, green, and blue have the polarizing directions of the horizontal direction and vertical direction at a uniform ratio, therefore causing no damage to the intensity ratio of each color in the display area. In this example, even if the transmission type screen 42 is observed from the diagonal direction, the preferable display images preventing the irregular color and the color shift can be seen. As is the case of this deformation example, the use of the half-wave plate 50 as the polarization converting device to the synthesized light towards the screen instead of the quarter-wave plate 40 leads to an easy adjustment in optic axis of the wavelength plate and a reduction in equipment costs as well.

Next, other deformation examples in the vicinity including the liquid crystal light valve and the dichroic prism of the projection type display according to this embodiment are described with reference to FIG. 8. While the color synthesizing optical system of the projection type display described with reference to the above-mentioned FIG. 1 through FIG. 7 is the dichroic prism having the orthogonal dichroic surfaces 14a and 14b, the color synthesizing optical system according to this embodiment has a dichroic prism 15 having a dichroic surface 15a and a dichroic mirror 60. Also, this deformation example has a feature that the liquid crystal light valves 21R, 21G and 21B are arranged so that the light in the blue band passes through the dichroic surface 15a in the dichroic prism 15. It should be noted that the diagram to show the optical system and the like for separating the white color from the light source 1 is omitted in FIG. 8.

The separated three primary colors are directed to the liquid crystal light valves 21R, 21G and 21B for each color after arranged in the polarizing direction parallel to this page. The light of blue component passes through the liquid crystal light valve 21B for blue, is converted to the image signal by the liquid crystal panel 20B having the TN liquid crystal layer, and then exits the polarizing plate 20Bp with the polarizing direction perpendicular to this page. Next, the blue component is incident on the half-wave plate 20Bi, rotated in the polarizing direction by 90 degrees to be a parallel polarizing direction to this page, reflected by a mirror 61 to be incident on the dichroic prism 15, and passes through the dichroic surface 15a as the p-polarized light.

On the other hand, the light of red component passes through the liquid crystal light valve 21R, has a polarizing direction perpendicular to this page and passes through the dichroic mirror 60. Also, the light of green component passes through the liquid crystal light valve 21G to have a polarizing direction perpendicular to this page and is reflected by the dichroic mirror 60. The light having red or green component with a polarizing direction perpendicular to this page is incident on the dichroic prism 15 after synthesized by the dichroic mirror 60. The lights of red and green components incident on the dichroic prism 15 are reflected by the dichroic surface 15a as the s-polarized light.

So, by the dichroic prism 15, the lights of red and green components having the s-polarization and the light of the blue component having the p-polarization are synthesized and exit. Next, the synthesized color is incident on the half-wave plate 50, converted to the linearly polarized light in which the lights of all color components are orthogonal to each other as is the case of FIG. 7(b), enlarged by the projection lens 16, and projects the picture on the screen 42 (omitted in FIG. 8).

In the structure according to this deformation example, since the p-Si TFT in the liquid crystal light valve 21B for blue is not illuminated, the similar effects can be also obtained as is the case of FIG. 2 according to the first embodiment. Further, in this deformation example, all of the three primary colors of red, green, and blue have the polarizing components of the horizontal and vertical directions at a uniform ratio, thereby causing no damage to the ratio of each color intensity in the display area. Therefore, the preferable display images with no irregular color and less color shift can be seen even if the transmission type screen 42 is observed diagonally.

Figure 8:
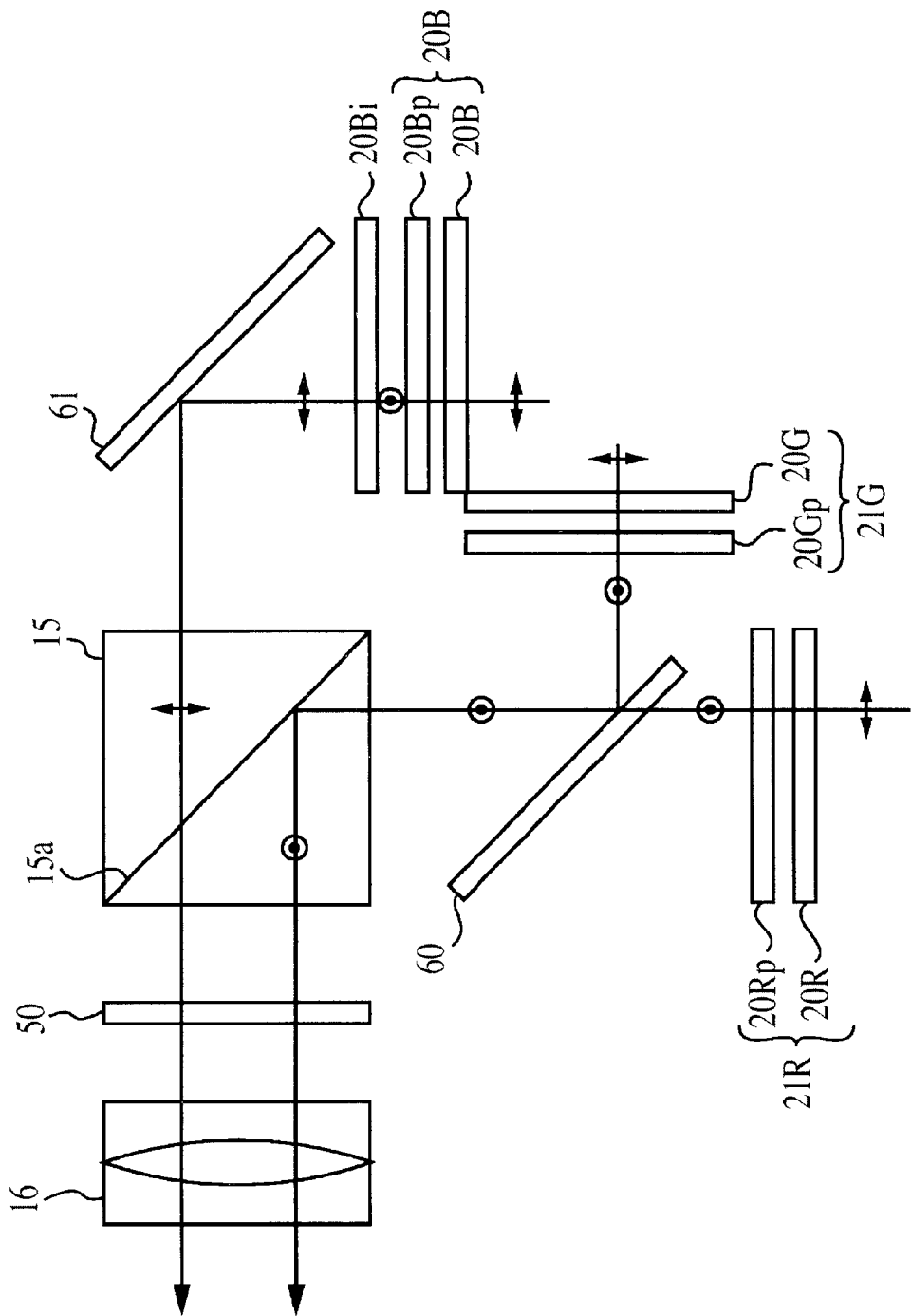
FIG. 8 shows a structure of a deformation example of a projection type display according to the second embodiment of the present invention.
Figure 9:
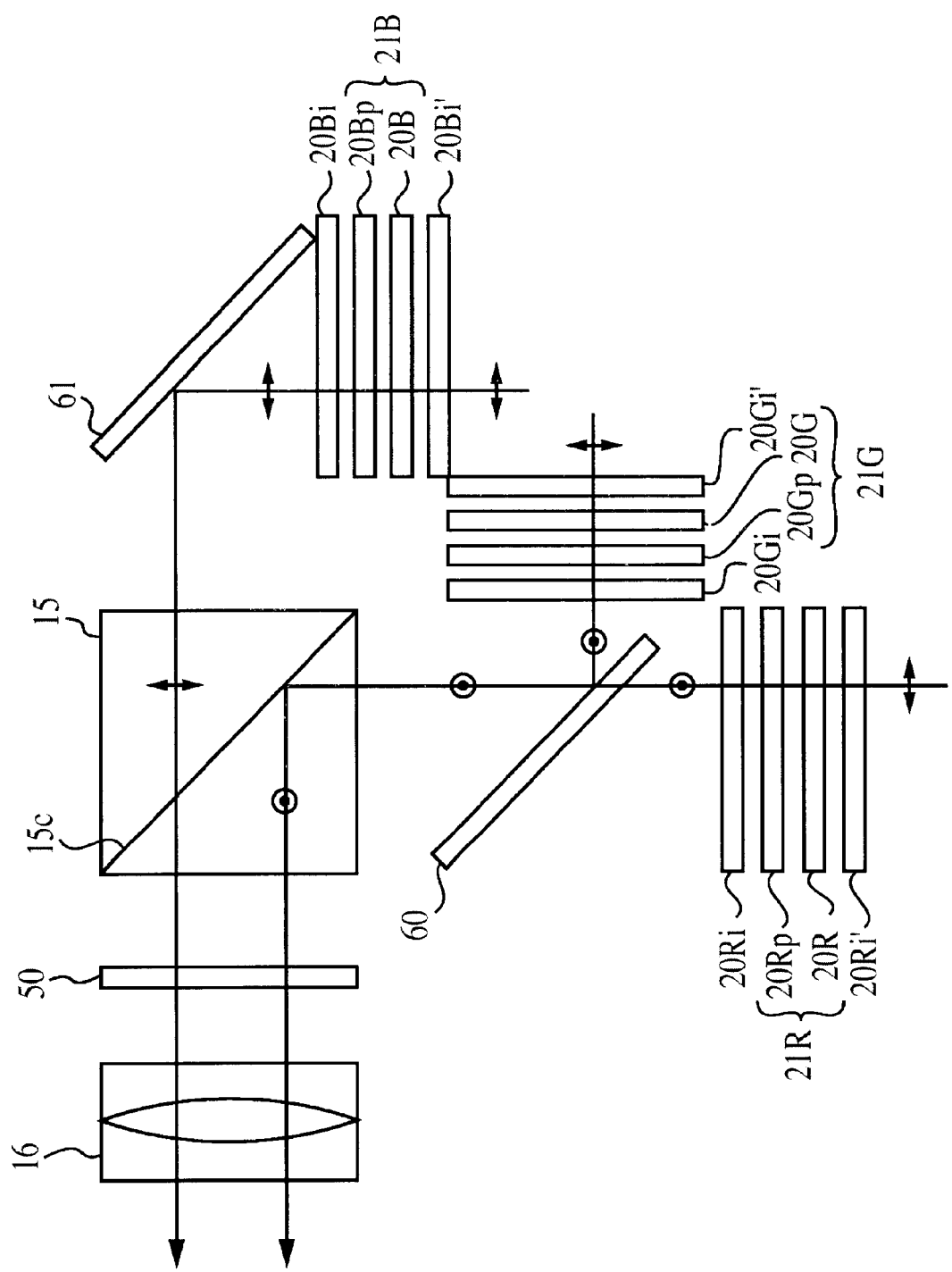
FIG. 9 shows a structure of another deformation example of a projection type display according to the second embodiment of the present invention.

Next, another deformation example of the projection type display described with reference to FIG. 8 is described with reference to FIG. 9. The projection type display shown in FIG. 9, similar to the projection type display described with reference to, for example, FIG. 1 of the first embodiment, has a similar structure to the projection type display shown in FIG. 8 except for the point that the orientation directions performed to two substrates sandwiching the TN liquid crystal layer of the liquid crystal panel 20R, 20G and 20B are provided to be 45 degrees diagonal to this page and orthogonal to each other. So that, the half-wave plates 20Ri', 20Gi' and 20Bi' and the half-wave plates 20Ri, 20Gi and 20Bi are arranged on both sides of the liquid crystal light valves 21R, 21G and 21B respectively. Also, among the lights of the color components having the polarizing direction parallel to this page and directed from the light source 1, the blue light, is reflected by the mirror 61 after having the polarizing direction parallel to this page, incident on the dichroic prism 15, and passes through the dichroic surface 15a as the p-polarized light. On the other hand, the light of the red and green components are synthesized by the dichroic mirror 60 after having the polarizing direction perpendicular to this page, and incident on the dichroic prism 15. The lights of the red and green components incident on the dichroic prism 15 are reflected by the dichroic surface 15a as the s-polarized light.

Therefore, the light of the red and green components having the s-polarization and the light of the blue component having the p-polarization are synthesized and incident on a half-wave plate 500. The light of each color component, similar to the lights shown in FIG. 7, is converted to the linearly polarized light in which the light of each color component is orthogonal, enlarged, and projects the images on the screen 42 (omitted in FIG. 9). In this structure, a similar effect to the projection type display described with reference to FIG. 8 can be also achieved.

Next, a further deformation example of the projection type display described with reference to FIG. 8 is described with reference to FIG. 10. The projection type display shown in FIG. 10 has a feature in the structured that the lights in the red and green bands pass through the dichroic surface 15a in the dichroic prism 15 as the p-polarized lights, while the light in the blue band is reflected by the dichroic surface 15a in the dichroic prism 15 as the s-polarized light. Therefore, this projection type display has the structure that after removing the half-wave plate 20Bi for blue shown in FIG. 8, the half-wave plates 20Ri and 20Gi are instead arranged to the next stage of the liquid crystal light valves 21R and 21G respectively. Even with this structure, the similar effect to that shown in FIG. 8 can be obtained.

Figure 10:
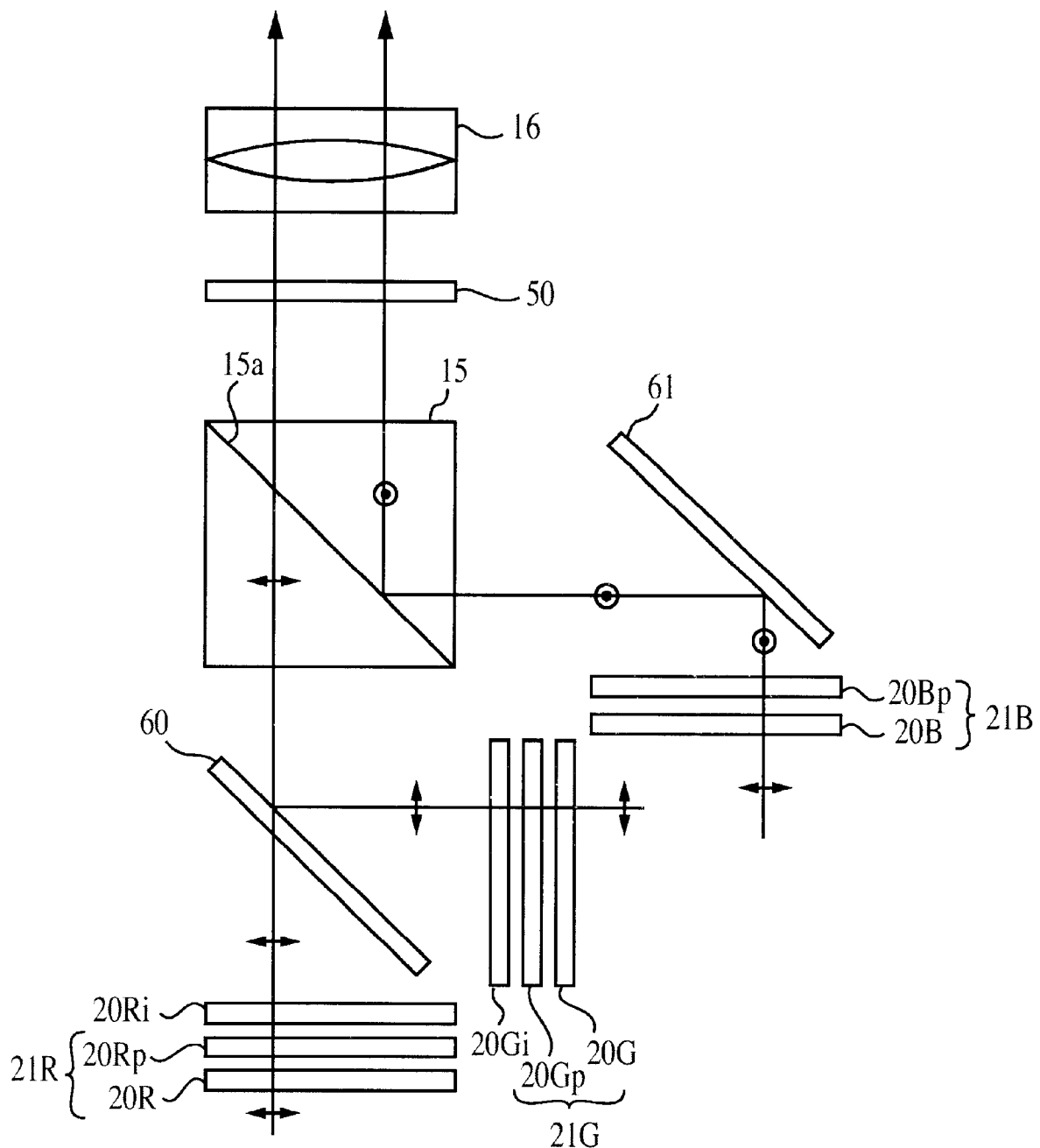
FIG. 10 shows a structure of still another deformation example of a projection type display according to the second embodiment of the present invention.
Figure 11:
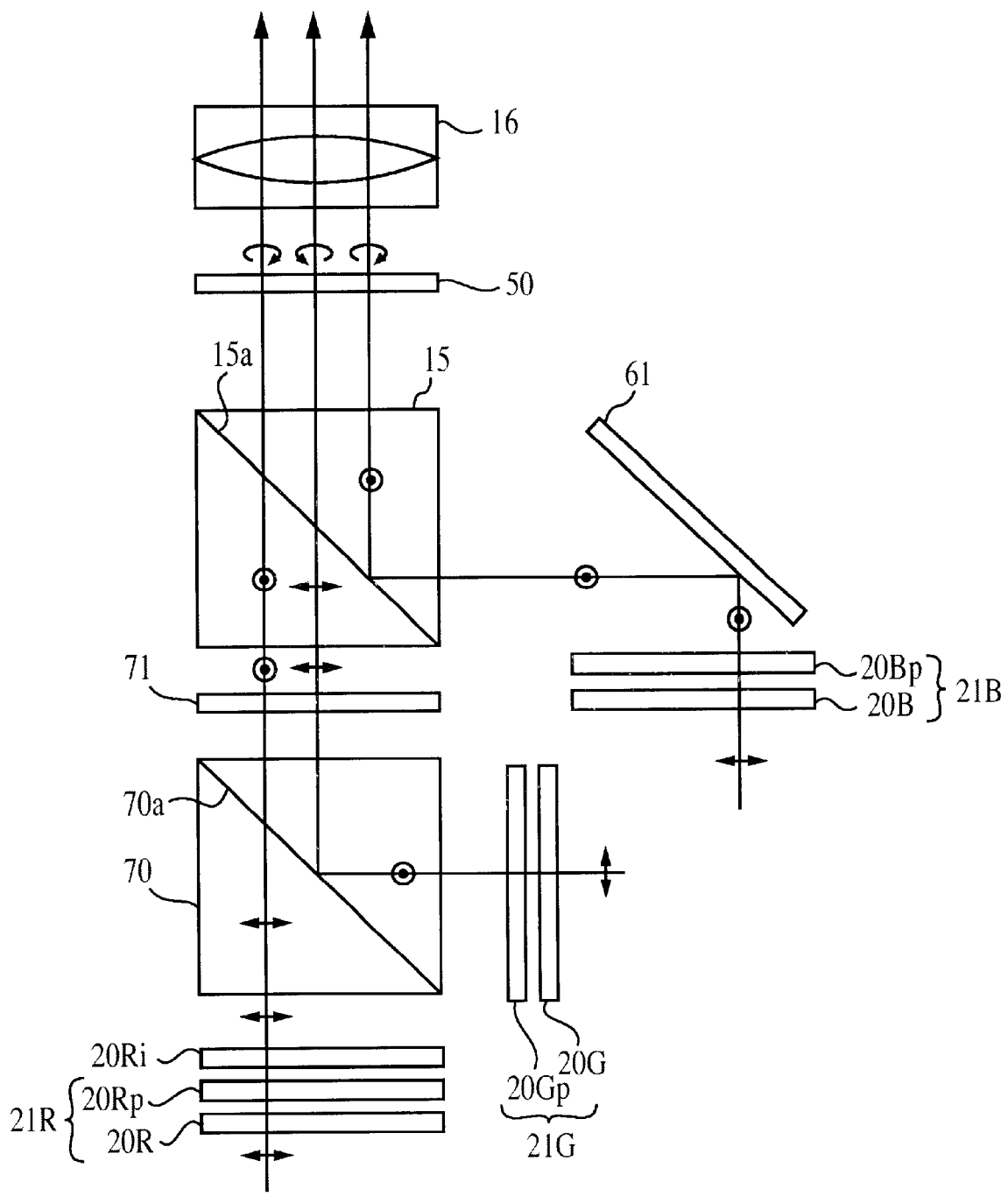
FIG. 11 shows a structure of a further deformation example of a projection type display according to the second embodiment of the present invention.

Next, another deformation example of the projection type display described with reference to FIG. 10 is described with reference to FIG. 11. In the projection type display shown in FIG. 11, a dichroic prism 70 is arranged at the arrangement position of the dichroic mirror 60 shown in FIG. 10, replacing the dichroic mirror 60. Further, a half-wave plate 71 is arranged between a dichroic prism 70 and dichroic prism 15. It should be noted that the half-wave plate 71 is an achromatic wavelength plate in the red and green band. Also, the half wavelength 20Gi for green in FIG. 10 is removed. In this manner, the light in the red band passes through the dichroic prism 70 as the p-polarized light and is incident on the half-wave plate 71. Then the light in the red band is incident on the dichroic prism after being converted to the polarized light perpendicular to this page, and passes through the dichroic surface 15a of the dichroic prism 15 as the s-polarized light. The light in the green color band is reflected by a dichroic surface 70a of the dichroic prism 70 as the s-polarized light, incident on the half-wave plate 71, and passes through the dichroic surface 15a of the dichroic prism 15 as the p-polarized light. On the other hand, the light in the blue band is reflected by the dichroic surface 15a in the dichroic prism 15 as the s-polarized light. In this way, a similar effect to that shown in FIG. 8 is obtained.

Next, another deformation example of the projection type display according to this embodiment is described with reference to FIG. 12. The projection type display shown in FIG. 12 has a feature that the quarter-wave plate 40 functioning as the quarter-wave plate in the band of the three primary color components is arranged instead of the half-wave plate 50 as the polarization converting device in the projection type display described with reference to FIG. 7.

Figure 12A:
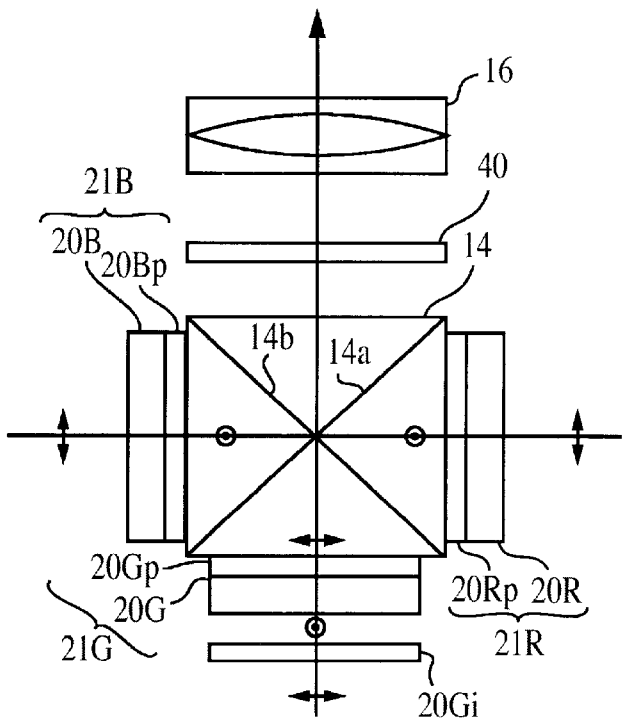
FIG. 12 shows a structure of a still further deformation example of a projection type display according to the second embodiment of the present invention.

In the structure shown in FIG. 12(a), each of the liquid crystal panels 20R, 20G and 20B of the liquid crystal light valves 21R, 21G and 21B have the TN liquid crystal layer n which the orientation direction of the liquid crystal molecules is changed from parallel to perpendicular to this page with respect to the traveling direction of the light from the light source 1. Also, the half-wave plate 20Gi is arranged on the incident side of the liquid crystal light valve 21G for green. In this structure, the light source 1, polarization converting device 2, dichroic mirrors 4–6 and mirrors 10 and 12 can be also used similar to FIG. 1 of this embodiment.

Meanwhile, each light of the three primary colors having the polarizing direction parallel to this page is incident on the dichroic prism 14, after being incident on each of the liquid crystal light valves 21R, 21G and 21B corresponding to each color and modulated corresponding to the image signal. The blue light passes through the liquid crystal light valve 21B, is incident on the dichroic prism 14 as the s-polarized light and is reflected by the dichroic surface 14a. Also, the red light passes through liquid crystal light valve 21R, is incident on the dichroic prism 14 as the s-polarized light, and is reflected by the dichroic surface 14b. The green light passes through the half-wave plate 20Gi and has a perpendicular polarizing direction passes through the liquid crystal light valve 21G. Then the green light is incident on the dichroic prism 14 as the p-polarized light and passes through the dichroic surfaces 14a and 14b. The three primary color lights exiting the dichroic prism 14 are enlarged by the projection lens 16 and projected on the screen 42(omitted in FIG. 12) after the lights are incident on the quarter-wave plate 40, which is the polarization converting device, and are converted to the circularly polarized lights respectively.

Figure 12B:
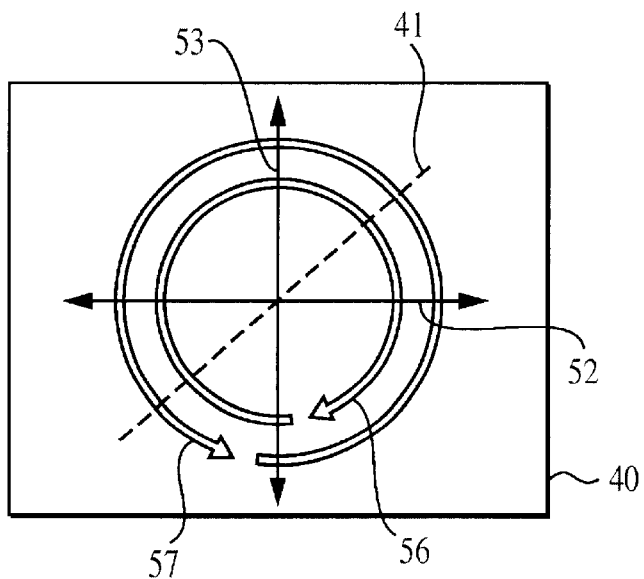
Figure 13:
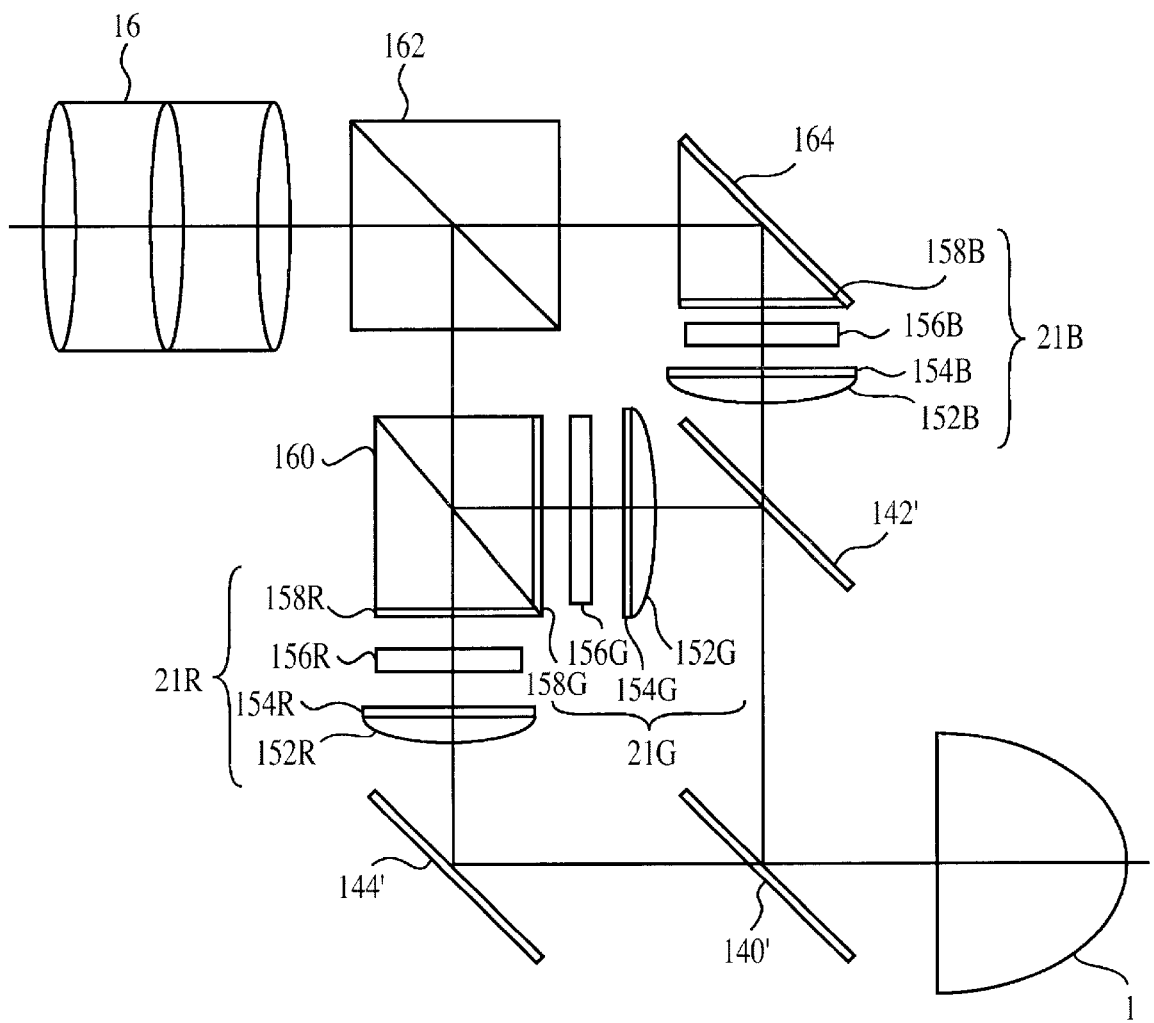
FIG. 13 is a diagram describing a principle of a projection type display with no pixel variations and chromaticity variation realized by the present invention.

Here, a conversion of the polarizing state at the quarter-wave plate 40 is described with reference to FIG. 12(b). FIG. 12(b) shows, for example, a state in which the quarter-wave plate 40 is viewed from the screen 42 side. In FIG. 12(b), the quarter-wave plate 40 is adjusted and arranged so that an optic axis 41 is substantially 45 degrees in angle with respect to the light transmission axes 53 of the polarizing plates 20Bp and 20Rp and the light transmission axis 52 of the polarizing plate 20Gp. Therefore, the blue and red components passing through the light transmission axis 53 of the polarizing plates 20Bp and 20Rp, having the vertical polarizing directions, and being incident on the quarter-wave plate 40, are converted to right-handed circularly polarized lights 56 and exit the quarter-wave plate 40. The light of the green component passing through the transmission axis 52 of the polarizing plate 20Gp and having the horizontal polarizing direction incident on the quarter-wave plate 40, is converted to a left-handed circularly polarized light 57 and exits on the quarter-wave plate 40. In this manner, since the light synthesized by the dichroic prism 14 is all converted to the circularly polarized light and projected on the screen 42, at least, the ratio between the quantity of light in the horizontal direction and the quantity of light in the perpendicular direction can be made equal for each color. That is, the three primary colors of red, green, and blue appear to have the horizontal direction and the vertical direction at a uniform ratio, thereby causing no damage to ratio of the light intensity of each color. Therefore, in this embodiment, preferable display images with no irregular color and less color shift can be also seen even if the transmission type screen 42 is observed diagonally. Also, similar to this deformation example, a similar effect can be achieved by replacing the half-wave plate 500 shown in FIG. 7 through 11 with the quarter-wave plate 40.

Figure 14:
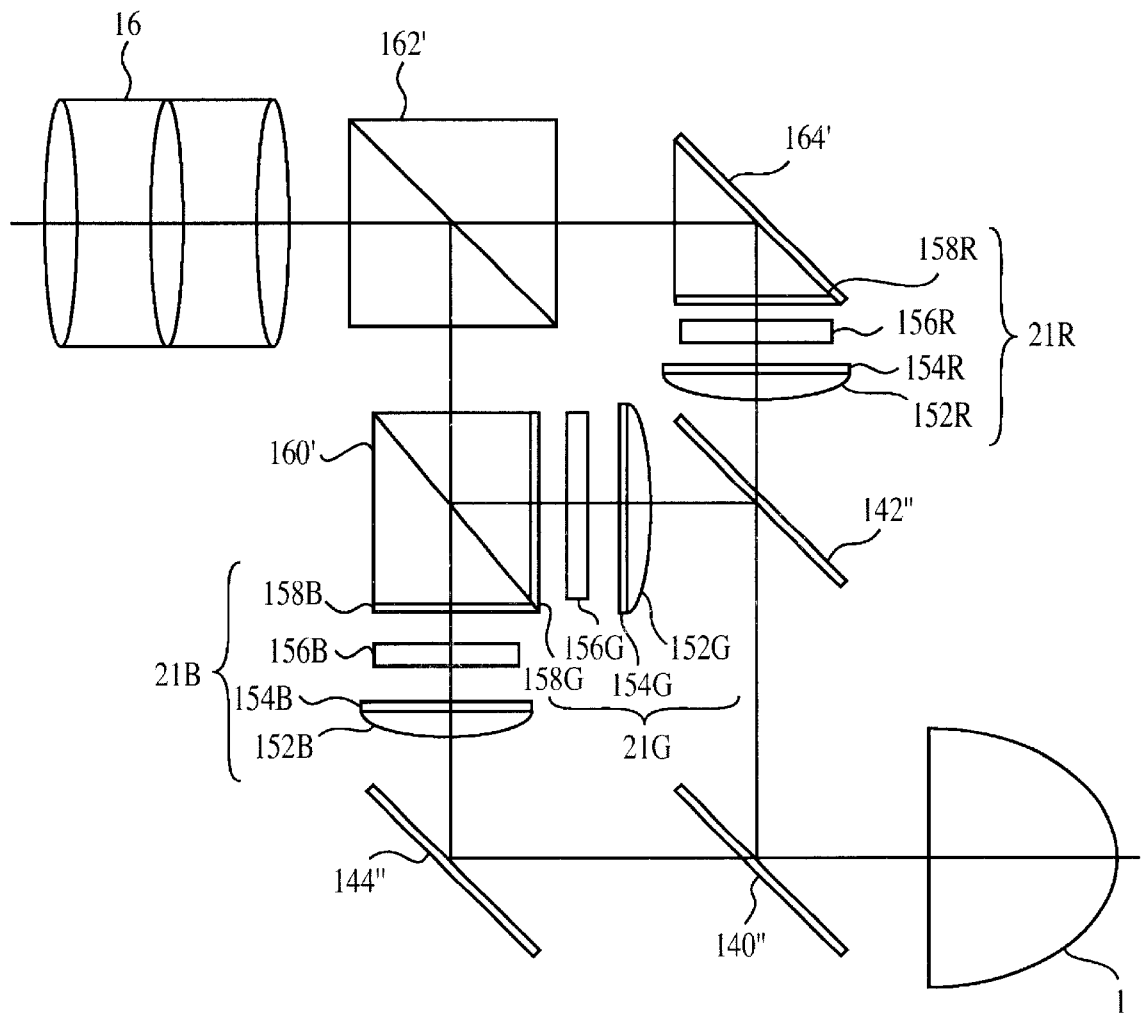
FIG. 14 is a diagram showing a schematic structure of a projection type display according to a third embodiment of the present invention.

Next, a projection type display according to a third embodiment of the present invention is described with reference to FIG. 14. The projection type display shown in FIG. 14 has a color separating optical system comprising a light source 1, first and second dichroic mirrors 140" and 142" to separate the light exiting the light source 1 into a plurality of color lights, and a total reflection mirror 144". Also, the projection type display has a color synthesizing optical system comprising a plurality of light valves 21R, 21G and 21B to space-modulate a plurality of color lights exiting the color separating optical system, first and second dichroic prisms 160' and 162' to synthesize a plurality of color lights color-modulated for each color, and a total reflection mirror 164'. Further, the projection type display has the projection lens 16 to project a plurality of synthesized color lights.

The light source 1 is composed of an arc tube made of a halogen lamp or a metal halide lamp and a paraboloid reflector and emits the white light from the arc tube after converting the white light substantially in parallel using the parabolic reflector.

The first dichroic mirror 140" is a high-pass filter (a filter for passing a shorter wavelength light, that is, a high frequency light) which passes light shorter than 500 nm in wavelength, that is, the blue color light and reflects light longer than 500 nm in wavelength.

The second dichroic mirror 142" are a low-pass filter (a filter for passing a longer wavelength light, that is, low frequency light) which passes light longer than 600 nm in wavelength, that is, the red color light and reflects light shorter than 600 nm in wavelength.

Each of light valves 21R, 21G and 21B is composed of the condenser lenses 152R, 152G and 152B, the incident polarizing plates 154R, 154G and 154B, the transmission type TN liquid crystal panels 156R, 156G and 156B and the exiting polarizing plates 158R, 158G and 158B respectively.

The first dichroic prism 160' is a high-pass filter which passes the blue light, that is, light shorter than the 500 nm in wavelength and reflects light longer than 500 nm in wavelength. In addition, the first dichroic prism 160' is a cube made of glass in which a reflection surface is formed on a diagonal surface.

The second dichroic prism 162' is a low-pass filter which passes the red light, that is, the light longer than the 600 nm in wavelength and reflects the light shorter than 600 nm in wavelength. In addition, the second dichroic prism 162' is a cube made of glass in which a reflection surface is formed on a diagonal surface.

The projection lens 16 enlarges and projects the image modulated by each light valve and synthesized by the first and second dichroic prisms 160' and 162' on the screen omitted in the diagram.

The white light emitted from the light source 1 is incident on the first dichroic mirror 140", and the blue light shorter than 500 nm in wavelength passes therethrough and is reflected by the total reflection mirror 144". The blue light which is bent substantially 90 degrees by the total reflection mirror 144" is incident on the light valve 21B for blue, and is space-modulated. In addition, the green and red lights reflected by the first dichroic mirror 140", which are longer than 500 nm in wavelength, are incident on the dichroic mirror 142". There, the red light longer than 600 nm in wavelength is incident on the light valve 21R for red and space-modulated after passing the second dichroic mirror 142". Similarly, the green light, which is 500~600 nm in wavelength reflected by the second dichroic mirror 142" is incident on the light valve 21 G for green and space-modulated.

The blue light space-modulated by the light valve 21B for blue is incident on the first dichroic prism 160' and passes therethrough. Also, the green light space-modulated by the light valve 21G for green is incident on the first dichroic prism 160' and is reflected there. At this time, the blue and green lights are synthesized in the first dichroic prism 160', simultaneously incident on the second dichroic prism 162', and change the direction to the direction of the projection lens 16 by being reflected there.

The red light, space-modulated by the light valve 21R for red, is incident on total reflection lens 164', changes the direction, and is incident on the second dichroic prism 162'. At this time, the synthesized lights of blue and green exiting the first dichroic prism 160' and the red light are synthesized by the second dichroic prism 162'. The synthesized light is incident on the projection lens 16, enlarged and projected on the screen after exiting the second dichroic prism 162'.

By the arrangement of members such as the optical system and the like and by the operation of the lights mentioned above, it is possible to use only low-cost high-pass and low-pass filters. Also, the color synthesizing system from the light valves 21R, 21G and 21B to the projection lens 16 is composed of the dichroic prisms made of glass blocks having low distortion and displacement, so realizing a projection type display without the displacement of the pixels and the deviation of chromaticity.

In addition, even if the first dichroic prism 160' and the total reflection prism 164' are replaced with plane mirrors and a prism is only the second dichroic prism 162', the distortion and the displacement by the second dichroic prism 162' can be reduced, so that the displacement of the pixels and the deviation of chromaticity can be prevented, as compared with using only the plane mirrors. Further, with this structure, as compared with the case wherein all of the first and second dichroic prisms 160' and 162' and the total reflection prism 164' are all prisms, the cost of the optical system can be reduced, thereby realizing a merit in low-cost. Similarly, when the second dichroic prism 162' is a plane mirror, a similar effect can be achieved.

Figure 15:
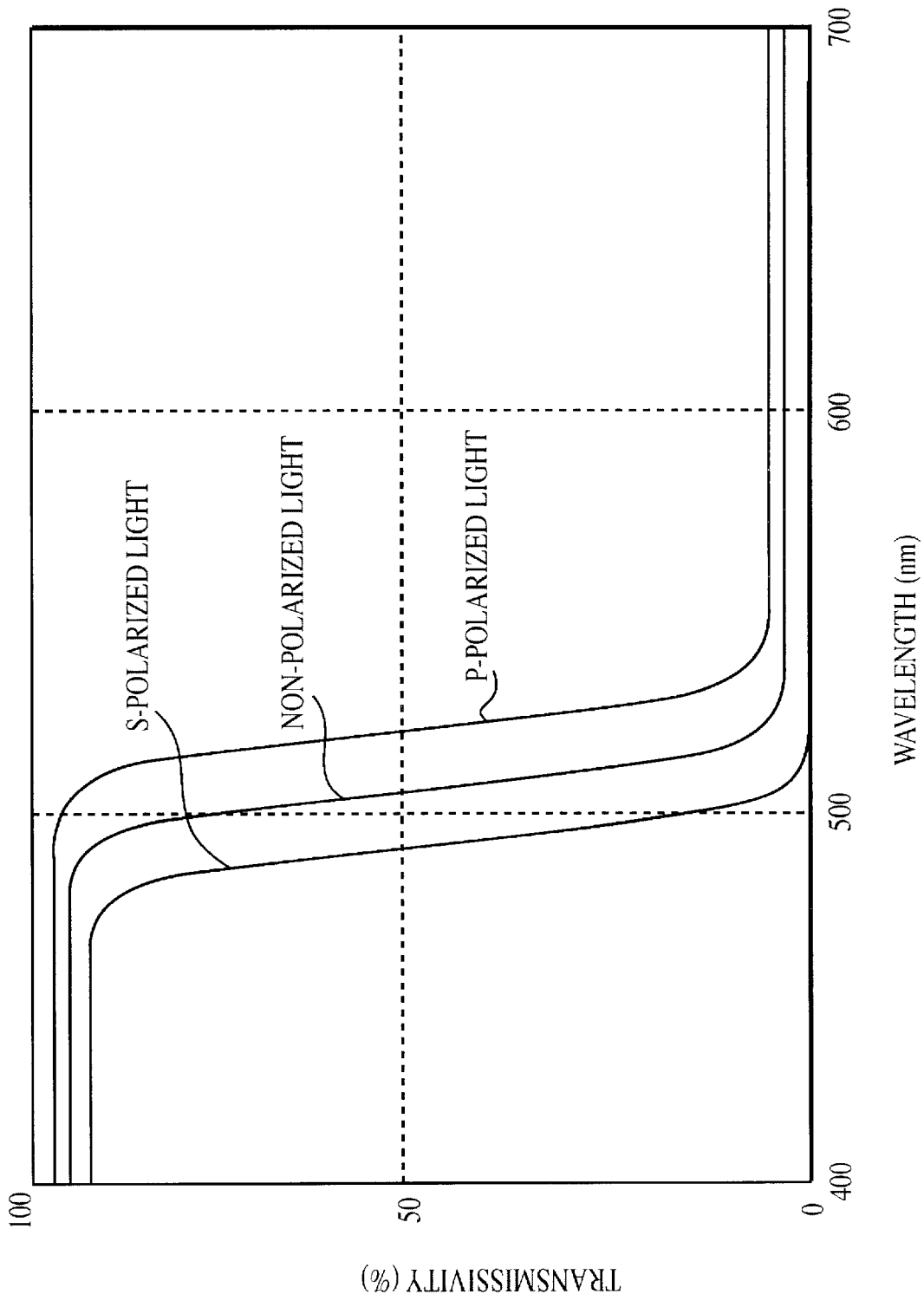
FIG. 15 is a diagram describing a projection type display according to a fourth embodiment of the present invention.
Figure 16:
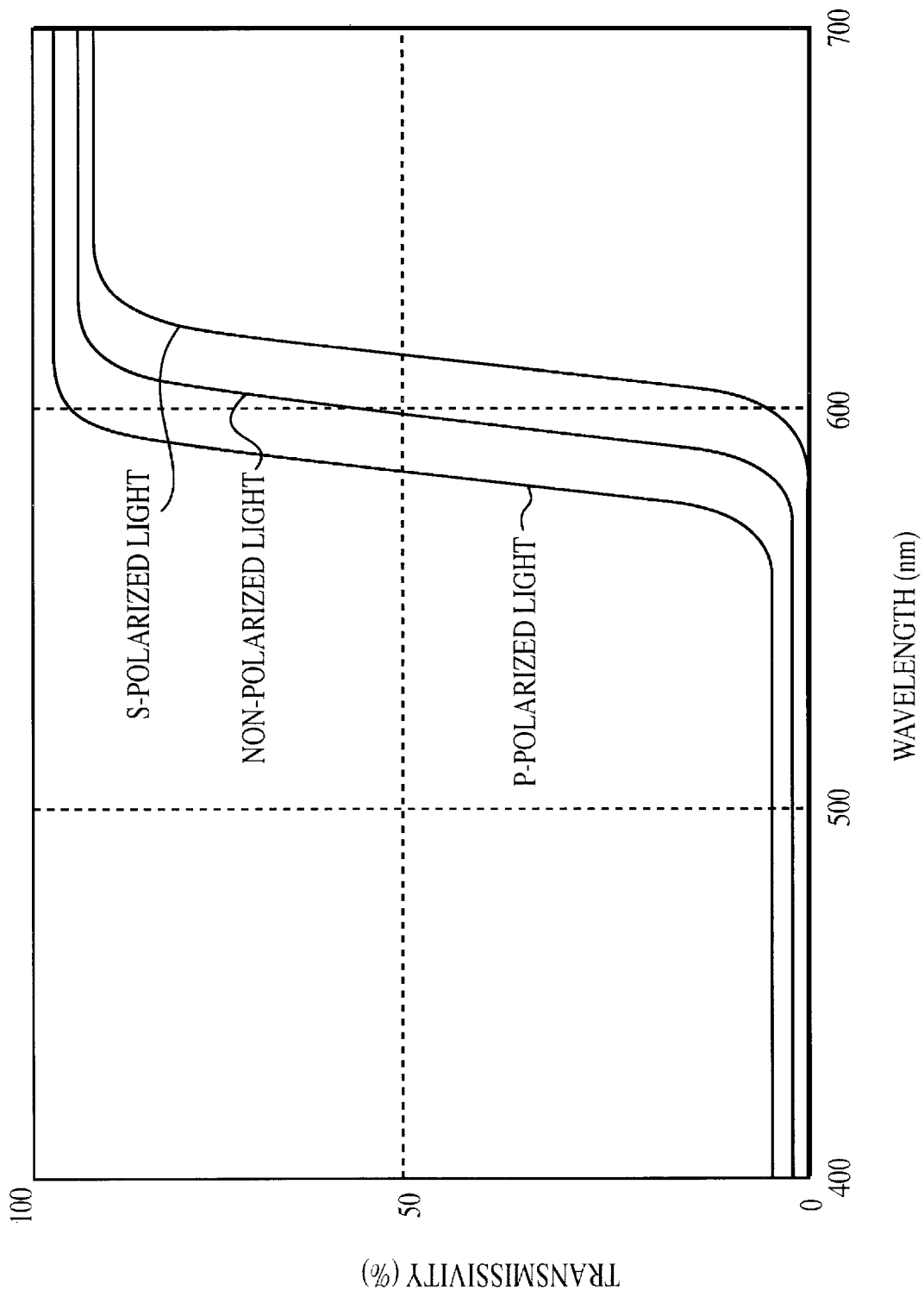
FIG. 16 is a diagram describing a projection type display according to the fourth embodiment of the present invention.

Next, a projection type display according to a fourth embodiment of the present invention is described with reference to FIG. 15 and FIG. 16. An arrangement of the optical system of the projection type display according to this embodiment is the same as that shown in FIG. 14 of the third embodiment and has a feature that the reflection light of the dichroic mirror contacting both surfaces with solid or liquid, that is a prism, is the s-polarized light. FIG. 15 shows a wavelength dependency of the transmissivity of the first dichroic prism 160'. Since substantially no absorption of light by the mirror exists, a reflectance is a value subtracting the transmissivity from 100%. A polarization of the conventional reflection light is non-polarization as long as it is not indicated. A reflection characteristic of the non-polarized light is substantially the same as the characteristic averaged between the reflection characteristics of the p-polarized light and the s-polarized light. Therefore, the characteristic around a cut-off wavelength appears to be gentle in inclination and worse in color characteristics. Also, since the s-polarized light generally has the highest reflectance, the projection type display can be highly illuminated by using the s-polarized light as the reflection light.

To realize this structure, when the polarizing directions of the lights exiting the light valve 21R, 21G and 21B are different, a polarization rotating unit or a polarization reshaping unit is provide to rotate or reshape the polarizing direction on the exiting side. A half-wave plate can be used as the polarization rotating unit. A polarizing plate or an elliptical linearly polarizing plate can be effectively reshaped as the polarization reshaping unit at a low cost and easily handled. FIG. 16 shows the wavelength dependency of transmissivity of the second dichroic prism 162'. The second dichroic prism 162' and total reflection prism 164' can achieve the similar effect by changing the reflection light to the s-polarized light.

Next, a projection type display according to a fifth embodiment of the present invention is described. An arrangement of the optical system of the display of this embodiment is the same as that shown in FIG. 14 in the first embodiment. This embodiment has a feature that the transmission light of the dichroic mirror contacting both surfaces with solid or liquid has the p-polarization. This feature is described with reference to FIG. 15 used in the fourth embodiment. FIG. 15 shows wavelength characteristics of the reflectance and the transmissivity of the s-polarization and the p-polarization of the first dichroic prism 160'. The cut-off wavelength of the s-polarized light of the first dichroic prism 160' is 490 nm and the light of wavelength longer than 490 nm is reflected. The cut-off wavelength of the p-polarization of the first dichroic prism 160' is 510 nm and light of wavelength shorter than 510 nm passes through. Since the characteristics of the reflection and the transmissivity around the cut-off wavelength are gentle, leakage of the light having the wavelength around the cut-off wavelength generated at the color separating operation system can be all projected. When this structure is formed, all blue light shorter than 510 nm in wavelength and all green light excluding the red light longer than 490 nm in wavelength can be projected, thereby leading to a high illumination of the display. Since the cut-off wavelength can be varied relatively easily by using the s-polarization for the reflection light and the p-polarization for the transmission light, as is the case of this structure, each color of the projection picture can be arbitrarily designed, thereby easily realizing a high illumination and a high color purity (realization of a wide color reproduction range).

To realize this structure, when the polarization of the lights exiting the light valve 21R, 21G and 21B are different, a polarization rotating unit or a polarization reshaping unit is provide to rotate or reshape the polarizing direction on the exiting side. A half-wave plate can be used as the polarization rotating unit. A polarizing plate or an elliptical linearly polarizing plate can effectively reshape as the polarization reshaping unit at a low cost and is easily handled. The second dichroic prism 162' having the wavelength dependency of transmissivity can achieve the similar effect by changing the transmission light to the p-polarized light.

Figure 17:
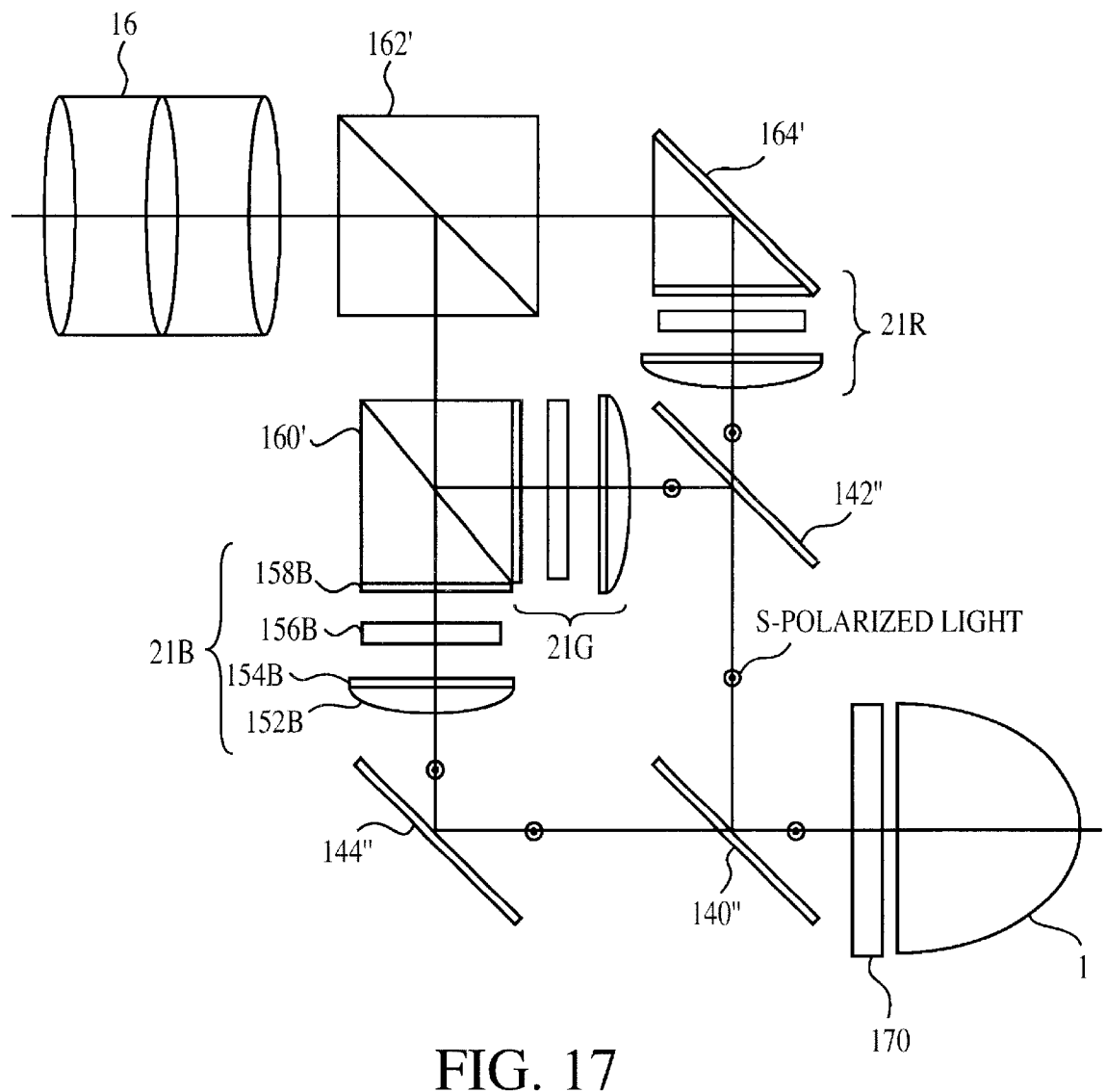
FIG. 17 is a diagram showing a schematic structure of a projection type display according to a sixth embodiment of the present invention.

Next, a projection type display according to a sixth embodiment of the present invention is described with reference to FIG. 17. This embodiment has a feature that the light source 1 in FIG. 14 in the third embodiment is replaced with a light source emitting only a polarized light. In the projection type display shown in FIG. 17, for example, a half-wave plate 180 is arranged on each incident side of the light valves 21R, 21G and 21B as the polarization rotating unit. Also, a polarizing formation device 170 to convert the polarizing direction of the light from the light source 1 to the polarizing direction perpendicular to this page is arranged. The light source 1 has an arc tube composed of the halogen lamp or the metal halide lamp and the paraboloid reflector. The polarizing formation device 170 can use a polarizing formation device using a reflection type polarizing plate described in Japanese Patent Application No.9-112603. The polarizing formation device described in the Japanese Patent Application No.9-112603 allows the white light, which is emitted from the arc tube and converted to the parallel direction by the paraboloid reflector, to be incident on the reflection type polarizing plate to transmit the effective light, and further to be incident on the optical system arranged at the subsequent stage. Also, the undesired polarized light is again returned to the lamp side and exits the reflection type polarizing plate after being converted to the effectively polarized light by the reflector and the like. By forming such a structure, since the exiting light is a polarized light when exiting the light source, the undesired polarized light can be prevented from being absorbed by each of the light valves 21R, 21G and 21B, thus resulting in an increase in reliability of the display. By using this reflection type polarizing plate, the effective polarization increases, so increasing the quantity of light. Similarly, when an absorbing type polarizing plate is used as the polarizing formation device, though an increase in reliability can be achieved, no increase in quantity of light can be achieved. Also, the similar effect can be achieved by a polarization beam splitter (PBS) forming a dielectric multi-layer film on the glass prism. Further, a polarization forming device composed of the PBS and lenses, such as that described in U.S. Pat. No.2,748,659, can be used as well.

Figure 18:
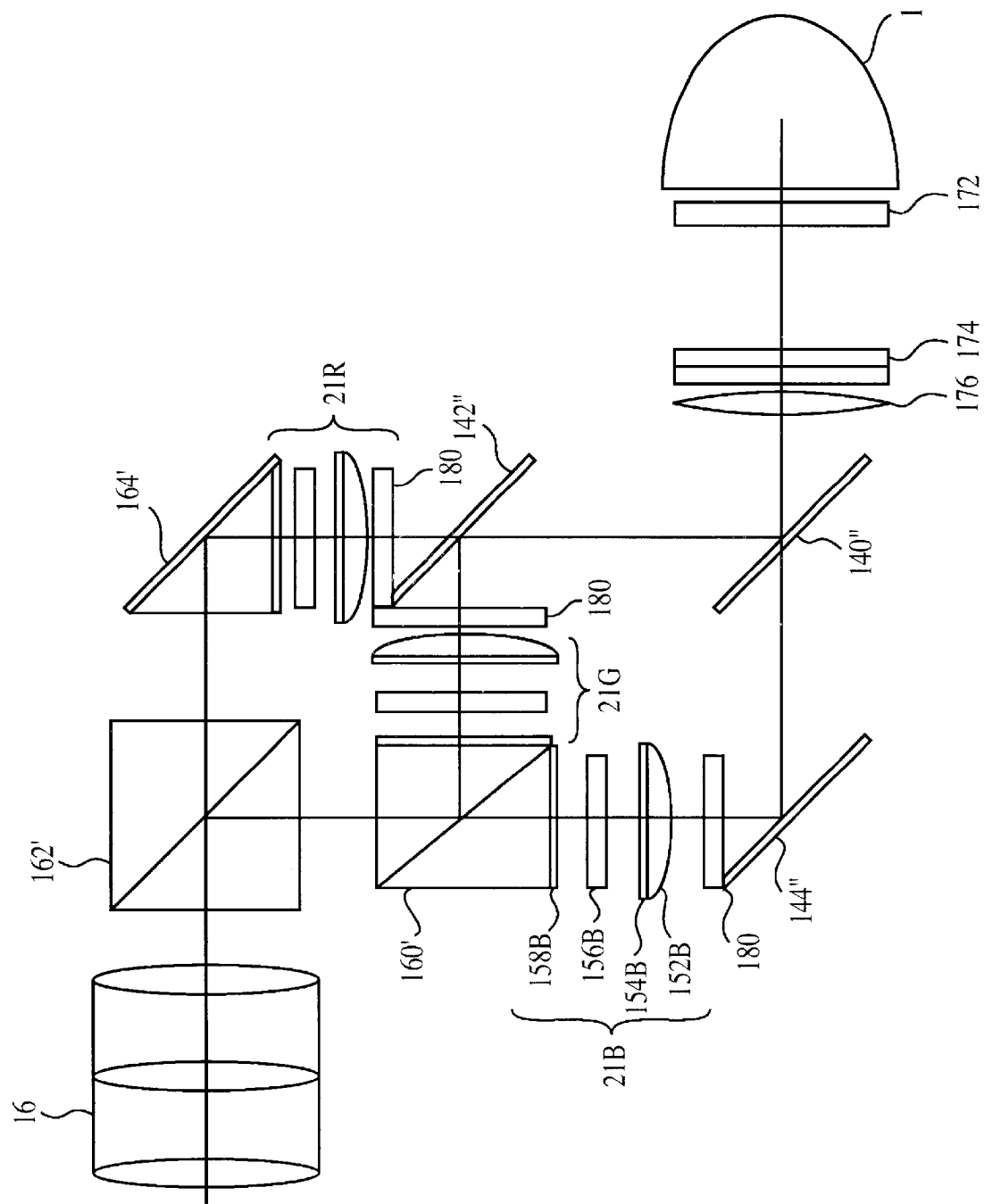
FIG. 18 is a diagram showing a schematic structure of a projection type display according to a seventh embodiment of the present invention.

Next, a projection type display according to a seventh embodiment of the present invention is described with reference to FIG. 18. The light source 1 according to this embodiment has the arc tube composed of the halogen lamp or the metal halide lamp, and the paraboloid reflector. A combination of the PBS and the lenses are used as the polarization forming device. Fly eye lens arrays (fly eye lens) 172 and 174 are arranged on the exiting side of the light source 1 while a PBS phase conversion device array 176 is arranged at the next stage. A feature is that a plurality of the lens arrays 172 and 174 are arranged between the paraboloid reflector and a polarizing formation device 176. This lens array group is generally composed of 2 sets, where the focal distance of a small lens of the lens array 172 on the reflector side is the distance between the lens arrays 172 and 174, and the focal point of the small lens of the lens array 172 has a function to collect the light to the small lens corresponding to the lens array 174. The small lens of the lens array 174 has a focal distance to enlarge and project, or rarely reduce and project the image of the small lens of the lens array 172 to the illuminating object (the light valves 21R, 21G and 21B in this projection optical system). The combination of the PBS phase conversion device array 176 and the lens array 174 as the polarization forming device used for this polarizing light source is opened in U.S. Pat. No. 2,748,659. By using this structure, a higher conversion efficiency for an effective polarization can be achieved than the formation of the polarization by the reflection type polarizing plate of the sixth embodiment (since the reflected light returned from the reflector is used to be a effectively polarized light in the formation of the polarization according to the reflection type polarizing plate, the conversion efficiency is low), so resulting in a higher efficiency and a higher illuminating effects.

Further, because the fly eye lens is used, each of the light valves 21R, 21G and 21B are uniformly illuminated and the uniformity of the quantity of light can be improved by enlarging and projecting the images based on the uniform quantity of light on the screen by the projection lens 16.

Also, the projection type displays according to the sixth and seventh embodiments have a feature that the polarization of the light emitting from the polarized light source is converted to the s-polarization (the polarizing direction, which is a vibrating direction of an electric field vector of light, is orthogonal to this page).

By using this structure, the reflection characteristic of the color separating optical system is improved and the transmissivity of the optical system, that is, the quantity of light illuminating each of the light valves 21R, 21G and 21B can be increased. Consequently, the effects of the higher efficiency and higher illumination are achieved. In addition, as has been described in the fourth embodiment, the steepness of the cut-off wavelength can be achieved, thereby producing an improvement of the color characteristic of the image. However, when the incident polarization to each of the light valve 21R, 21G and 21B are different, polarization rotating unit to rotate the polarizing direction or polarization reshaping unit to reshape the polarizing direction is arranged on the incident side of each of the light valves 21R, 21G and 21B. Therefore, the half-wave plate can be used as the polarization rotating unit which is cheap, simple, and high in efficiency.

Figure 19:
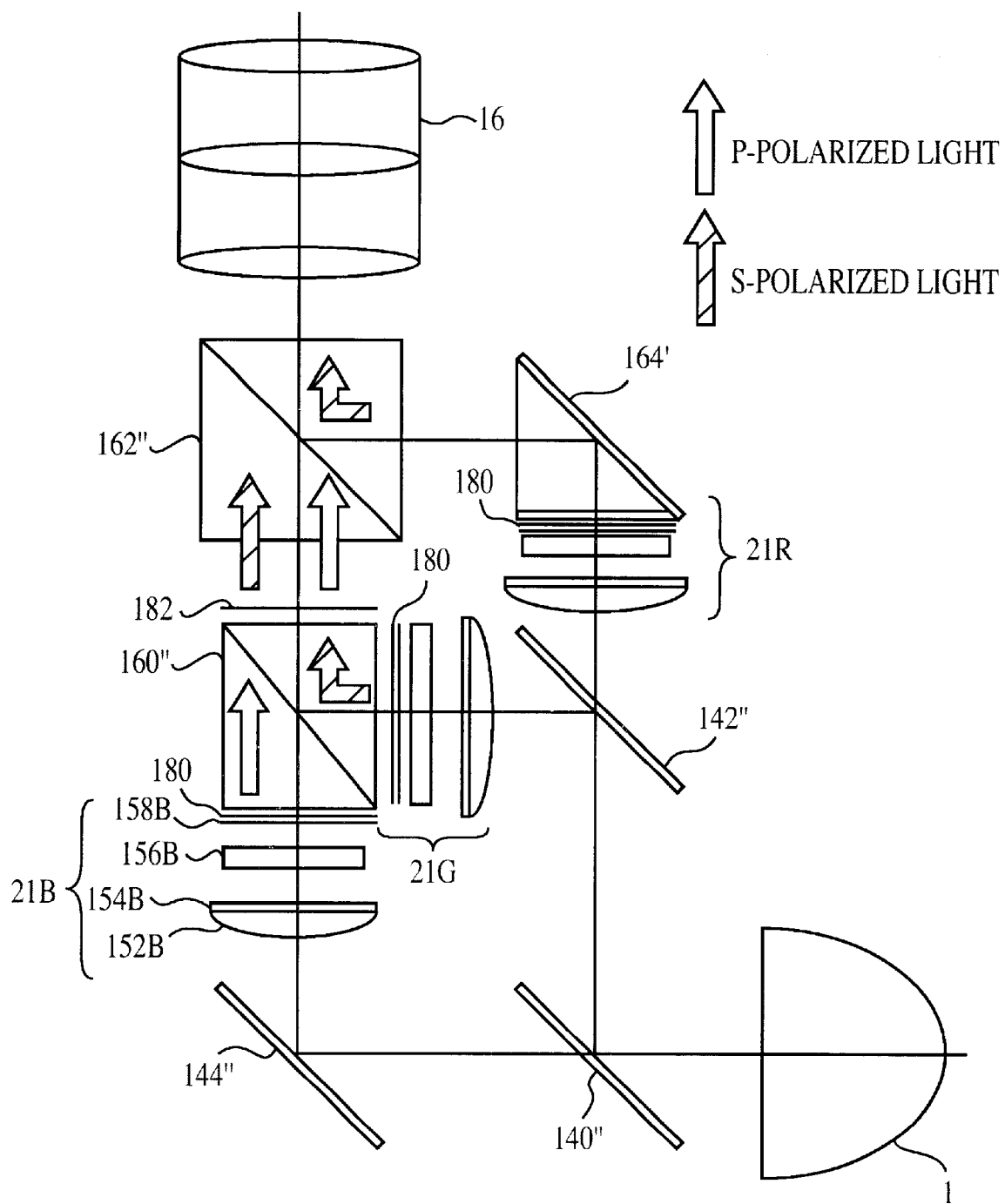
FIG. 19 is a diagram showing a schematic structure of a projection type display according to a eighth embodiment of the present invention.

Next, a projection type according to an eighth embodiment of the present invention is described with reference to FIG. 19. In this embodiment, a light path and an operation of each of the light valves 21R, 21G and 21B are the same as those in the third embodiment. However, the second dichroic prism 162" is structured to reflect the red light. The position of the projection lens 16 is changed to a position to project the reflected red light. Also, the color synthesizing optical system of the projection type display according to this embodiment has a feature that a polarization rotating unit 182 is arranged between a plurality of the dichroic mirrors contacting the both surfaces with solid or liquid, that is, the first and second dichroic prisms 160" and 162".

The blue light space-modulated by the light valve 21B for blue is converted to the polarizing direction parallel to this page by the polarization rotating device 182. So that, the blue light is incident on the first dichroic prism 160" as the p-polarized light and passes through the prism 160". Also, the green light space-modulated by the light valve 21G for green is converted to the polarizing direction perpendicular to this page by the polarization rotating device 182. Therefore, the green light is incident on the first dichroic prism 160" as the s-polarized light and reflected by the prism 160". At this time, the blue and green lights are synthesized by the first dichroic prism 160" and exit having a state to maintain the polarizing direction. Then, being incident on the polarization rotating unit 182, the blue light is converted to the s-polarized light at the second dichroic prism 162". The green light is converted to the p-polarized light at the second dichroic prism 162", incident on the second dichroic prism 162", and passes therethrough towards the projection lens.

The red light space-modulated by the light valve 21R for red is converted to the polarizing direction perpendicular to this page by a polarization rotating device 180, incident on the total reflection prism reflected prism 164' and bent, and incident on the second dichroic prism 162". Therefore, the red light is incident on the second dichroic prism 162" as the s-polarized light and reflected by the prism 162". At this time, the red light is synthesized with the light synthesized between blue and green lights, which is incident from the first dichroic prism 160", by the second dichroic prism 162". The synthesized light exiting the second dichroic prism 162" is incident on the projection lens 16 before being enlarged and projected on the screen. Here, the cut-off wavelength of the p-polarized and the s-polarized lights of the second dichroic prism 162" are 620 nm and 580 nm respectively. With this structure, since the green light incident from the first dichroic prism 160" is the p-polarized light, light shorter than 620 nm in wavelength passes therethrough. In the same way, since the blue light is the s-polarized light, light shorter than 580 nm in wavelength passes therethrough. Since the blue light is originally shorter than 520 nm in wavelength, all blue light passes therethrough.

Also, since the red light is the s-polarized light, light longer than 580 nm in wavelength is reflected. By this, all lights including the leakage light in the vicinity of the cut-off wavelength of the red and green lights can be used for the projection light, thereby producing a high quantity of light of the projector. Similarly, since cut-off wavelengths for colors can be differed respectively, the degree of freedom for the color design can be increased, and also a higher quantity of light and a high color purity can be achieved.

As the polarization rotating units 180 and 182, the half-wave plate made of a uniaxial crystal plate cut in parallel with an optic axis of wave normal of crystals, a mica plate, a crystal wavelength plate or a uniaxial extension film can be used at a low cost and high efficiency.

Further, the same effect can be achieved by sticking the polarization rotating unit 182 on the exiting surface of the first dichroic prism 160" or on the incident surface of the second dichroic prism 162". Also, since two surface reflection planes are eliminated, further increase of the quantity of light can be achieved.

The polarization rotating unit 180 arranged in the vicinity of the polarizing plates 158R, 158G and 158B of the light valves 21R, 21G and 21B can also eliminate two surface reflection planes when attached to the polarizing plates 158R, 158G and 158B or to the prisms 160", 162" and 16", thereby achieving more increase in quantity of light.

Figure 20:
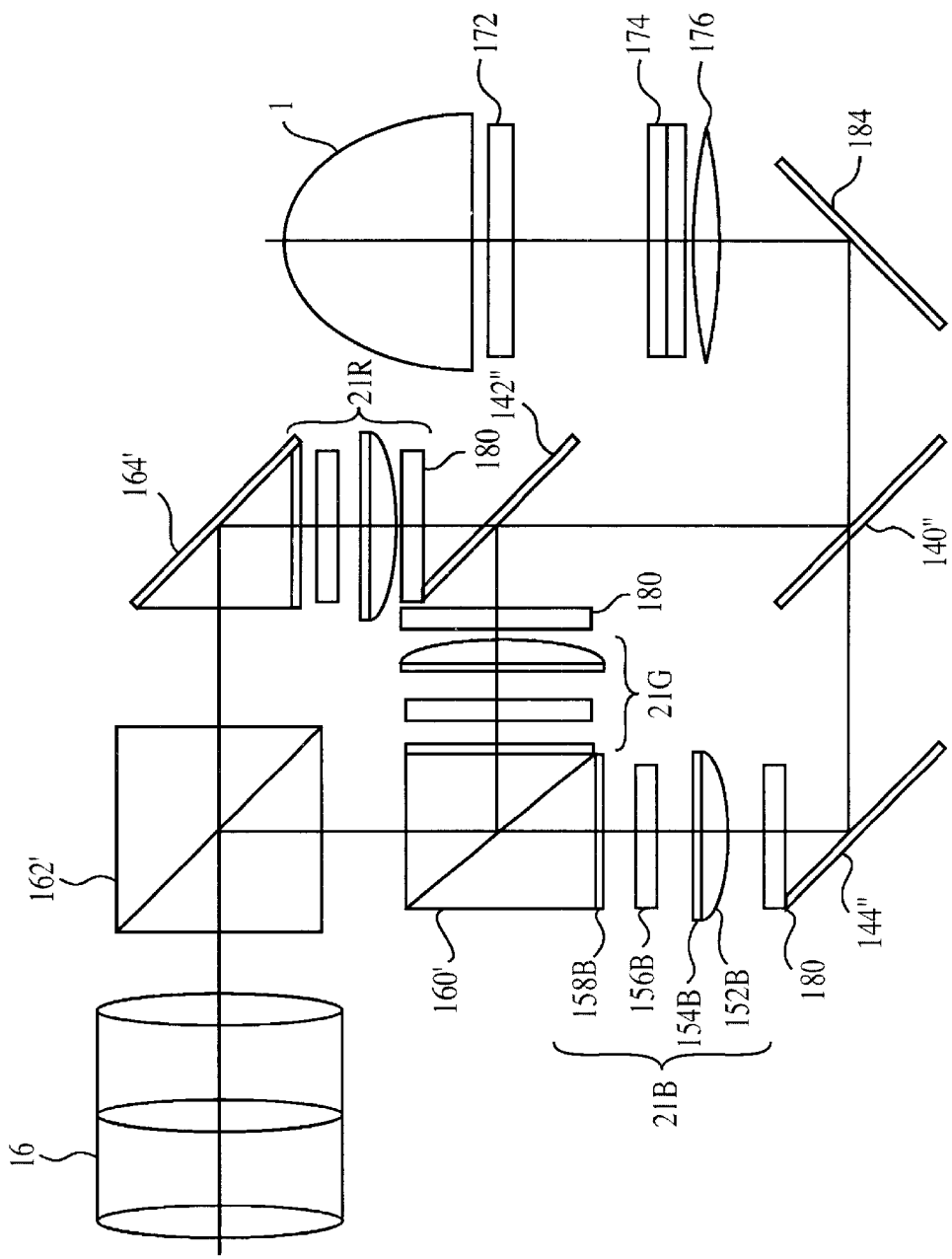
FIG. 20 is a diagram showing a schematic structure of a projection type display according to a ninth embodiment of the present invention.

Next, a projection type display according to a ninth embodiment of the present invention is shown in FIG. 20. FIG. 20 has a feature that the light source 1 and the color separating optical system side are arranged adjacent to each other by arranging an optical device 184 between the light source 1 and the color separating optical system to change the direction of the light. The description of the rest of the display is omitted because the same structure as the display is shown in FIG. 18 mentioned above. By forming this structure, the body of the display surrounding the whole optical system can be made more compact, so realizing a reduction in cost and miniaturization in display size.

Figure 21:
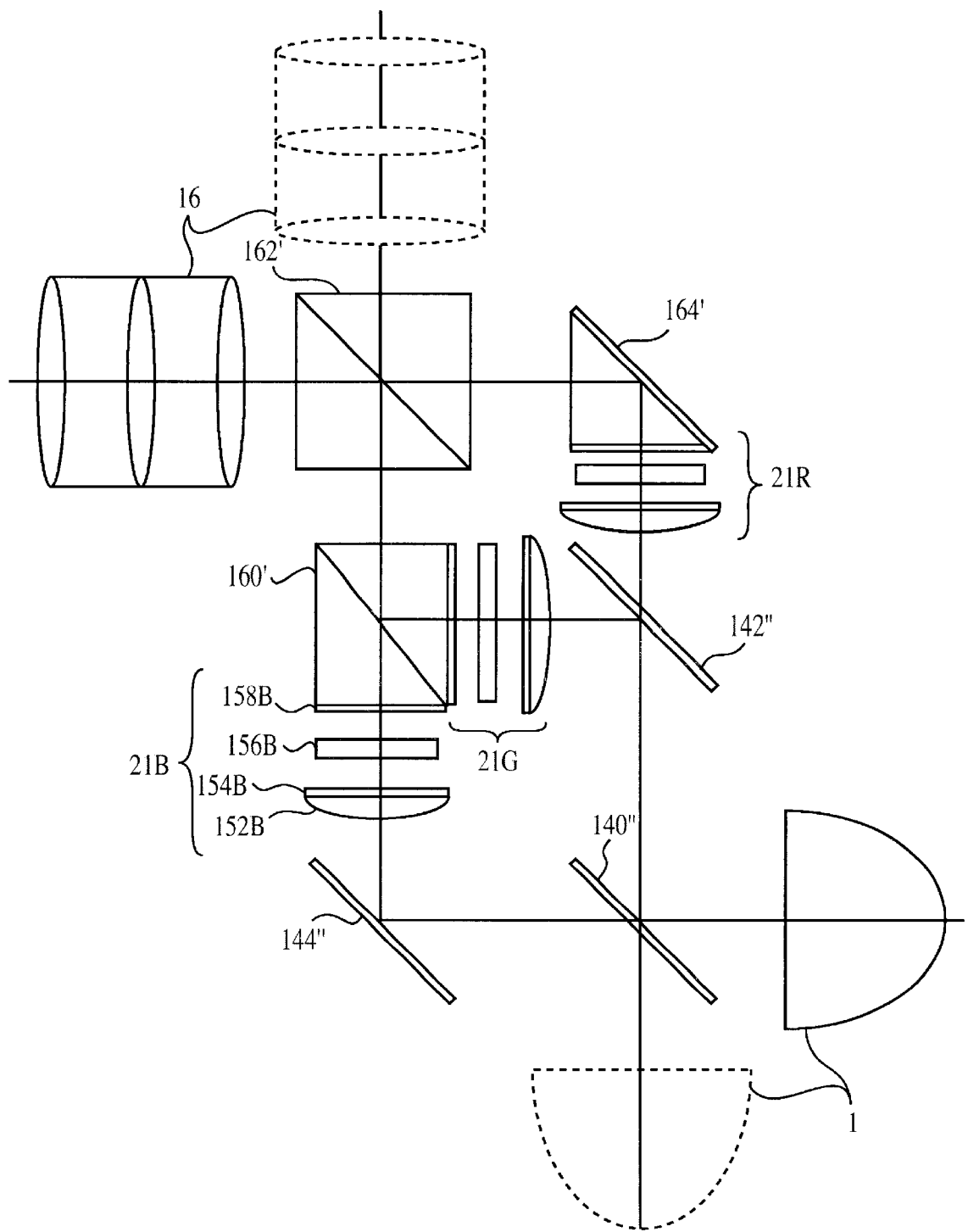
FIG. 21 is a diagram showing a schematic structure of a projection type display according to a tenth embodiment of the present invention.

Next, a projection type display according to a tenth embodiment of the present invention is shown in FIG. 21. The display in FIG. 21 has the light source 1 and the color separating optical system to separate the light exiting the light source 1 into a plurality of lights. Also, the display has a plurality of the light valves 21R, 21G and 21B to space-modulate a plurality of the lights exiting the color separating optical system, and the color synthesizing optical system to synthesize a plurality of the light space-modulated for each color. Further, the display has the projection lens 16 to project a plurality of the synthesized lights. The color separating optical system is composed of two dichroic mirrors 140" and 142" and the total reflection mirror 144". The color synthesizing optical system has two dichroic prisms 160' and 162', which are two dichroic mirrors having both side in contact with solid and liquid. The color synthesizing optical system also has the total reflection mirror 164', which has a surface in contact with solid and liquid. The projection type display according to this embodiment has a feature that all dichroic mirrors in the color separating system and the color synthesizing system mentioned above are low-pass filters or high-pass filters. The combinations of the color separation and the color synthesis in this structure are described in Table 1. Eight combinations are formed by the order of the color separation, the position of the projection lens 16, and the position of the light source 1 as shown in Table 1. Among these combinations, the item 7 has bee already described in the third embodiment and the item 5 has been described in the eighth embodiment. It should be noted that, in Table 1, a DM1 is the first dichroic mirror, a DM2 is the second dichroic mirror, a DP1 is the first dichroic prism and DP2 is the second dichroic prism. By adopting these structures shown in Table 1, an increase in cost is suppressed and a projection optical system can be realized without any problems such as the chromaticity distortion and the image displacement.

TABLE 1

| Item | DM1 Characteristics | | DM2 Characteristics | | DP1 Characteristics | | DP2 Characteristics | |
|---|---|---|---|---|---|---|---|---|
| | (T) | (R) | (T) | (R) | (T) | (R) | (T) | (R) |
| 1 | R | GB | B | G | R | G | RG | B |
| 2 | GB | R | B | G | R | G | RG | B |
| 3 | R | GB | B | G | R | G | B | RG |
| 4 | GB | R | B | G | R | G | B | RG |
| 5 | B | RG | R | G | B | G | GB | R |
| 6 | RG | B | R | G | B | G | GB | R |
| 7 | B | RG | R | G | B | G | R | GB |
| 8 | RG | B | R | G | B | G | R | GB |

(R): Reflection
(T): Transmission

Next, a projection type display according to a eleventh embodiment of the present invention is described. The display according to this embodiment has the color separating and synthesizing combination shown in item 1. The color separating optical system, as the combination of the color separation and the synthesis, is composed of the first dichroic mirror DM1 which is a low-pass filter with a transmission type for red, the second dichroic mirror Dm2 which is a high-pass filer with a transmission type for blue, and the total reflection mirror 144" in Table 1. The color synthesizing optical system is composed of the first dichroic prism DP1 which is a low-pass filter with a transmission type for red, the second dichroic prism DP2 which is a low-pass filter with a transmission type for red and green (yellow), and the total reflection prism 164'.

By forming this kind of structure, the DM1 and DM2 can be coated equally, so performing a simultaneous coating operation and a reduction in cost for the coating. It should be noted that the similar effect is achieved in the items 1, 3, 4, 5, 7 and 8 in Table 1. Also, the red and green images, distinctive in pixel displacement, can be synthesized by the DP1, thereby leading to a greater reduction in probability of the pixel displacement. It should be noted that the same effect can be achieved in the items 1 through 4 in Table 1. Since the reflection characteristic can be set higher than the transmission characteristic, the blue light which has a tendency to reduce the quantity of light than red is all reflected except for the transmission by the DM2, so leading to a higher quantity of the blue light and better chromaticity of the mixed color. The cause of the easy reduction of the quantity of blue light comes from the fact that the blue light having wavelength shorter than 420 nm~430 nm is reduced by an UV-cut prism cutting off an UV light of the emitting light from the light source.

Next, a color separating and synthesizing optical system of a projection type display according to a twelfth embodiment of the present invention is described. The display structure is the same as the eleventh embodiment. In this embodiment, each cut-off wavelength of the dichroic mirror and prism DM1 and Dp2 is defined. The cut-off wavelength of the transmission light of the first dichroic mirror DM1 is 560~590 nm and the cut-off wavelength $\lambda$ dp1 of the reflection light of the first dichroic prism DP1 is 590~620 nm while the cut-off wavelength of the transmission light of the first dichroic prism DP1 is equal to $\lambda$dp1, or shorter.

In the white light, when the yellow light having the wavelength of 560~590 nm is incident on the light valve 21R for red and then projected, a problem, that the red becomes an orange color due to the reduction of the color purity of red, is produced. Similarly, when the yellow color is incident on the light valve 21G for green and then projected, a problem, that green becomes yellow due to the reduction of the purity of green, is produced. Also, The light valve 21G for green has greater quantity of light as compared with the light valve 21R for red, thereby causing a deficiency by heat.

These problems can be solved by using this structure. That is, after the yellow light having the wavelength of 560~590 nm passes through the DM1 and is incident on the light valve 21R for the red color, the yellow light is not allowed to be projected by being reflected out of a light path by the DP1. Therefore, the quantity of light of the light valve 21G for green is not increased having a high color purity of red and green, so suppressing a heat generation.

Next, a projection type display according to a thirteenth embodiment of the present invention is described. The color separating and synthesizing optical system is the same as those in the eleventh embodiment. In this embodiment, the cut-off wavelengths of the dichroic mirror DM2 and prism DP2 are defined respectively.

The cut-off wavelength of the transmission light of the second dichroic mirror DM2 is 480~510 and the cut-off wavelength $\lambda$dp2 of the reflection light of the second dichroic prism DP2 is 510~540 nm, while the cut-off wavelength of the transmission light of the second dichroic prism DP2 is shorter than $\lambda$dp2.

Because light having wavelength of 480~510 at the interface area of the blue and green colors is light blue, even if the light is incident on the light valve 21B for blue and projected, or the light is incident on the light valve 21G for green and projected, the reduction of each color purity of the blue and green colors is slight, thereby causing no problems produced by the yellow color which has been described in the third embodiment.

By forming such a structure, whole light having wavelength shorter than 480~510 nm and whole green and red light having wavelength longer than 510 nm can be projected to the light valve 21B for blue, therefore the reduction of the quantity of green and red lights can be prevented, maintaining the color purity of the blue color.

Next, a projection type display and an operation principle according to a fourteenth embodiment of the present invention is described with reference to the FIG. 22. In this embodiment, the projection lens 16, the dichroic prism 160 and two light valves 21R and 21G are shown as a part of a color synthesizing optical system of a projection optical system.

This embodiment has a feature that even if an angle formed between a line, which connects each arbitrary point of the light valves 21R and 21G with substantially the center of the entrance pupil of the projection lens 16, and a filter surface of the dichroic prism 160 varies, the wavelength of the dichroic prism 160 in the color synthesizing optical system is still substantially identical. A filter characteristics of the dichroic prism 160 according to this embodiment have an in-plane distribution to realize the feature mentioned above.

Figure 22:
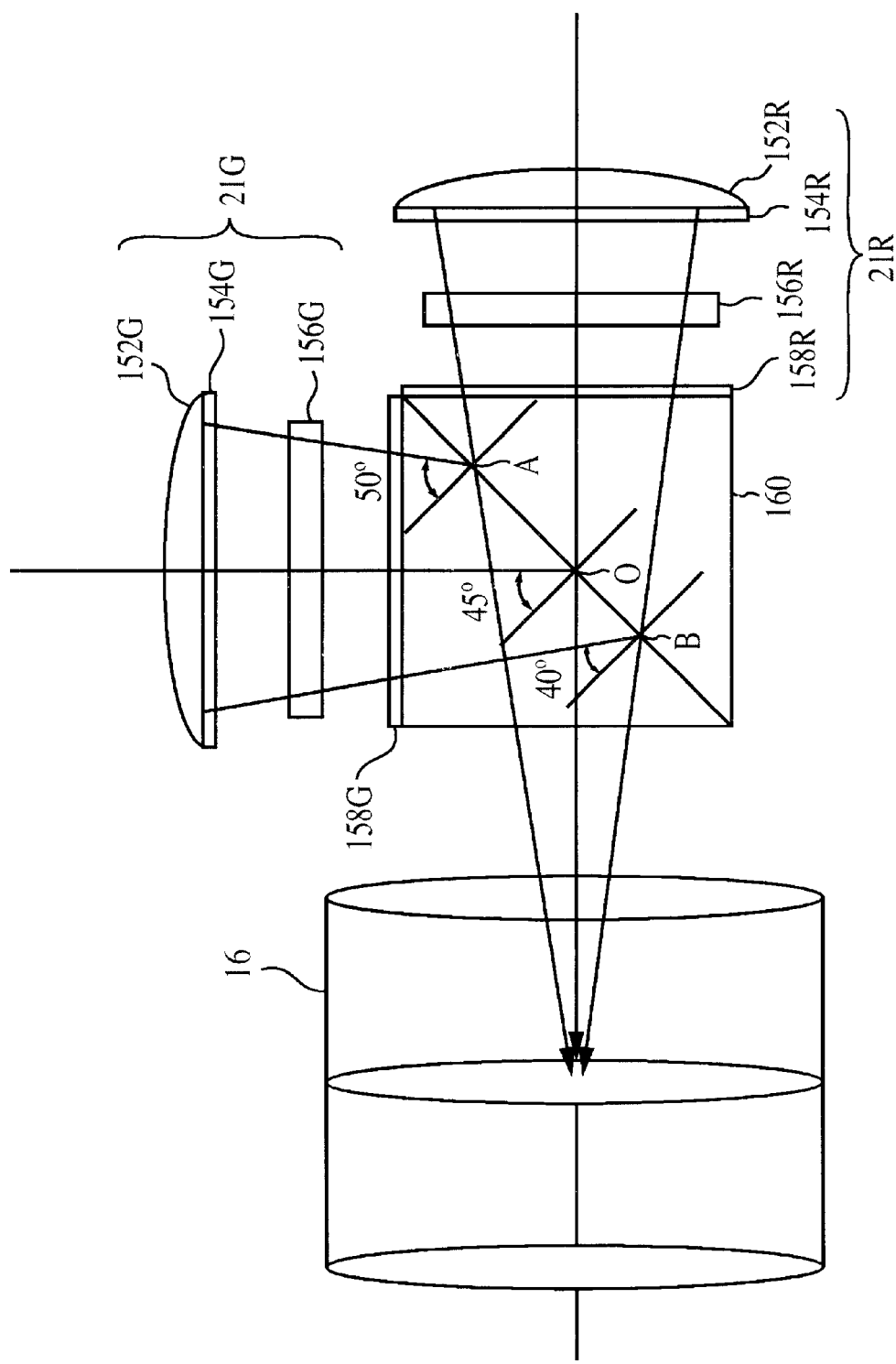
FIG. 22 is a diagram showing a schematic structure of a projection type display according to a fourteenth embodiment of the present invention.

In FIG. 22, although the incident angle of the incident light at a point (O) of the dichroic prism 160 is 45 degrees, the incident angle is 50 degrees at a point (A) and 40 degrees at a point (B). Thus, even if the incident angles are different depending on the positions, cut-off wavelengths of the dichroic prism 160 are set equal. Therefore, a thin film is formed to have the cut-off wavelength equal to 600 nm for the incident angle of 50 degrees at the point (A), a thin film is formed to have the same cut-off wavelength for an incident angle of 45 degrees at the point (O), and a thin film is formed to have the same cut-off wavelength for an incident angle of 40 degrees at the point (B). Film characteristics are varied to provide intermediate characteristics gradually changing depending upon the positions between the point (A) and the point (O), and between the point (O) and the point (B). Such film characteristic can be realized by forming a multi-layer interference film composing a dichroic filter by the use of an oblique deposition method.

By structuring the filter according to this embodiment, color variations of the projected pictures caused by the incident angle distribution can be prevented.

It should be noted that since almost no incident angle distribution is formed with respect to the direction of the dichroic prism 160 perpendicular to this page, a characteristic distribution with respect to the position of the filter film such as that mentioned above is not required.

Figure 23:
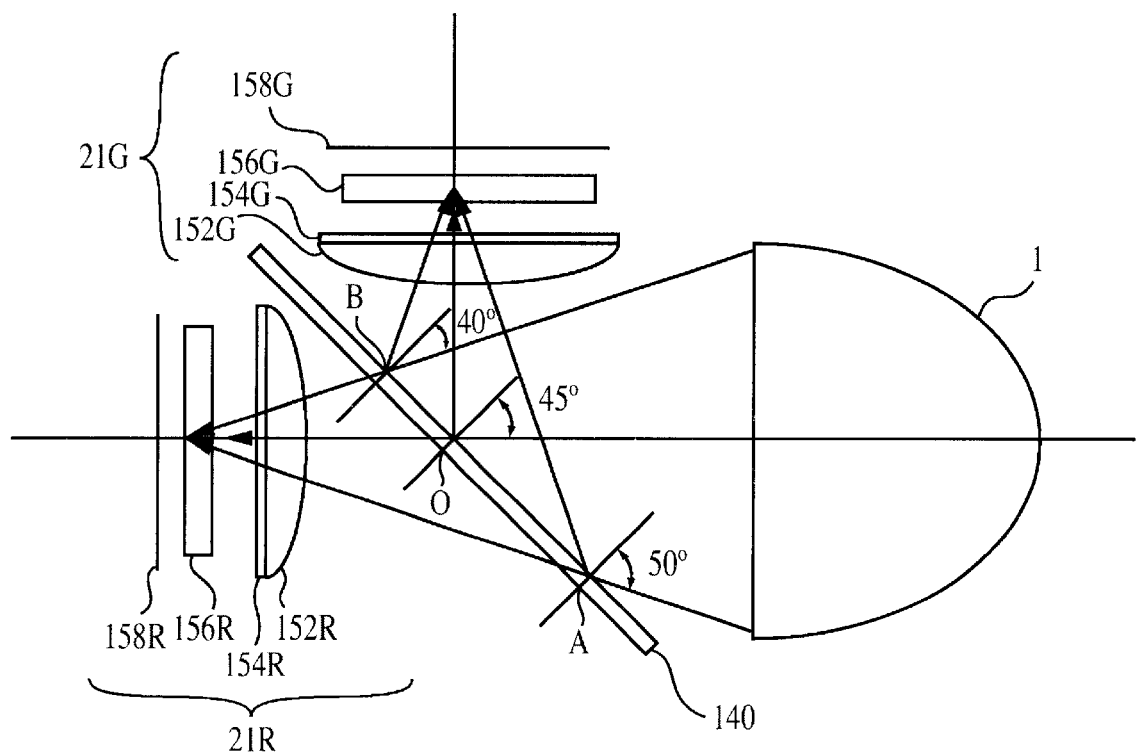
FIG. 23 is a diagram showing a schematic structure of a projection type display and an operational principle according to a fifteenth embodiment of the present invention.
Figure 24:
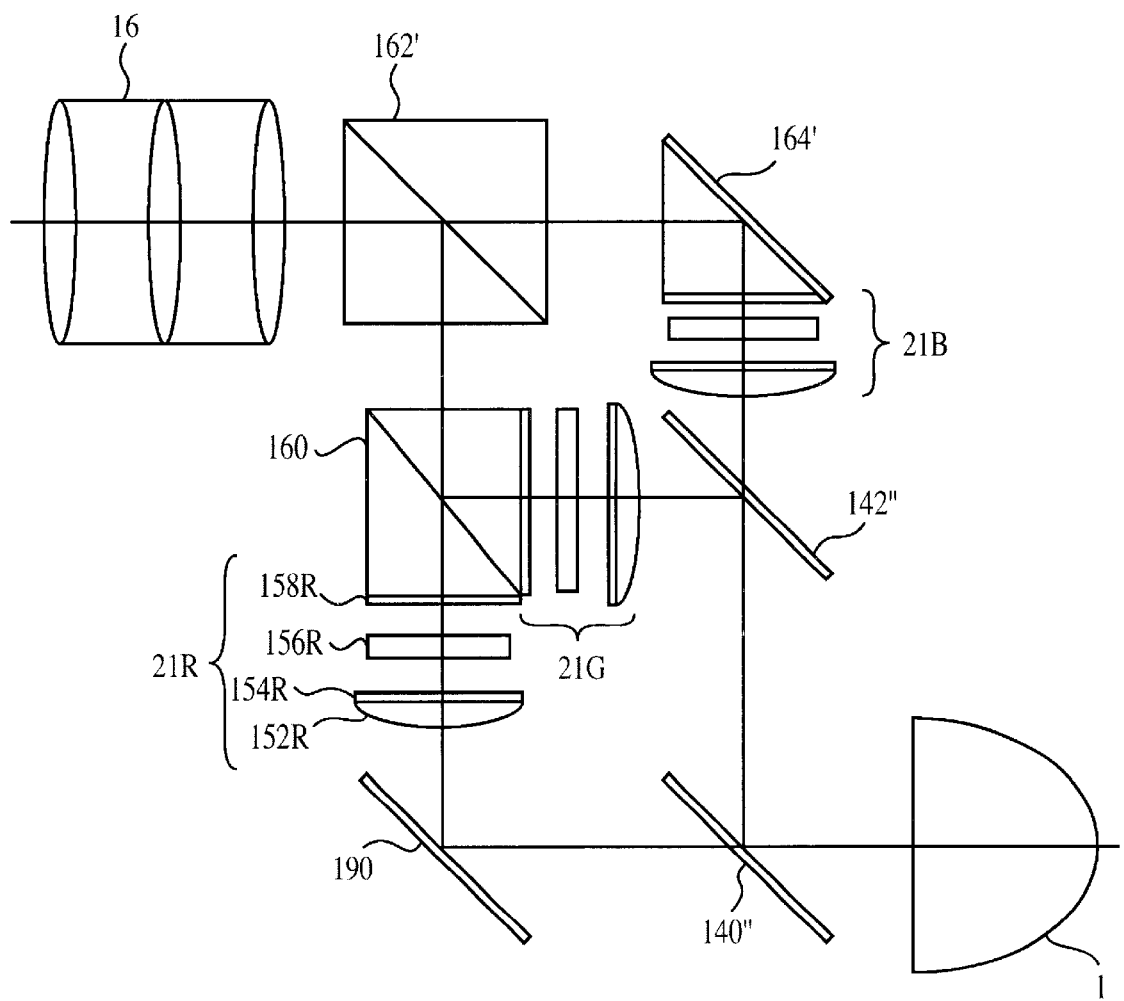
FIG. 24 is a diagram showing a schematic structure of a projection type display according to a sixteenth embodiment of the present invention.

Next, a projection type display and an operation principle according to a fifteenth embodiment of the present invention is describe with reference to FIG. 23. FIG. 23 shows, as an example, a part of the light source 1 and the color separating optical system of the projection optical system, that is, the light source 1, the dichroic mirror 140 and two light valves 21R and 21G.

This embodiment has a feature that a distribution is provided to the filter characteristics of the color separating optical system corresponding to an angle formed between a line drawn from each arbitrary point in the light source to substantially each center of the light valves 158R and 158G and to a filter surface of the dichroic mirror 140.

The incident angle is 45 degrees at the (O) point of the dichroic mirror 140 in FIG. 23, 50 degrees at the point (A), and 40 degrees at the point (B). However in this embodiment, the same cut-off wavelength is provide in spite of each position at the filter surface of the dichroic mirror 140. That is, a thin film having a cut-off wavelength of 500 nm for an incident angle of 50 degrees at the point (A) is formed. At the point (O), a thin film having the same cut-off wavelength for an incident angle of 45 degrees is formed. Also, at the point (B), a thin film having the same cut-off wavelength for an incident angle of 30 degrees is formed. Film characteristic having a intermediate characteristics gradually varying depending upon the positions between the point (A) and the point (O), and between the point (O) and the point (B) is formed.

This film characteristic can be realized by forming a multi-layer interference film of the dichroic filter using an oblique deposition method. The color variations of the projection pictures caused by the incident angle distribution can be prevented by the film structure according to this embodiment.

It should be noted that since almost no incident angel distribution is produced to the direction of the dichroic mirror 140 perpendicular to this page, the requirement for performing the characteristic distribution of the film is small.

A projection type display according to a sixteenth embodiment of the present invention is described with reference to FIG. 16. Although the structure of the color separating and synthesizing optical system of this embodiment is substantially the same as that in FIG. 21, this embodiment has a feature that the total reflection mirror 144" is replaced with a dichroic mirror 190. This dichroic mirror 190 is formed so that a wavelength of the reflection light is equal to 590~620 nm. Therefore, light having a wavelength longer than this wavelength is reflected by the dichroic mirror 190 and light having a wavelength shorter than this wavelength passes through.

By forming such a structure, the undesired yellow light passes through the dichroic mirror 190, thereby preventing the yellow light to be incident on the light valve 21R for red. By using th dichroic mirror 190, a degree of freedom to select the cut-off wavelength is increased along with the prevention of a reliability reduction of the light valve. Thus, the effects of the higher color purity and the higher illumination can be expected.

Also, the dichroic prism can be used instead of the total reflection prism 164' in the color separating and synthesizing optical system of this embodiment. In this case, the cut-off wavelength of the reflection light at the dichroic prism is 510~540 nm and light having wavelength longer than this wavelength passes through, and the light having wavelength shorter than this is reflected. By forming such a structure, the leakage light in the vicinity of the cut-off wavelength is prevented from being projected, thereby improving the color purity of the projection images. Also, the degree of freedom to select the cut-off wavelength is increased and the effects of the higher color purity and the higher illumination can be expected.

Figure 25:
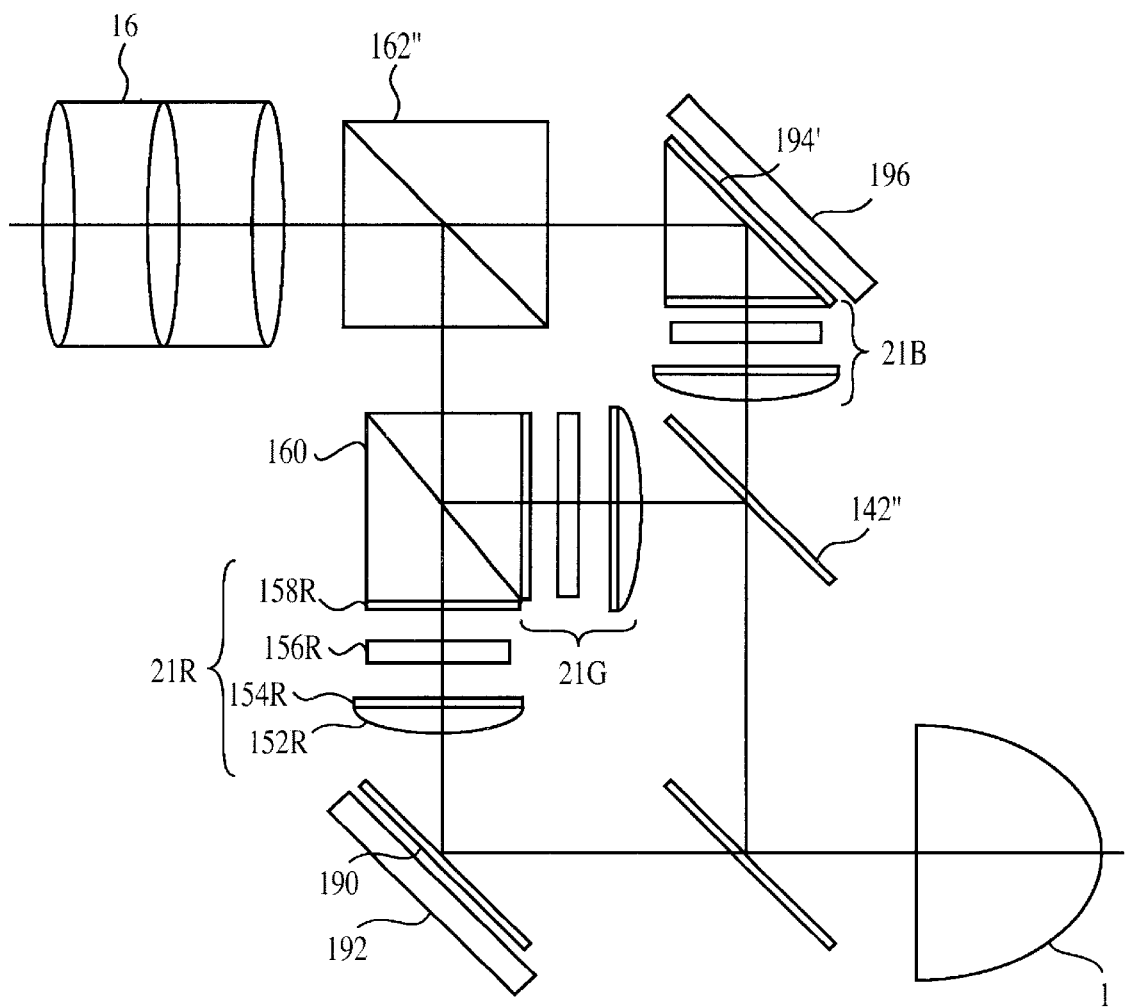
FIG. 25 is a diagram showing a schematic structure of a projection type display according to a seventeenth embodiment of the present invention.

Next, a projection type display according to a seventeenth embodiment of the present invention is described with reference to FIG. 25. This embodiment has a feature that a fixture of the dichroic mirror 190 is improved. The feature is that a light absorber is arranged on a rear surface of the dichroic mirror 190 or on a wall surface after passing through the mirror. In FIG. 25, a black light absorber 192 is sandwiches between the mirror 190 and the fixture to absorb the transmission light of the dichroic mirror 190. By forming the structure like this, the stray light in the display due to the transmission light of the dichroic mirror 194 can be reduced as compared with the case where the light absorber 192 is not used, so improving the contrast of the projection pictures.

Similarly, a light absorber 196 can be arranged on the rear surface of the dichroic prism 194 or on a wall surface after passing through the prism instead of the prism mirror 164'. In FIG. 25, the black light absorber 196 is sandwiched between the prism 194 and the fixture to absorb the transmission light of the dichroic prism 194. By forming the structure like this, the stray light in the display due to the transmission light in the dichroic prism 194 can be reduced as compared with the case where the light absorber 194 is not used, so improving the contrast of the projection pictures.

Next, a projection type display according to an eighteenth embodiment of the present invention is described. This embodiment has a feature that the reflection films of the total reflection mirror 144" and the total reflection prism 164' according to the third embodiment shown in FIG. 14 are made of a dielectric multi-layer film. Although a mirror formed by a deposition film made of aluminum or silver has generally a reflectance of approximately 95%, the reflectance of appropriately 95% can be achieved when the dielectric multi-layer film is used for the formation. Thus, this structure can service to realize a higher quantity of light of the projector.

Figure 26:
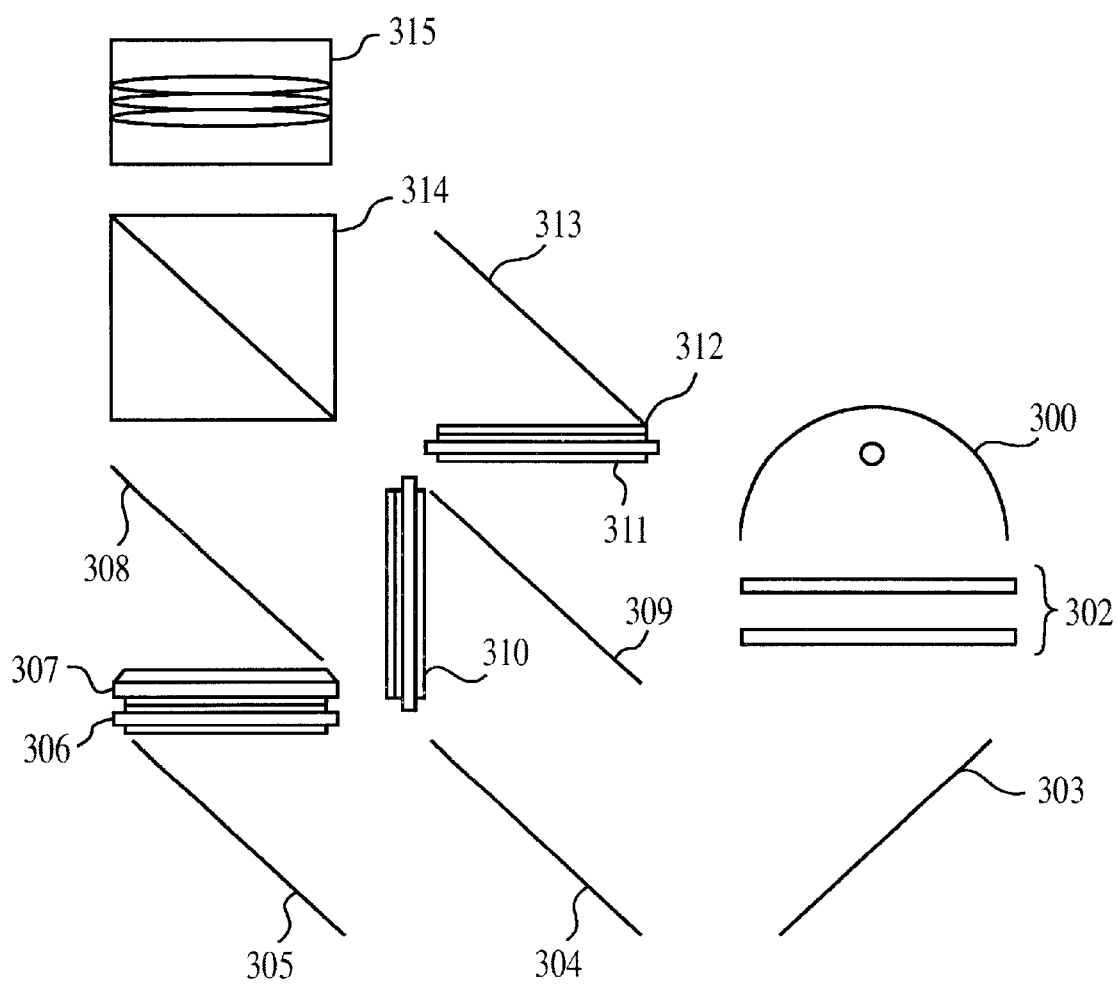
FIG. 26 is a diagram showing a schematic structure of a projection type display according to a nineteenth embodiment of the present invention.
Figure 27A:
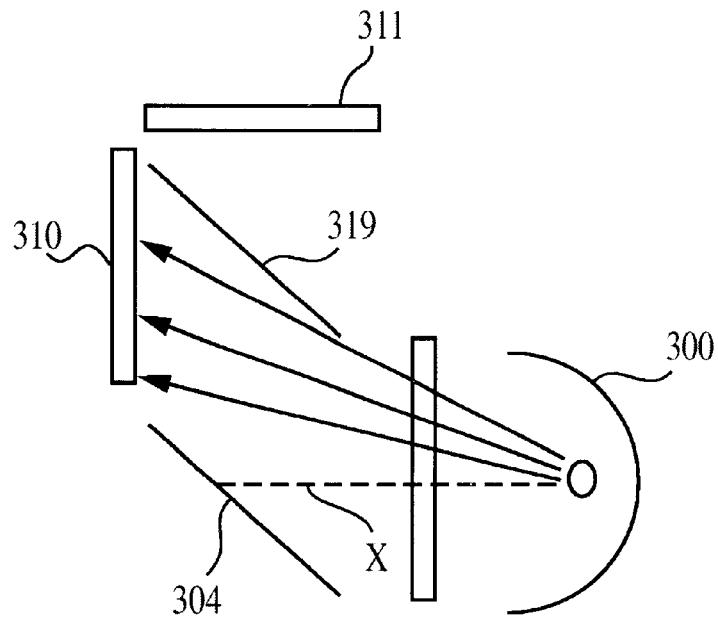
FIG. 27 is a diagram describing a projection type display according to the nineteenth embodiment of the present invention.
Figure 27B:
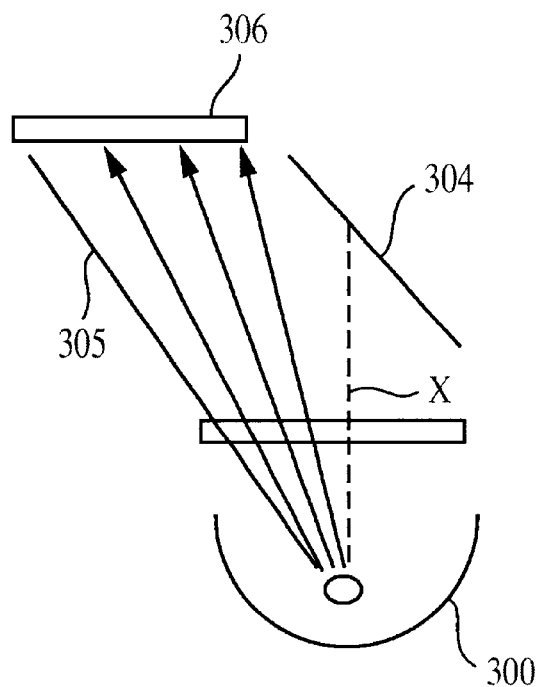
Figure 28:
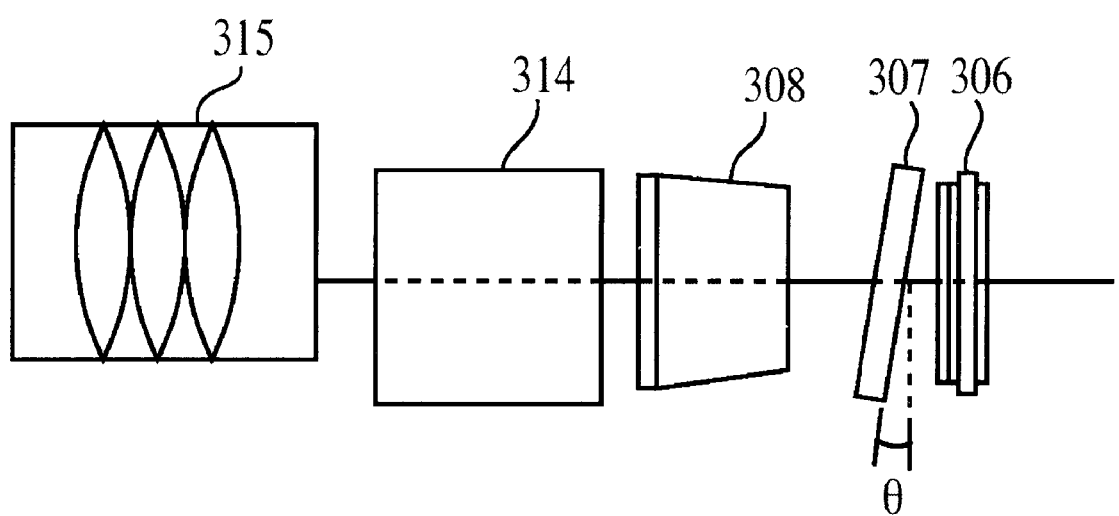
FIG. 28 is a diagram describing a projection type display according to the nineteenth embodiment of the present invention.
Figure 29:
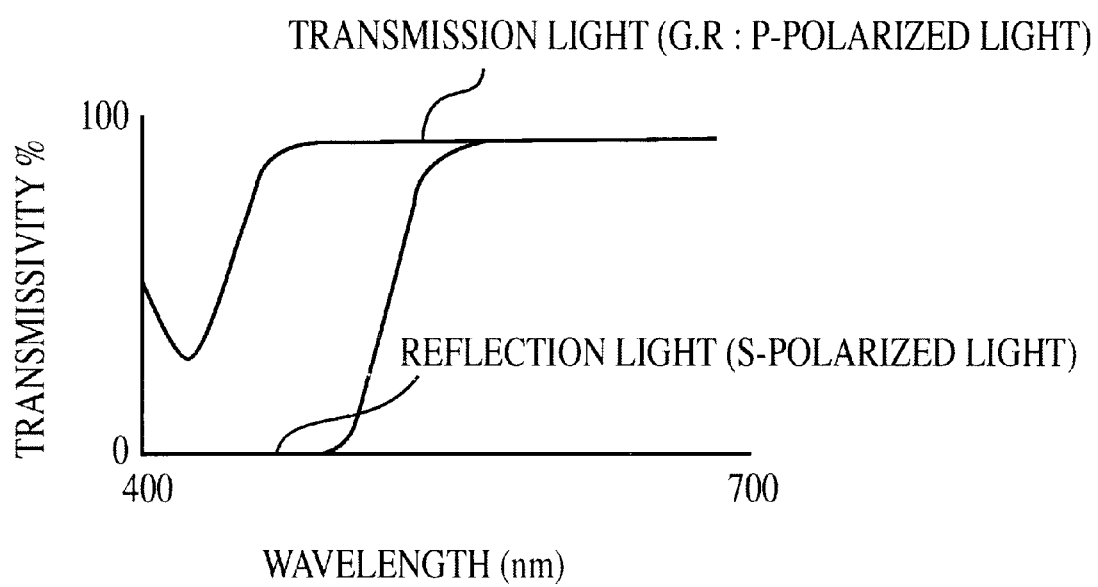
FIG. 29 is a diagram describing a projection type display according to the nineteenth embodiment of the present invention.

Next, a projection type display according to a nineteenth embodiment of the present invention is described with reference to FIG. 26 through FIG. 29. FIG. 26 shows a schematic structure of the projection type display according to this embodiment. In FIG. 26, a white light emitted from a light source 300 is converted to the polarizing direction perpendicular to this page (for convenience sake, called the s-polarized light) by a polarization converting device 302. The light emitted from the light source 300 is bent 90 degrees by a mirror 303. Because the mirror 303 has a higher reflectance in the s-polarized light than in the light parallel to this page (p-polarized light), better reflectance is obtained by maintaining the white light as the s-polarized light by the polarization converting device 302. Also, without making the size of the display larger, the existence and the structure of the arrangement of this mirror 303 prevent the light, which emits directly from the lamp without being reflected by the reflector of the light source 300 and have an angle to a light axis X, from increasing a panel temperature by directly incident on a liquid crystal panel 306 or 310 or becoming a stray light without passing through the dichroic mirror 304 as shown in FIG. 27(*a*) and (*b*).

The light reflected by the mirror 303 is separated into a red light which passes through a dichroic mirror 304, and green and blue light which are reflected by the dichroic mirror 304. The passing red light is efficiently reflected by a mirror 305 which is superior in a s-polarization reflecting characteristic and then bent 90 degrees. Then, the red light is incident on the liquid crystal panel 306 for red, after changing the polarizing direction by 45 degrees by the phase difference plate. The exiting light modulated by the liquid crystal panel 306 is converted the polarizing direction by 90 degrees, passes through the polarizing plate. The polarizing direction of the exiting light is further converted by 45 degrees to be the p-polarization by the phase difference plate. The exiting light passes through a glass plate 307 (white plate), which is 0.5 mm in thickness and arranged with an inclination of 15 degrees with respect to the light axis, and a dichroic mirror 308 as designated by 8 in FIG. 28. This glass plate 307 exists for compensating the displacement of the light path produced when the light passes through the dichroic mirror 308. If the glass 307 is made of a material having a low refractive index such as borosilicated glass or quartz, although expensive, a display capacity can be manufactured in compact by thinning the glass plate. By compensating the light path displacement by the glass plate 307, preferable projection pictures with no color variations and no astigmatism can be obtained. It should be noted that other methods, such as a method to thin the dichroic mirror 308 itself to reduce the light path variations, or a method to form the incident and exiting surfaces substantially perpendicular to the light axis to reduce the light path variation by forming a dichroic prism using the dichroic mirror 308 or a mirror 313, can be allowed.

After reflected by the dichroic mirror 304, the green light is reflected by a dichroic mirror 309 at the next stage, and passes through a liquid crystal panel 310, the polarizing plate, and the phase difference plate to be converted to the p-polarized light. Further, the green light is reflected by the dichroic mirror 308. Also, the blue light passes through the dichroic mirror 309, a liquid crystal panel 311, and the polarizing plate. Then, the blue light is converted to the s-polarized light by a phase difference plate 312 and bent by the mirror 313. This blue light is incident on a projection lens 315 and projected after being reflected by a dichroic prism 314 having a characteristic shown in FIG. 29.

The synthesized lights of red and green pass through the dichroic prism 314 having the p-polarizing characteristic, is incident on the projection lens 315 and projected therefrom. Since red and green, which have the distinctive color variations and a large quantity of light, are previously synthesized, the pixel displacement of the display pixels is adjusted only by the angle adjustment by the dichroic mirror 308, therefore improving an efficiency in display assembly to realize a cost-down. Also, the incidence of the undesired light to each liquid crystal panel can be prevented. Further, the mirror incident on the mirror 303 is reflected as the s-polarized light, so improving a reflectance. Also, the green and red lights are previously synthesized by the dichroic mirror 308, preventing the display from a deterioration by the aberration, thereby increasing an efficiency of the pixel superposition. The dichroic mirror has a better utilization efficiency in p-polarization than in s-polarization, so increasing the utility quantity of light by converting the green and red lights to the p-polarization. Further by converting the reflected blue light to the s-polarized light, the passing green and red lights to the p-polarized lights, and the green and red lights having the adjacent wavelengths to lights having other polarizing characters, the dichroic prism 314 can increase the transmission and reflection efficiencies, thereby increasing the light utilization efficiency.

Present invention is not limited to the above embodiments and a variety of deformations are possible. In the above embodiment, although the transmission type liquid crystal light valve, which passes the lights directed from the light source 1 by the dichroic mirrors 4, 6 and 8 and projects the images on the screen (not shown), is used, the present invention is not limited to this. The reflection type liquid crystal light valve using the reflection type liquid crystal panel, which projects the images on the screen by reflecting the light from the light source, can be used as well. The present invention functions effectively when the light incident on the reflection type liquid crystal panel illuminates the switching device from the rear surface. When the reflection type liquid crystal panel is used, the reflection type liquid crystal panel can be a structure which shares whole or a part of the color separating optical system and color the synthesizing optical system. In this case, the display can be miniaturized.

Also, in the above embodiment, although the present invention is applied to the projection type display having a rear projection type screen, the present invention can be applied to a projection type display having a front projection type as well.

The present invention is also applicable to a projection type display in which an EL (electroluminescent) light emission display device and the like having the switching device are used as the light valve.

Also, in the above embodiment, although the p-Si TFT is used as the switching device of the liquid crystal pane, the present invention is, of course, applicable to a projection type display in which a-Si (amorphous silicone) TFT or MIM is used as the switching device.

Also, when applying the present invention, it is obvious that the arrangement and the like of the color synthesizing optical system and the polarization converting device are not limited to the structures illustrated in the above embodiments. For example, although in the structure shown in FIG. 4, the half-wave plate 20Bi is arranged on the incident side of the liquid crystal light valve for blue, the present invention is not limited to this. For example, when white light from the light source 1 is separated into the blue component and other color components, a polarizing separation device (such as a polarization beam splitter) which sets the polarizing direction of the blue light to the polarizing direction orthogonal to other red and green lights can be arranged between each of the liquid crystal panels 20R, 20G and 20B and the light source 1 as a polarization converting unit respectively.

Also, a color filter for a color compensation can be inserted at the front stage of each liquid crystal light valve.

Further, the normally white type liquid crystal panel is used to describe in the above embodiments. However, the present invention is not limited to this and the present invention can be applied to a projection type display having a liquid crystal light valve using a normally black type liquid crystal panel.

Further, although each of the liquid crystal panel 20R, 20G and 2B are described to have the TN liquid crystal layer in the above embodiments, the present invention is not limited to this and applicable to a vertical orientation type (VA type) liquid crystal panel.

Also, the transmission type screen which combines the lenticular lens and the Fresnel lens is described as an example in the above embodiments. However, since a phenomenon that a light distribution characteristic differs due to the difference of the polarizing directions generated in the Fresnel lens, the color variations and the color shift occur as well when the Fresnel lens and no-lenticular lens type light distribution (scattering) device are used. The same phenomenon occurs when the lights pass a simple scattering plate. The present invention is applicable to almost all of these screens as is the case of the above embodiments.

As mentioned above, according to the present invention, a projection type display superior in the gradation display with a higher quality can be realized. Further, according to the present invention, a projection type display superior in the color reproduction with a higher quality can be realized. Also, according to the present invention, a projection type display having the light valve to modulate the incident light by the driving of the switching device, which is capable of performing a high quality gradation display by preventing the generation of the leak current by the switching device, can be realized. Furthermore, according to the present invention, when projected on the screen, the projection type display, which is superior in the color reproduction without breaking a white balance of the three primary colors of red (R), green (G) and blue (B), and further capable of displaying the images at a wide angle in visibility, can be realized. Even if the screen is observed from the diagonal direction, a preferable display images where no color variations are produced and the color shift is small, is obtained.

Also, according to the present invention, the light path length for each color in the color separating optical system can be equal, so preventing the chromaticity variations from being produced by the difference of the light path length. Also, the pixel displacement can be prevented because it is hard to produce the distortion on the mirror surface and the displacement of mounting position for the color synthesizing optical system.

Also, according to the present invention, the optical materials can pass and reflect each light, therefore the astigmatism can be almost sufficiently compensated for the red color. Therefore, the images having a bright and a stable display quality without gradation can be provided. Further, the accuracy of the display pixel matching can be improved by synthesizing red and green which have more quantity of light among the three colors. Therefore, the efficiency of the display assembly can be improved, so suppressing the manufacturing cost of the display.

What is claimed is:

1. A projection type display comprising:

a color separating optical system for separating an emitted light from a light source into respective lights of color components of red, green and blue, having a first dichroic mirror functioning as a low-pass filter to pass the red light and a second dichroic mirror functioning as a high-pass filter to pass the blue light;

three light valves having at least a polarizing plate on each light exiting side thereof, modulating the light of each color component of red, green, and blue; and a color synthesizing optical system for synthesizing each exiting light from each light valve, having a first dichroic prism functioning as a low-pass filter to pass the red light and a second dichroic prism functioning as a low-pass filter to pass the red light and the green light.

2. A projection type display as set forth in claim 1, wherein a light reflected by at least one of the first and second dichroic prisms includes s-polarized light.

3. A projection type display as set forth in claim 1, wherein a light passing through at least one of the first and second dichroic prisms includes p-polarized light.

4. A projection type display as set forth in claim 1, wherein the light source emits polarized light.

5. A projection type display as set forth in claim 1, wherein a cut-off wavelength of transmission light of the first dichroic mirror is 560~590 nm, a cut-off wavelength of reflected light of the first dichroic prism being 590~620 nm, and a cut-off wavelength of transmission light of the first dichroic prism being shorter than the cut-off wavelength of the reflected light.

6. A projection type display as set forth in claim 1, wherein a cut-off wavelength of transmission light of the second dichroic mirror is 480~510 nm, a cut-off wavelength of reflected mirror of the second dichroic prism being 510~540 nm, and a cut-off wavelength of transmission light of the second dichroic prism being shorter than the cut-off wavelength of the reflected light.

7. A projection type display as set forth in claim 1, wherein the color separating optical system has a light reflection mirror; and the color synthesizing optical system has a light reflection prism.

8. A projection type display as set forth in claim 7, further comprising a light absorber for absorbing the light passing through at least one of the light reflection mirror and the light reflection prism.

* * * * *